US011416649B2

(12) United States Patent
Mirzendehdel et al.

(10) Patent No.: US 11,416,649 B2
(45) Date of Patent: Aug. 16, 2022

(54) METHOD AND SYSTEM FOR PART DESIGN USING HETEROGENEOUS CONSTRAINTS

(71) Applicant: Palo Alto Research Center Incorporated, Palo Alto, CA (US)

(72) Inventors: Amirmassoud Mirzendehdel, San Mateo, CA (US); Morad Behandish, Mountain View, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 330 days.

(21) Appl. No.: 16/561,633

(22) Filed: Sep. 5, 2019

(65) Prior Publication Data
US 2021/0073349 A1   Mar. 11, 2021

(51) Int. Cl.
*G06F 30/17* (2020.01)
*G06F 111/04* (2020.01)
*G06F 111/20* (2020.01)

(52) U.S. Cl.
CPC .......... *G06F 30/17* (2020.01); *G06F 2111/04* (2020.01); *G06F 2111/20* (2020.01)

(58) Field of Classification Search
None
See application file for complete search history.

(56) References Cited

U.S. PATENT DOCUMENTS

| 5,651,098 A * | 7/1997 | Inoue ............. G06Q 10/04 706/13 |
| 8,140,548 B2 | 3/2012 | Bruno et al. |
| 2015/0019173 A1 | 1/2015 | Amid et al. |
| 2015/0269290 A1 * | 9/2015 | Nelaturi ............. G06T 17/10 703/6 |
| 2018/0345647 A1 | 12/2018 | Morris et al. |
| 2018/0349531 A1 | 12/2018 | Morris et al. |
| 2020/0209832 A1 * | 7/2020 | Behandish ............. B33Y 50/00 |

FOREIGN PATENT DOCUMENTS

| CA | 2648796 A1 | 7/2009 |
| WO | 2018/130820 | 7/2018 |
| WO | 2020/097578 | 5/2020 |

OTHER PUBLICATIONS

Mirzendehdel et al., "Exploring feasible design spaces for heterogeneous constraints", arxiv.org/pdf/1907.0117, Jul. 10, 2019, 28 pages.
European Search Report from EP Application No. 20193486.6 dated Jan. 29, 2021, 8 pages.
(Continued)

*Primary Examiner* — Craig C Dorais
(74) *Attorney, Agent, or Firm* — Mueting Raasch Group

(57) ABSTRACT

A method of classifying design criteria includes receiving design criteria for a product part. The criteria comprise one or both of performance and manufacturing criteria. The design criteria are sorted into different classes of one or both of one or more objective functions and one or more constraints based on when they can be satisfied or optimized. Constraint violations are determined. A design workflow is produced to generate one or more designs of a part to comply with one or more of satisfying constraints and optimizing objective functions.

20 Claims, 30 Drawing Sheets

(56) References Cited

OTHER PUBLICATIONS

Behandish et al., "Automated process planning for hybrid manufacturing", Computer-Aided Design 102, 2018, US-127.

Harzheim et al., "A review of optimization of cast parts using topology optimization", Structural and multidisciplinary optimization 31, 5, 2006, pp. 388-399.

Langelaar, "Topology optimization for multi-axis machining", Computer Methods in Applied Mechanics and Engineering, 2019, pp. 226-252.

Liu et al., "Topology optimization for hybrid additive-subtractive manufacturing", Structural and Multidisciplinary Optimization, vol. 55, No. 4, Aug. 29, 2016, pp. 1281-1299.

Lysenko et al., "Group morphology with convolution algebras", In Proceedings of the 14th ACM symposium on solid and physical modeling. ACM, Sep. 1, 2010, pp. 11-22.

Mirzendehdel et al., "Topology Optimization with Accessibility Constraint for Multi-Axis Machining", Computer-Aided Design, vol. 122, May 2020, 12 pages.

Morris et al., "A subtractive manufacturing constraint for level set topology optimization", AXIV.org, Feb. 19, 2020, 24 pages.

Nelaturi et al., "Automatic spatial planning for machining operations", In 2015 IEEE International Conference on Automation Science and Engineering (CASE). IEEE, Oct. 8, 2015, pp. 677-682.

Sucan et al., "The Open Motion Planning Library", IEEE Robotics & Automation Magazine 19,4, Dec. 2012, pp. 72-82.

Zhou et al., "Minimum length scale in topology optimization by geometric constraints", Computer Methods in Applied Mechanics and Engineering 293, 2015, pp. 266-282.

\* cited by examiner $$\text{Find } \Omega \in D_P^* : \begin{cases} \text{select target } \bar{V}_\Omega^{\text{targ}} \in (0,1], \\ \text{ILI:} \begin{cases} \text{minimize } J_\Omega = [\mathbf{f}]^T[\mathbf{u}_\Omega], \\ \text{s.t. } \bar{V}_\Omega = \bar{V}_\Omega^{\text{targ}}, \\ \text{s.t. } [K_\Omega][\mathbf{u}_\Omega] = [\mathbf{f}], \end{cases} \end{cases}$$

FIG. 28

$$\text{Find } \Omega \in D_P^* : \begin{cases} \text{select target } \bar{V}_\Omega^{\text{targ}} \in (0,1], \\ \text{ILI:} \begin{cases} \text{minimize } J_\Omega = [\mathbf{f}]^T[\mathbf{u}_\Omega], \\ \text{s.t. } \bar{V}_\Omega = \bar{V}_\Omega^{\text{targ}}, \\ \text{s.t. } [K_\Omega][\mathbf{u}_\Omega] = [\mathbf{f}], \\ \text{s.t. } \bar{V}_{S_\Omega} \leq \bar{V}_{\text{UB}}, \end{cases} \end{cases}$$

FIG. 29

$$\text{Find } \Omega \in D_P^* : \begin{cases} \text{select target } \bar{V}_\Omega^{\text{targ}} \in (0,1], \\ \text{ILI:} \begin{cases} \text{minimize } J_\Omega = [\mathbf{f}]^T[\mathbf{u}_\Omega], \\ \text{s.t. } \bar{V}_\Omega = \bar{V}_\Omega^{\text{targ}}, \\ \text{s.t. } [K_\Omega][\mathbf{u}_\Omega] = [\mathbf{f}], \\ \text{s.t. } 1 - \bar{V}_{R_\Omega} - \bar{V}_\Omega \leq \bar{V}_{\text{UB}}, \end{cases} \end{cases}$$

FIG. 30

$$\text{Find } \Omega \subseteq \Omega_P^* \text{ to } \begin{cases} \text{select target } \bar{V}_\Omega^{\text{targ}} \in (0,1], \\ \text{ILI:} \begin{cases} \text{minimize } J_\Omega = [\mathbf{f}]^T[\mathbf{u}_\Omega], \\ \text{s.t. } \bar{V}_\Omega = \bar{V}_\Omega^{\text{targ}}, \\ \text{s.t. } [K_\Omega][\mathbf{u}_\Omega] = [\mathbf{f}], \\ \text{s.t. } [\mathbf{1}_\Omega * \mathbf{1}_{-T}] = [0], \end{cases} \end{cases}$$

FIG. 31

$$\text{Find } \Omega \in D_P^* : \begin{cases} \text{select target } \bar{V}_\Omega \in (0,1], \\ \text{ILI:} \begin{cases} \text{minimize } f_i(\Omega), \; n_C < i \leq n_C + n_O, \\ \text{s.t. } \bar{V}_\Omega = \bar{V}_\Omega^{\text{targ}}, \\ \text{s.t. } g_i(\Omega) \leq 0, \; n_P < i \leq n_P + n_G, \\ \text{s.t. } g_i(\mathbf{x}; \Omega) \leq 0, \; n_P + n_G < i \leq n_C, \end{cases} \end{cases}$$

FIG. 32

METHOD AND SYSTEM FOR PART DESIGN USING HETEROGENEOUS CONSTRAINTS

STATEMENT REGARDING FEDERALLY SPONSORED RESEARCH AND DEVELOPMENT

This invention was made with Government support under DARPA contract HR0011-17-2-0030. The government has certain rights to this invention.

TECHNICAL FIELD

The present disclosure is directed to the design of mechanical parts.

BACKGROUND

Generating practical designs involves simultaneously reasoning about manufacturing, assembly, materials, and physics. Computational services, herein called solvers, are used to assist this process by analyzing a candidate design to see if it meets some performance criteria and/or synthesizing designs that satisfy the performance criteria.

SUMMARY

Embodiments described herein involve a method of classifying design criteria comprising receiving design criteria for a product part. The criteria comprise one or both of performance and manufacturing criteria. The design criteria are sorted into different classes of one or both of one or more objective functions and one or more constraints based on when they can be satisfied or optimized. Constraint violations are determined. A design workflow is produced to generate one or more designs of a part to comply with one or more of satisfying constraints and optimizing objective functions.

Embodiments involve a system for classifying design criteria. The system comprises a processor and a memory storing computer program instructions which when executed by the processor cause the processor to perform operations. The operations comprise receiving design criteria for a product part. The criteria comprise one or both of performance and manufacturing criteria. The design criteria are sorted into different classes of one or both of objective functions and constraints based on when they can be satisfied or optimized. Constraint violations are determined. A design workflow is set up to generate one or more designs of a part to comply with one or more of satisfying constraints and optimizing objective functions.

A method involves receiving one or more constraints for a design of a product part. A feasible design space is defined based on the one or more constraints. The design space is pruned based on a subset or all of the one or more constraints. The pruned design space is explored to produce one or more feasible part designs.

A system comprises a processor, a user interface, and a memory storing computer program instructions which when executed by the processor cause the processor to perform operations. The operations comprise receiving one or more constraints for a design of a product part via the user interface. A feasible design space is defined based on the one or more constraints. The design space is pruned based on a subset or all of the constraints. The pruned design space is explored to produce one or more feasible part designs.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIGS. 27, 28, 29, 30, 31, and 32 are formulas in accordance with embodiments described herein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figures 1A, 1B:
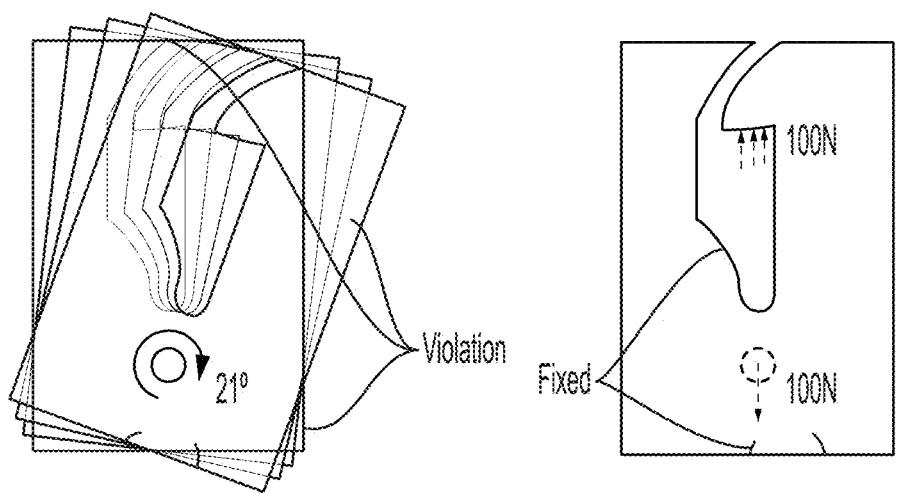
FIGS. 1A and 1B illustrates functional load-bearing surfaces where the latch mates with other parts in accordance with embodiments described herein

Mechanical design problems require reasoning about diverse, multiple, and often conflicting objectives and constraints arising from requirements across a product's lifecycle. The engineering design challenge lies in traversing the trade space of these requirements to synthesize feasible designs. This challenge has recently been amplified by rapid advances in manufacturing processes. Light-weight, high-performance, and multi-material composite structures with complex geometry and material distribution can now be fabricated using various additive manufacturing (AM) processes. Yet, existing computer-aided design (CAD) systems are far behind in their representations and algorithms to navigate the high-dimensional trade spaces that grow exponentially in the number of available decisions per spatial elements. Additional functional constraints such as manufacturability, ease of assembly, motion in presence of obstacles, and aesthetics dramatically increase the trade space complexity.

Specialized domain-specific computational tools are used to generate designs that satisfy specific types of functional requirements. For example, to maximize a part's performance with as little cost or material as possible, one may employ topology optimization (TO) tools. In most TO approaches, an objective function is defined over a design domain in terms of the physical performance (e.g., strength and/or stiffness) with additional constraints on total mass or volume as well as boundary conditions (e.g., loading and/or restraints) that often account for interfaces with other parts. TO produces valid designs with nonintuitive shapes, topologies, and material distributions that meet physical requirements, but is rarely aware of other design criteria such as kinematic constraints. On the other hand, to ensure collision-free motion of a part in an assembly, one may need to examine its free configuration space to guarantee collision avoidance. Similarly, for subtractive manufacturing (SM), the machinability of a designed part is predicated on whether the volume to be removed from a raw stock is accessible within the cutting tool assembly's non-colliding configurations. For AM, one may need to consider the part's morphology, minimum feature size, and skeleton. Hybrid manufacturing (combined AM and SM) requires more complicated logical reasoning. These problems may use nontrivial interference analysis of shapes in relative motion that rely on different tools of reasoning than physics-driven design tools such as TO. The latter often ignore motion related constraints by considering them out-of-scope.

Generating practical designs includes simultaneous reasoning about shape, motion, materials, physics, manufacturing, and assembly, among other factors. For example, a machine part that moves relative to other parts in a mechanical device has to avoid collisions with both stationary and moving obstacles. These requirements are imposed as kinematic constraints, expressed in terms of pointset containment or non-interference. The same part has to sustain mechanical loads at its joints or points of contact with other parts. These constraints may be imposed as physical constraints, expressed in terms of (in)equalities of mathematical functions that represent physical response (e.g., bounds on deflection or stress). Moreover, the part has to be manufacturable with one or more AM or SM capabilities. Manufacturability constraints can be of both kinematic and physical types; for instance, accessibility in SM and post-processing of AM (e.g., support removal) are of predominantly kinematic nature, whereas achieving desired material properties in AM requires in situ physical analysis. With few exceptions (e.g., TO for AM with minimized support) TO algorithms are not developed with manufacturability provisions built into their objective functions.

Different computational services, herein called solvers, are used to assist with the design process with heterogeneous constraints by providing either analysis tools to evaluate the performance of one or more given designs, or synthesis tools to generate one or more designs that satisfy a given set of performance criteria analysis. These two types of solvers are referred to herein as forward and inverse problem solvers ('FP/IP-solvers'), respectively. Specifically, generative design tools are IP-solvers which solve the inverse problem by systematically generating candidate designs and evaluating their performance (using FP-solvers) to guide refinement of designs until the criteria are met.

It is unlikely that a single IP-solver is capable of simultaneous reasoning about all design criteria (e.g., objective functions and constraints). Therefore, a typical computational design workflow requires carefully organizing and reasoning about several multidisciplinary solvers to address heterogeneous design criteria. While every IP-solver reasoning about a subset of these criteria may produce designs that are feasible (and ideally, optimal) only with respect to the specific criteria it considers, it provides no guarantees about the rest of the criteria. Different IP-solvers are thus likely to generate designs distinct from one another, while none of them simultaneously satisfies all criteria. Except for extremely simple criteria, it appears impossible to combine these solutions in any obvious way that preserves the constraints satisfied separately by each solver, or at least provides the best compromise. Even if such a solution exists, there may not exist any particular ordering of these solvers to find it, simply because each solver performs premature optimization with regards to the subset of criteria it cares about.

Consider the problem of designing a car hood latch. An initial design domain with boundary conditions is provided, and the goal is to find a design that is as stiff as possible with the least mass. Moreover, the latch has to be free to rotate clockwise by 20 degrees around a revolute joint, without exiting the initial design domain, so that it would not collide with other parts that are possibly outside that envelope. Functional load-bearing surfaces where the latch mates with other parts are shown in FIGS. 1A and 1B. All feasible designs retain these surfaces as specified. The said requirements immediately suggest using two IP-solvers that are well-positioned to deal with them (each solver satisfying a subset of them):

Let Unsweep be a solver that generates a design that remains within a given region of space while moving according to a prescribed motion (in this case, a clockwise rotation of 21 degrees).

Let PareTO be a solver that, starting from an initial design, generates a design on the Pareto front of the two objectives (compliance and mass), i.e., one that satisfies the stiffness requirement and the given boundary conditions with minimal mass.

Figure 2:
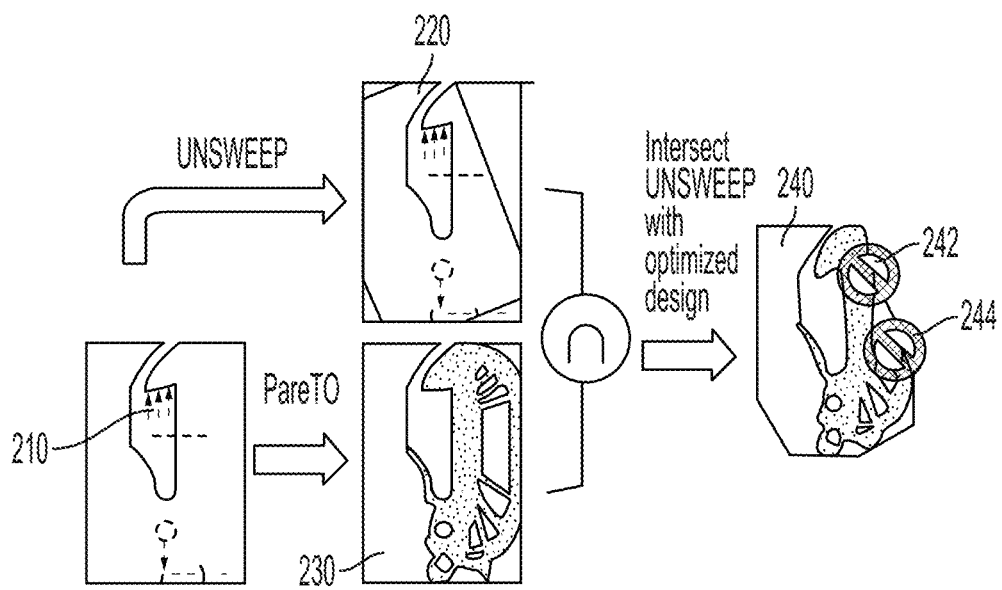
FIGS. 2 and 3 illustrate design processes for an example product part in accordance with embodiments described herein.

FIG. 2 illustrates a design process for an example product part in accordance with embodiments described herein. An initial design 210 is used to create the feasible designs. Using the Unsweep and the PartTO solvers separately, one may generate two distinct designs 220, 230, as illustrated in FIG. 2. However, there is no clear operation with which to combine these two, in order to generate a design that satisfies both kinematics- and physics-based constraints. For example, the intersection of the two designs, shown in FIG. 2 generates a design 240 that does not violate the constraints satisfied by Unsweep, because every subset of the unswept volume also satisfies the containment constraints. However, the constraints 242, 244 satisfied by PareTO are no longer satisfied, because the load paths are changed due to the changed topology and the compliance target is no longer met.

In the example shown in FIG. 2, Unsweep has a property that its solution can be interpreted not as a single design, but as a representation of all designs that satisfy the containment constraints. This family of designs is closed under set intersection, i.e., intersecting any of the feasible designs with another set leads to another feasible design. Similarly, PareTO can generate a family of designs that satisfy compliance requirements for different mass budgets. However, this family is not closed under set intersection.

Figure 3:
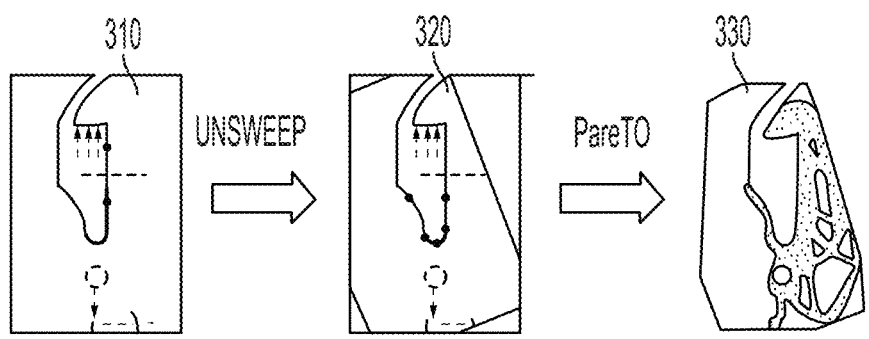

It is possible to obtain a feasible solution to the latch design problem by using the same set of IP-solvers, if the workflow is organized differently, as shown in FIG. 3. Suppose the input design criteria 310 is used to solve for the containment constraint using Unsweep. A valid intermediate design 320 is generated that does not exit a given envelope while moving. This intermediate design 320 can be used as the initial design input to PareTO and optimize its shape and topology to achieve the compliance target 330 with minimal mass. This approach works because PareTO is a material reducing solver, i.e., its solutions remain strictly contained within the initial design. Hence any design generated downstream will be faithful to the containment constraint that was satisfied upstream. The same argument is not true if the order of applying the solvers is swapped. There is no reason to believe that applying Unsweep to a topologically optimized solution of PareTO will remain on the Pareto front. The fundamental differences between the two IP-solvers should be taken into account when deciding on their arrangement in a workflow—in this case, choosing between parallel or sequential execution and the proper order for the latter.

Figure 4:
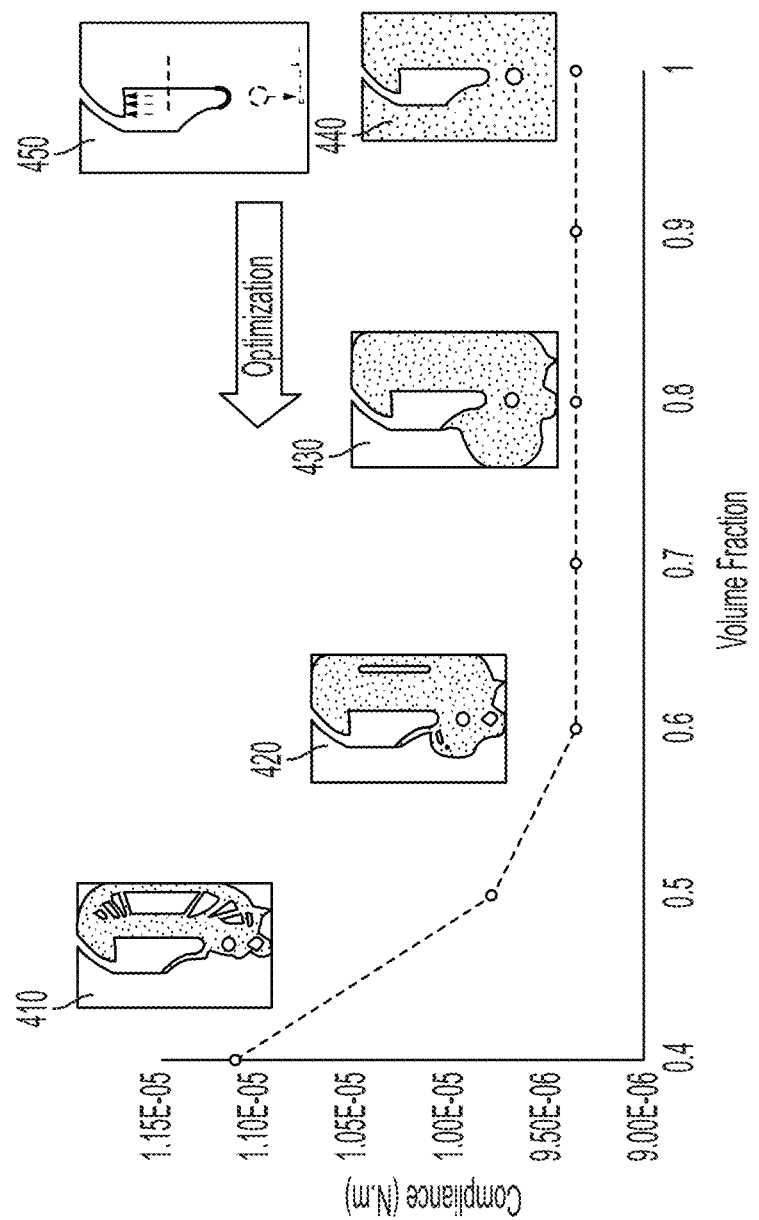
FIG. 4 shows a set of design solutions on the Pareto frontier defined by mass and compliance as conflicting objectives in accordance with embodiments described herein.

FIG. 4 shows a set of design solutions 410, 420, 430, 440 on the Pareto front based on an initial design 450. These design solutions 410, 420, 430, 440 defined by mass and compliance as conflicting objectives. PareTO provides a clear advantage over classical TO with a single solution, by producing many alternatives—some of which might satisfy additional constraints that were not accounted for in TO. This generate-and-test approach is plausible, and in fact, is a common strategy for dealing with heterogeneous constraints. However, it turns out that none of the Pareto-optimized designs in this case will not remain within the envelope after a clockwise rotation of 21 degrees. In the example shown in FIG. 4, none of the topologically optimized design alternatives obtained from applying PareTO to the initial design 450 will satisfy the containment constraint. Generate-and-test does not always work.

In general, a good rule of thumb to organize solvers in a workflow is to call the ones that produce the broadest families of designs earlier. The upstream IP-solvers should generate a large number of designs, as opposed to fixing one or few designs, to provide more flexibility for downstream solvers. The downstream solvers can be FP-solvers, testing for new constraints, or IP-solvers, applying further optimization. However, each solver may prematurely optimize designs that may fail evaluation criteria considered in downstream solvers. The "blind" process of generating and testing designs without carefully considering properties of the workflow—and the associated feasible design space for each solver in the workflow-will scale poorly with increasing number of constraints/solvers and their complexity. A systematic approach to arranging solvers into workflows that guarantees satisfying new constraints without violating the already satisfied constraints is much demanded.

Real-world design problems often involve solving multi-objective optimization problems where the goal is to find the best trade-off between multiple competing objective functions. Classical methods such as linear programming (e.g., the 'simplex' algorithm), nonlinear programming (e.g., the steepest descent and conjugate gradients), or Newton-Raphson are limited to single-objective optimization problems. Even for single-objective optimization, finding the global optimum is NP-hard. Numerous approaches have been developed to converge to locally optimal solutions in reasonable computation time to multi-objective problems across different disciplines.

Unlike single-objective optimization, a total ordering for feasible solutions may not be possible in multi-objective optimization, i.e., there may not exist a single "best" solution due to competing objectives. However, feasible solutions may be partially ordered according to Pareto efficiency—also known as Pareto-Koopmans efficiency or dominance. Pareto-optimal solutions are locally optimal (according to Pareto-efficiency) where improving one objective comes at the expense of at least one other objective. The collection of all Pareto-optimal solutions is referred to as a Pareto front, which represents a curve, surface, or higherdimensional manifold in the design space for two, three, or higher number of competing objectives, respectively. Tracing a Pareto front is a challenge in multi-objective and multi-disciplinary design optimization.

TO has emerged as a practical class of computational methods for designing high-performance light-weight structures and has been applied in numerous areas such as designing automobiles components, aircraft components, spacecraft modules, cast parts, compliant mechanisms, and many other products. Numerous approaches such as density-based, levelset-based, and evolutionary methods for TO have been developed.

TO typically focuses on optimizing designs for performance (e.g., physical response to loads during operation) but less on other factors such as manufacturability. Apart from traditional processes such as machining and molding, more recent technologies such as AM have introduced the ability to fabricate complex topologically optimized designs while presenting new manufacturing challenges Process limitations may be considered during the design/optimization stage as much as possible to avoid repeated prototyping and iterations until the optimized designs are manufacturable. Specifically, applying corrections to the geometry or topology of a solution after TO to make it manufacturable may sacrifice the achieved optimality.

One solution is to impose design rules obtained from domain expertise and experience. These rules relate specific combinations of shape, materials, and process to impose simplified constraints that can be built into the TO framework to restrict the feasible design space. For example, when designing for AM via fused deposition modeling using polymers, one should require that all facets oriented at an angle greater than 45 degrees with respect to the build direction be supported with additional scaffolding material. When designing for casting and injection molding processes, one should ensure that the part has features of almost uniform thickness and no entrapped holes are present, so that the mold can be removed and the molten material cools down uniformly throughout the part. When designing for wire- or laser-cutting, one should ensure that the final design has a uniform cross-section, i.e., is 2.5D along the cutting direction. These constraints can be imposed during TO through filtering of the topological sensitivity field (TSF) as illustrated in FIGS. 5A-5H.

Figure 5A:
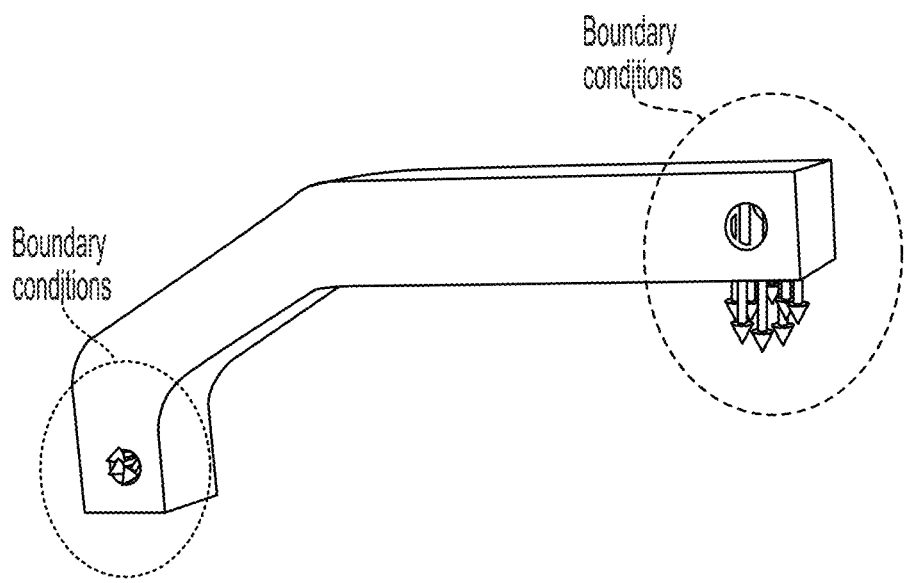
FIGS. 5A-5H and 6A-6B illustrate filtering of the sensitivity field in accordance with embodiments described herein.
Figure 5B:
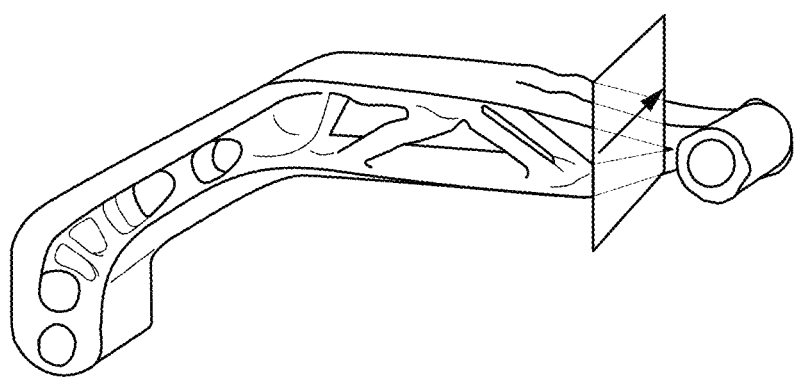
Figure 5C:
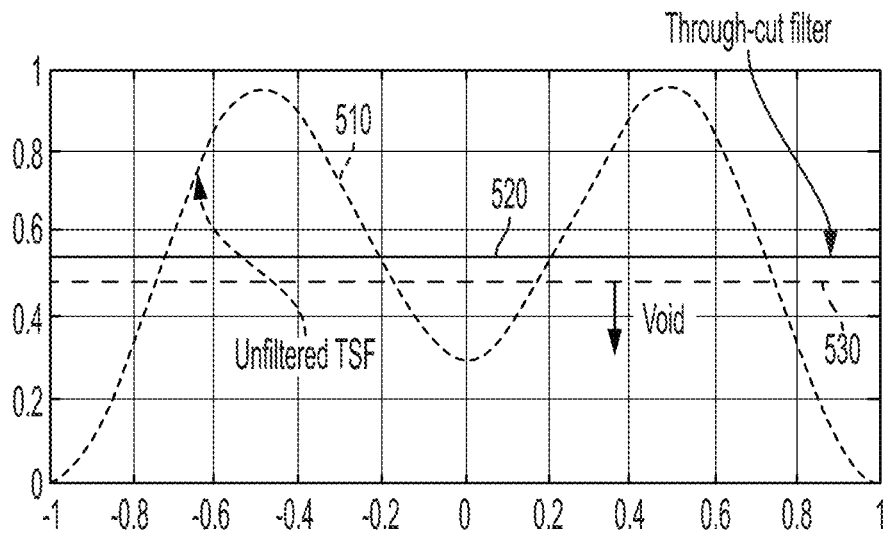
Figure 5D:
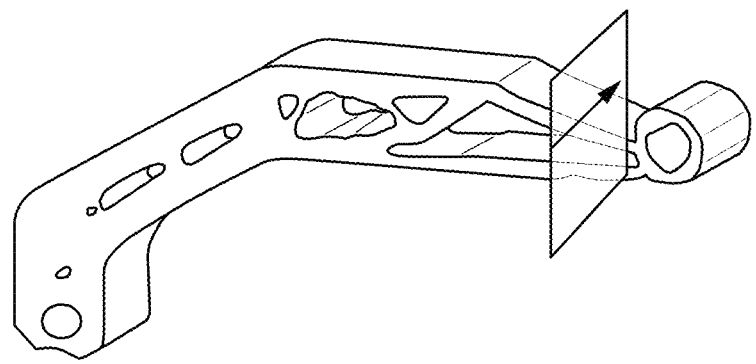
Figure 5E:
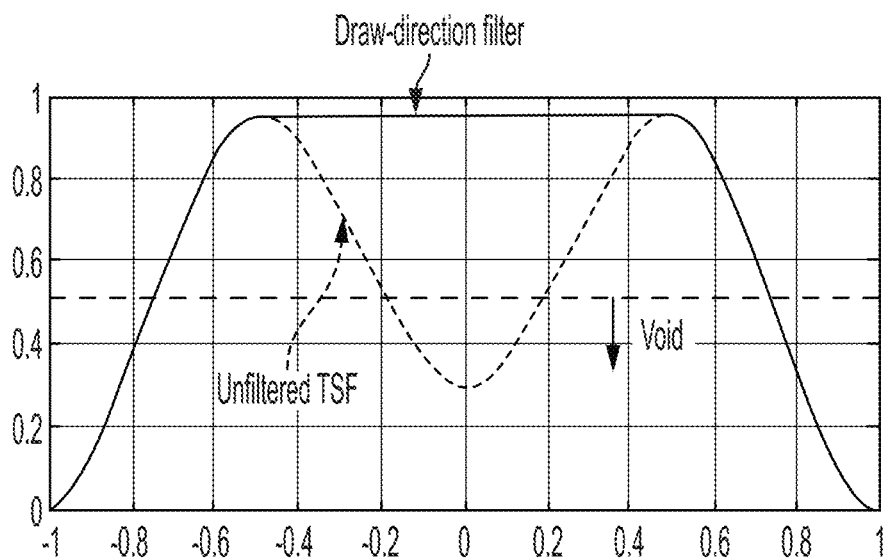
Figure 5F:
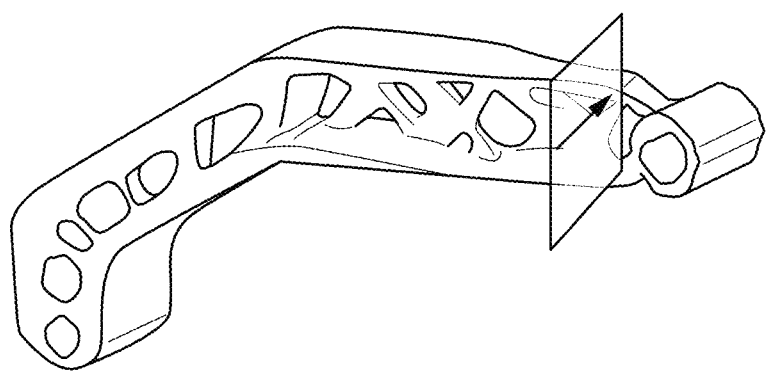
Figure 5G:
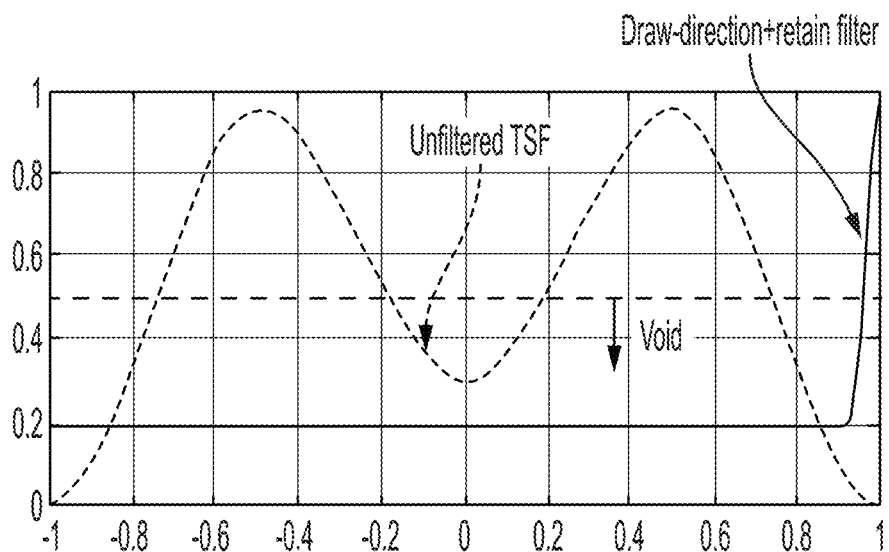
Figure 5H:
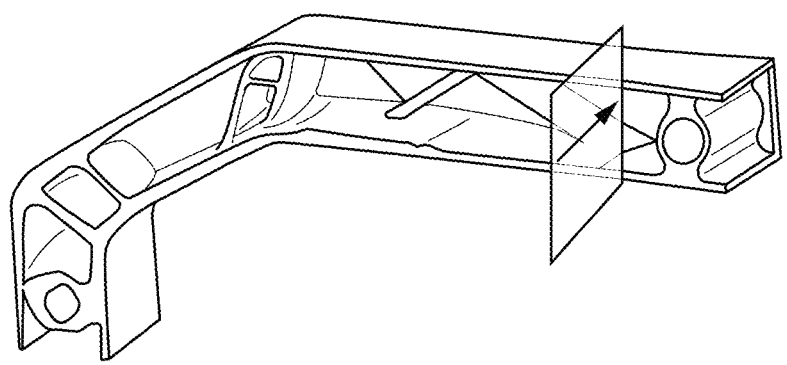

FIG. 5A illustrates the initial design domain having boundary conditions as shown. FIG. 5B shows a resulting optimized design without manufacturing restraints. According to embodiments described herein, the design shown in FIG. 5B has no TSF filtering. FIGS. 5C and 5D show an optimized design with wire and/or laser-cut constraints with through-cut filter 520 having unfiltered TSF 510 as shown. This involves designing a part to have a 2.5D geometry, i.e., have a fixed 2D section along the wire or laser beam direction 530. FIGS. 5E and 5F illustrate an optimized design with casting constraints, that involves designing a part to have a monotonically reducing 2D section along the draw direction. FIGS. 5G and 5H show an optimized design with casting (similar to FIG. 5F) and additional constraints that involve retaining some functional surfaces. The different filters for FIGS. 5C-5H are shown as curves along the arrow shown on a cross-section of the part. Each filter modifies the unfiltered TSF such that its level set satisfies the design constraints, producing different optimized designs.

Figure 6A:
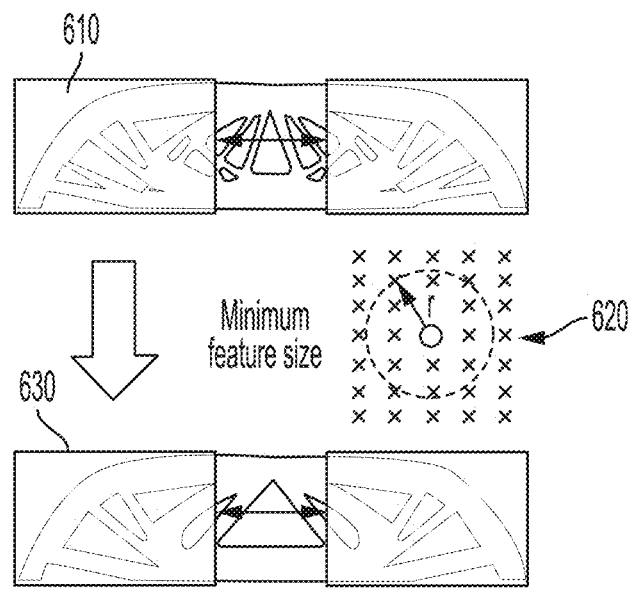
Figure 6B:
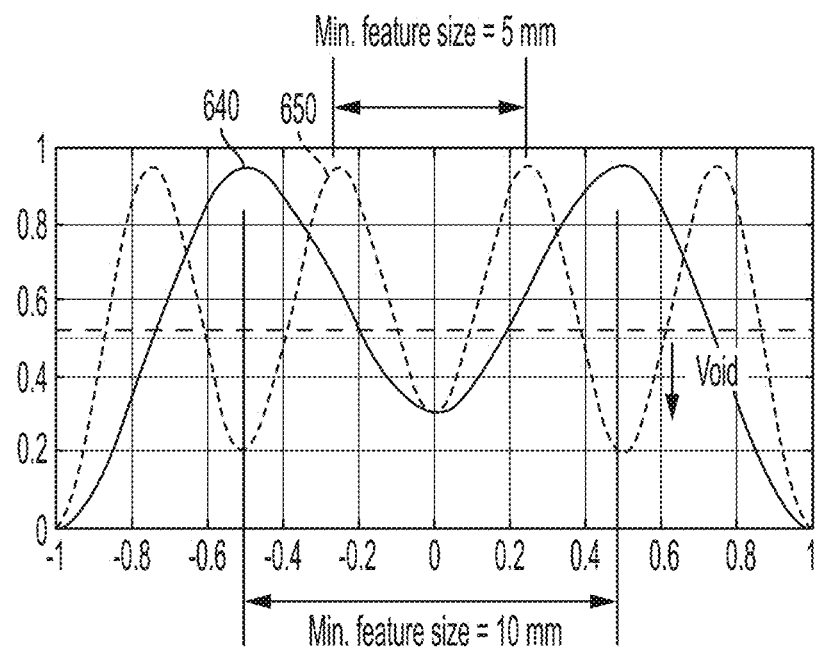

Another AM consideration is the manufacturing resolution, which can be directly incorporated into the TO algorithm as a minimum feature size constraint through either local gradient constraints or TSF filtering as shown in FIGS. 6A and 6B. FIG. 6A illustrates a first design 610. TSF filtering is applied 620 that constrains the minimum feature size of the design. A second design 630 is generated with the minimum feature size filtering applied. FIG. 6B also illustrates two curves that represent the cross-sections of the unfiltered TSF 650 (with a smaller peak-to-peak distance of 5 mm) and a filtered TSF 640 (with a larger peak-to-peak distance of 10 mm), where the latter would produce a design with a larger minimum feature size as the level set of the filtered TSF.

It is also possible to reduce the amount of support structure that may be needed in an AM by either finding a good build orientation or TSF filtering. Build orientation optimization often involves solving a multi-objective problem taking into account other factors such as surface quality, build time, or manufacturing error. TSF filtering, on the other hand, can be achieved by penalizing overhang surfaces, penalizing undercut surfaces, and/or augmenting new TSFs.

Figure 7:
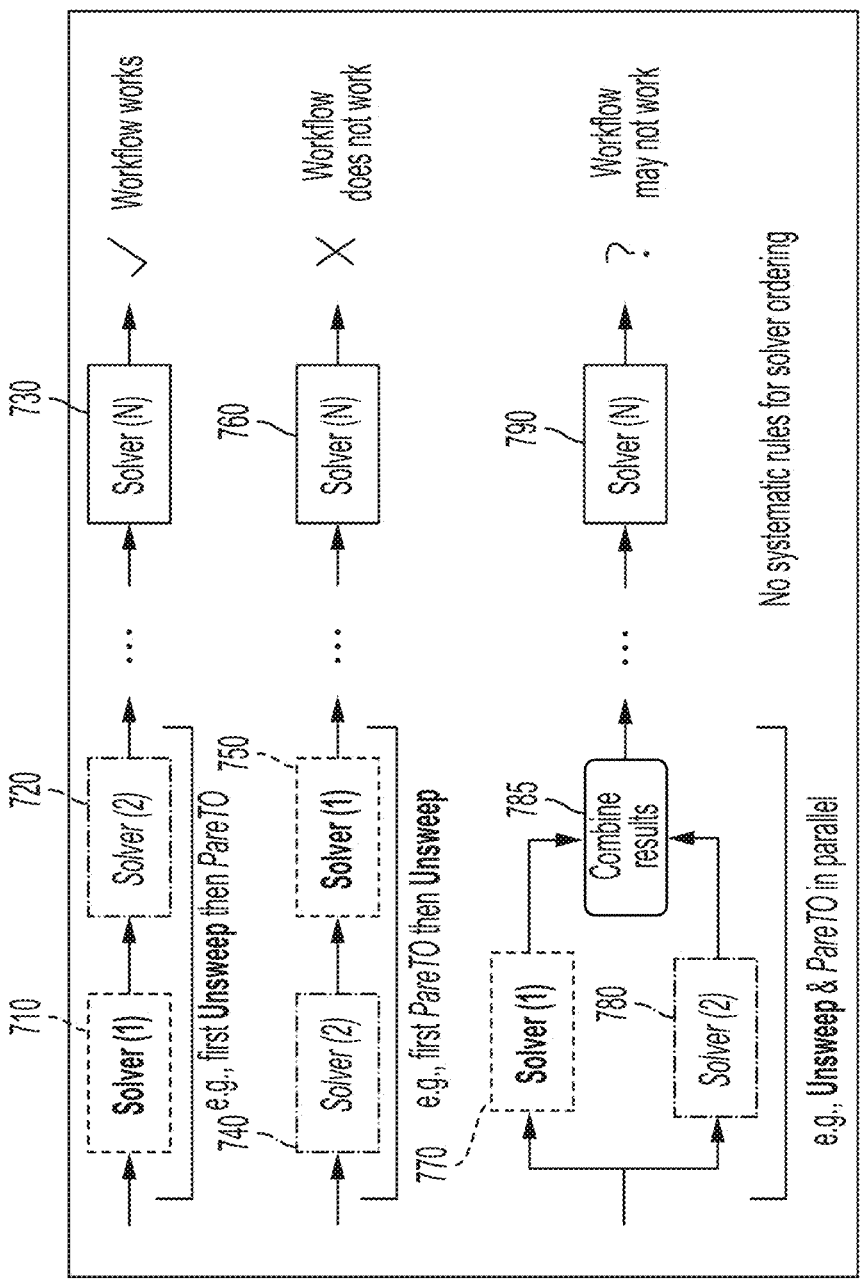
FIG. 7 illustrates an example design optimization framework that may or may not result in a feasible design in accordance with embodiments described herein.

Solving heterogeneous (e.g., kinematic, physical, and manufacturing) constraints with multidisciplinary solvers is difficult. Each solver might make decisions with care for its target subset of constraints while potentially violating the rest of the constraints. FIG. 7 illustrates an example design optimization framework that may or may not result in a feasible design. Arranging multiple solvers sequentially may work in some orders and fail in others, depending on what properties they preserve. The first example 700 shows the solvers Unsweep 710 and PareTO 720 called in series with the Unsweep solver being called first as described previously in conjunction with FIG. 3. According to various configurations, one or more other solvers 730 may be used to generate a final feasible design. The second example 735 again shows the solvers Unsweep 750 and PareTO 740. In this case, the PareTO solver 740 is called first. One or more additional solvers 760 may be called depending on the given constraints. In this example, there are no feasible designs.

The third example, 765 shows the Unsweep solver 770 and the PareTO solver 780 called in parallel. The results of the Unsweep solver 770 and the PareTO solver 780 are then combined 785 as described in conjunction with FIG. 2. One or more additional solvers 790 may be called depending on the given constraints. The order of this example may result in feasible designs. Parallel composition requires combining solutions in ways that do not always preserve the properties either. A two-phase approach that includes design space pruning and design space exploration may be used to create feasible designs. The former invokes IP-solvers in an arbitrary order to cut out the infeasible design subspace without premature optimization. The latter navigates the pruned design space by fixed-point iterations over FP-solvers.

In addition or as an alternative to the above examples of performance and manufacturing requirements, there may be other design criteria that involve spatial reasoning about the interactions of moving (translating and rotating) shapes such as collision avoidance, packaging, robot motion planning, and accessibility analysis. These requirements cannot be easily enforced by design rules, TSF filtering, or other techniques commonly used in TO. Rather, they are often expressed as set constraints, i.e., statements in the language of sets (e.g., in terms of affine transformations, Boolean operations, and containment) rather than the language of real-valued functions used for (in)equality constraints in TO. A broad class of inverse problems in practical design and manufacturing reduce to solving set constraints formulated in the configuration space of rigid motions.

Although the problems with set constraints are common, they are not mainstream in design/optimization workflows due to non-smoothness and computational intensity. There are instances of TO frameworks that deal with motion-related problems in an ad hoc manner; for instance, in modeling collision and contact when designing compliant mechanisms and/or parts made of hyperelastic materials that undergo large deformations part. It may not be immediately obvious how set constraints can be incorporated in a systematic fashion into the design/optimization process without incurring prohibitive computation costs of spatial analysis at every iteration. Some examples present a different classification of constraints that enables design space pruning and exploration, in which set constraints are also restated in terms of (in)equalities of functions.

According to embodiments described herein, solvers that reduce material from a bounded domain in 2D and 3D space are used to generate designs. When all objectives and constraints cannot be handled by a single solver, current practice relies on a case-by-case domain-specific analysis to properly construct workflows FIG. 7 depicts examples of combining Unsweep and PareTO. An arrangement that works in one case may not work in another.

Solvers described herein may be classified into two fundamental types:

1. Design space pruning solvers restrict the feasible design space by pruning the subspaces that violate one or more design criteria. They are permutative, meaning that they can be called at the beginning of the design workflow in an arbitrary order. By directly operating on the design subspaces as first-class entities, they postpone optimization to downstream solvers; and 2. Design space exploration solvers simultaneously explore the (pruned) design subspaces for optimized solutions.

Figure 8:
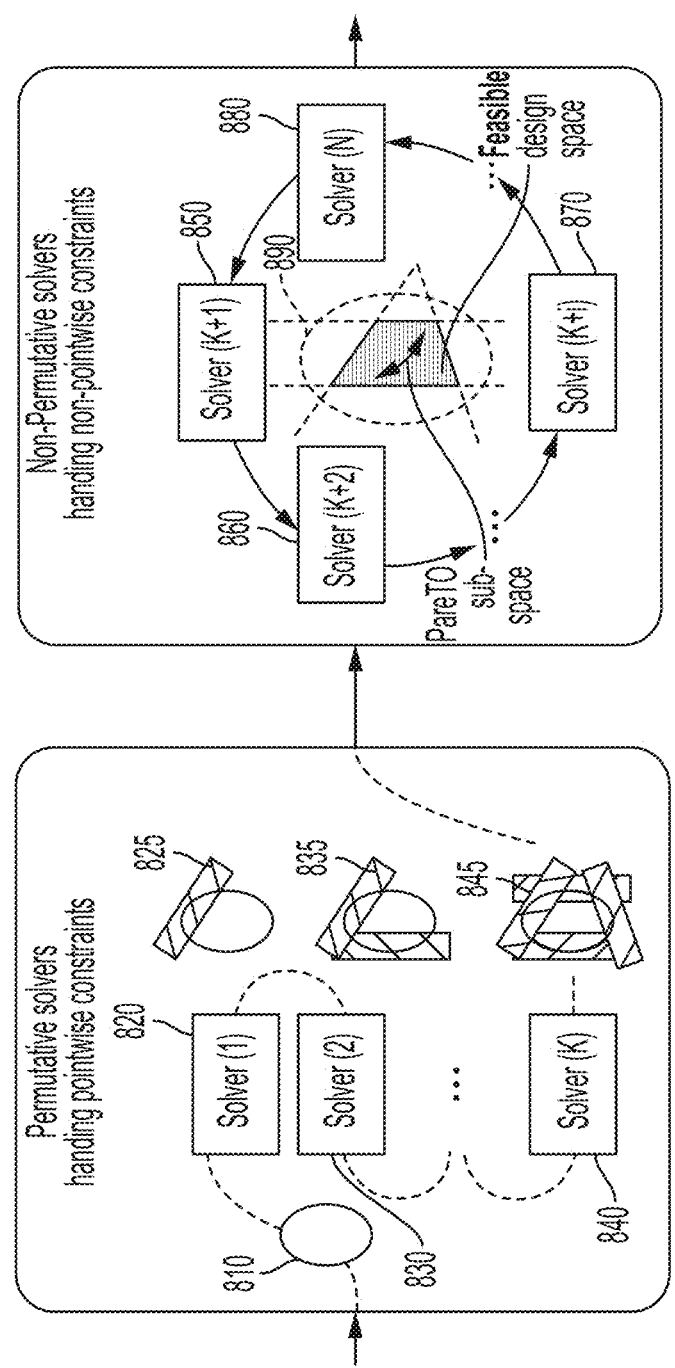
FIG. 8 shows a design optimization framework using design space pruning and design space exploration in accordance with embodiments described herein.

FIG. 8 shows a design optimization framework using design space pruning and design space exploration in accordance with embodiments described herein. Initial design constraints 810 are input into the framework. One or more design space pruning solvers 820, 830, 840 are called in series in an arbitrary and each output an optimized design based 825, 835, 845 on the previous solvers optimized design. Once the pruning stage is complete, one or more design space exploration solvers 850, 860, 870, 880 are used to explore the PareTO subspace to create one or more final optimized designs.

Figure 9A:
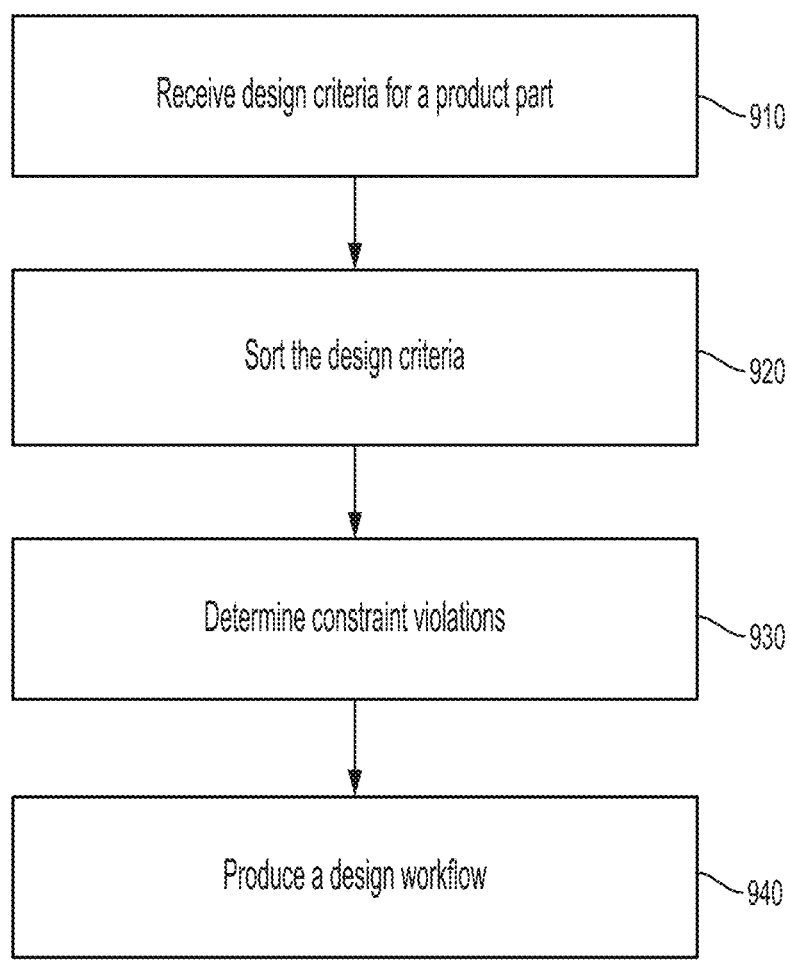
FIG. 9A illustrates a process for classifying design criteria in accordance with embodiments described herein.

FIG. 9A illustrates a process for classifying design criteria in accordance with embodiments described herein. Design criteria for a product part are received 910. According to various implementations, the design criteria are received via a user interface, for example. The design criteria may comprise one or both of performance and manufacturing criteria. The design criteria are sorted 920 into different classes of one or both of one or more objective functions and one or more constraints based on when they can be satisfied or optimized. Constraint types comprise one or more of set constraints, equality constraints, and inequality constraints. According to embodiments described herein, constraint scopes comprise one or more of global, local, and strictly local. Constraint violations are determined 930. A design workflow is produced 940 to generate one or more designs of a part to comply with one or more of satisfying constraints and optimizing objective functions.

Various configurations involve computing one or more performance fields of the one or more designs. The one or more objective functions are evaluated functions based on the performance fields. The one or more designs are ordered based on the evaluated objective functions. According to various embodiments, one or more constraint violations are computed based on the performance fields and it is determined whether the one or more designs are feasible based on the computed constraint violations.

Figure 9B:
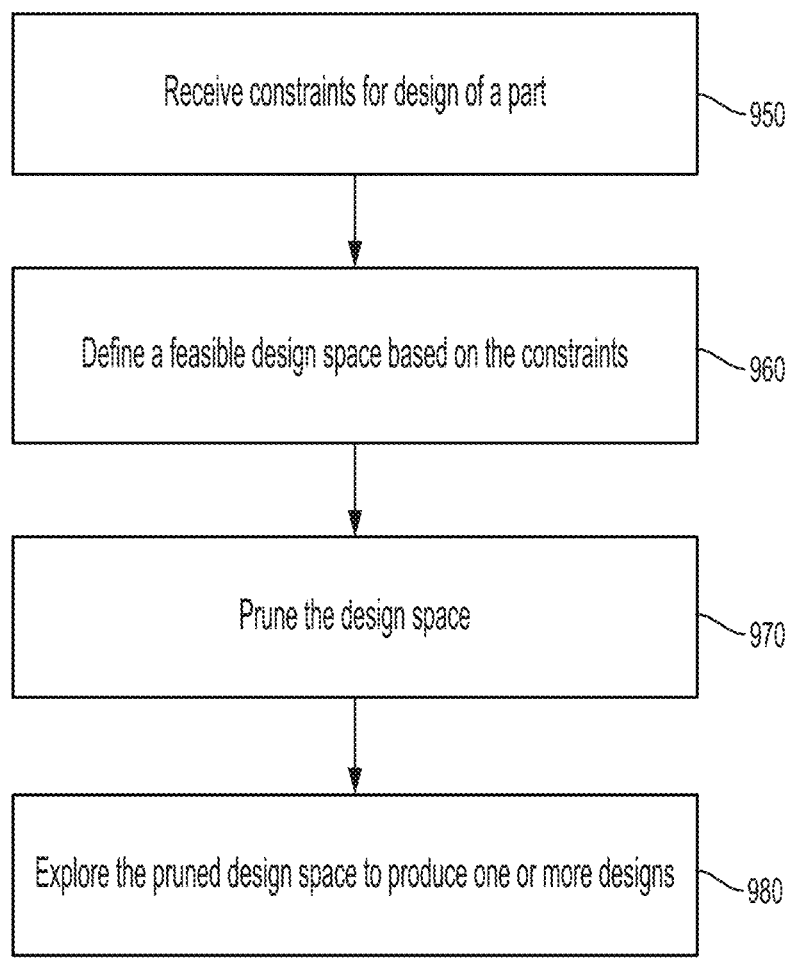
FIG. 9B shows a method for producing feasible part designs in accordance with embodiments described herein.

FIG. 9B shows a method for producing feasible part designs in accordance with embodiments described herein. One or more constraints for a design of a product part are received 950. According to various implementations, the one or more constraints are received via a user interface. A feasible design space is designed 960 based on the one or more constraints. The design space is pruned 970 based on a subset or all of the one or more constraints. The pruned design space is explored 980 to produce one or more feasible part designs.

Various configurations involve evaluating point membership tests based on one or more feasibility predicates defined by pointwise constraints and computing maximal designs to represent the feasible design space with respect to the pointwise constraints. According to various embodiments, a measure of global changes of each of a plurality of constraint violations due to local variations in the one or more designs is computed. A topological sensitivity field (TSF) may be determined by combining the measures of global changes of each of the plurality of constraint violations, the TSF configured to guide design space exploration to produce the feasible designs. According to various implementations, defining the feasible design space comprises using one or more of a density-based, a levelset shape, and a topology optimization approach. The one or more designs may be optimized using augmented Lagrangians.

FP-solvers (e.g., FEA and manufacturability analysis) map an instance of the design space (i.e., a "design") to an instance of the performance space (i.e., a "field-tuple"). Predicates are defined to decide whether the design is satisfactory with respect to constraints in terms of performance variables. An IP-solver modifies the design until all constraints are satisfied.

Figure 10:
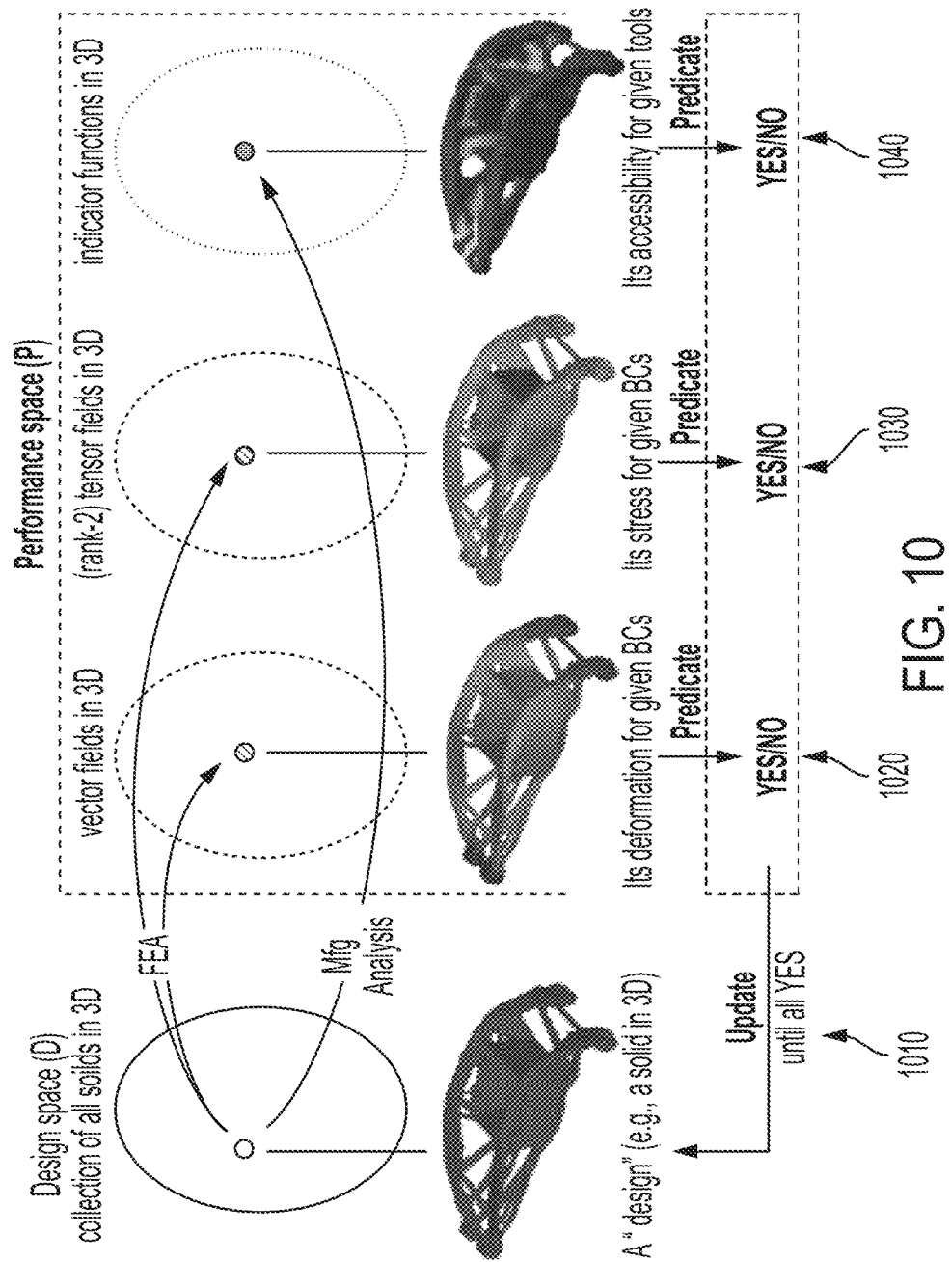
FIG. 10 illustrates how solving forward problems by different FP-solvers is abstracted by mapping a design (geometry and material properties) to different fields such as deformation, stress, and accessibility fields in accordance with embodiments described herein.

FIG. 10 illustrates how solving forward problems by different FP-solvers is abstracted by mapping a design (geometry and material properties) to different fields such as deformation, stress, and accessibility fields in accordance with embodiments described herein. Each field is evaluated against the constraints, whose satisfaction are captured by the binary predicates. Inverse problem solving by IP-solvers involves updating the design until all constraints are satisfied.

The 'performance' of a given design $\Omega \in D$ is an n-tuple $\mathcal{A}(\Omega) := (\mathcal{A}_1(\Omega), \ldots, \mathcal{A}_n(\Omega))$. Think of the performance space as a product space $P := (F_1 \times \ldots \times F_n)$, where each $F_i$ is a class of fields, i.e., each $\mathcal{A}_i \in F_1$ is an integrable field $\mathcal{A}_i(\Omega): \Omega_0 \to \mathbb{Q}_i$ over the design domain $\Omega_0$ whose value at a given "query point" $x \in \Omega_0$ is denoted by $\mathcal{A}_i(x; \Omega) := (\mathcal{A}_i(\Omega))(x) \in \mathbb{Q}_i$. Examples of such fields are:

binary-valued fields ($\mathbb{Q}_i := \{0,1\}$), used to describe indicator functions of regions of interest within the design domain such as non-manufacturable features or regions requiring design correction.

integer-valued scalar fields ($\mathbb{Q}_i := \mathbb{Z}$), used to characterize local topological properties of 3D printed parts or to classify atomic units of manufacturing in hybrid (combined AM and SM) manufacturing.

real-valued scalar fields ($\mathbb{Q}_i := \mathbb{R}$), 3D vector fields ($\mathbb{Q}_i := \mathbb{R}^3$), and higher-rank tensor fields used to represent distributed physical quantities such as displacement, velocity, stress, strain, and so on, or manufacturability measures.

Forward problem solvers (FP-solvers) map a given design instance to one or more performance fields, hence can be viewed as implementations of one or more maps $\mathcal{A}_i: D \to P_i$. The entire forward problem, solved by one or more FP-solvers, can be viewed as a single map from design space to performance space $\mathcal{A}: D \to P$, which has a unique outcome for a given design.

For example, consider a finite elements analysis (FEA) FP-solver that computes (discretized forms of) a displacement field $u_\Omega := \mathcal{A}_1(\Omega)$ for small deformations of a given design $\Omega \in D$ due to boundary conditions such as restraints and external forces. It also may be important to compute the stress field $\sigma_\Omega := \mathcal{A}_2(\Omega)$, which depends locally on displacement and material properties (e.g., the linear elasticity law). The vector/tensor values of solution fields probed at a query point $x \in \Omega_0$ are denoted by $u_\Omega(x) = \mathcal{A}_1(x; \Omega)$ and $\sigma_\Omega(x) = \mathcal{A}_2(x; \Omega)$. In this case, both functions are zero outside the design, i.e., $\mathcal{A}_{1,2}(x; \Omega) = 0$ if $x \in (\Omega_0 - \Omega)$. FEA solves the weak form of the governing differential equation, discretized into a linear system (e.g., using hat functions) $[K_\Omega][u_\Omega] = [f]$, where the stiffness matrix $[K_\Omega]$ and external load vector $[f]$ depend on the design shape and material properties, as well as boundary conditions. The equations are solved to obtain the discrete form of the displacement field $[u_\Omega]$ from which the discrete form of the stress field $[\sigma_\Omega]$ is computed by linear operations.

Another example is accessibility analysis for machining (e.g., milling or turning). For instance, consider an FP-solver for 3-axis milling simulation, which computes (discretized forms of) a volumetric measure of inaccessibility as a field $\mu_\Omega(x) := \mathcal{A}_3(\Omega)$ for a given design $\Omega \in D$ and machine tool parameters. This measure at a query point $x \in \Omega_0$, denoted by $\mu_\Omega(x) = \mathcal{A}_3(x; \Omega)$, returns the penetration volume of the moving tool assembly $T = (H \cup C)$, including the holder H and cutter C, into the stationary obstacles $O_\Omega = (\Omega \cup F)$, including target form f and fixtures F. The solver computes the discrete form of this field (e.g., sampled at point clouds or voxels) $[\mu_\Omega]$ as a convolution between the discrete forms of the indicator functions of stationary solids $[1_{O_\Omega}]$ and moving solids $[1_T]$ using a fast Fourier transform (FFT). The maximal set of accessible configurations—in this case, pure translations in 3D for a fixed orientation—is then obtained as the null set $M_\Omega = \mu_\Omega^{-1}(0)$, i.e., the translations that do not lead to undesirable collisions. The maximal removable volume is obtained by sweeping the cutter with the maximal motion, i.e., $R_\Omega := \text{sweep}(M_\Omega, C)$. Its indicator function $1_{R_\Omega}(x) = \mathcal{A}_4(x; \Omega)$ can be viewed as a predicate for accessibility, i.e., it returns 1 (resp. 0) if the query point $x \in \Omega_0$ is (resp. is not) accessible. The discrete form of this binary field $[1_{R_\Omega}]$ can also be obtained by thresholding FFT-based convolution of discrete forms $[1_{M_\Omega}]$ and $[1_C]$.

The computations performed by the above two FP-solvers (FEA and accessibility analysis) are abstracted by $\mathcal{A} := (\mathcal{A}_1, \mathcal{A}_2, \mathcal{A}_3, \mathcal{A}_4)$ that maps a given design to a "field tuple" that represents analysis results. FIG. 10 illustrates one instance of each such field for a topologically optimized bracket.

Inverse problem solvers (IP-solvers), on the other hand, find one or more designs that satisfy a given collection of functional requirements. Most IP-solvers employ an iterative process to:

1. generate one or more valid candidate design(s);
2. perform analysis on the candidate design(s) to compute the performance(s) of interest (using one or more FP-solver(s));
3. evaluate the performance(s) against given functional requirements; and,
4. if the requirements are not met, decide on the next generation of candidate design(s) based on the current evaluation and update rules.

The process is repeated until the requirements are met. The evaluation process (item 3) can be conceptualized a finite number of predicates defined over the performance space as maps $c_i: D \to \{0,1\}$ for $i = 1, 2, \ldots, n$. Each predicate's outcome $c_i(\Omega) \in \{0,1\}$ is determined by means of a constraint imposed on the performance field $\mathcal{A}_i(\Omega) \in F_i$ simulated by an FP-solver as shown in (1). Without loss of generality, it can be assumed that every requirement depends on one performance field only. If more than one field is used in calculating a predicate, those fields can be tupled into another field. If more than one requirement is computed on one field, it can be thought of as two copies of the same field.

$$c_i(\Omega) \approx \begin{cases} 1 & \text{if the } i^{th} \text{ constraint is satisfied,} \\ 0 & \text{otherwise.} \end{cases} \quad (1)$$

These can be (in)equality constraints, which are common in physics-based design formulations as in TO, and set constraints, which are ubiquitous in design under kinematics-based constraints such as packaging, assembly, and accessibility for manufacturing.

According to embodiments described herein, the performance criteria evaluation can be thought of as a map $c := (c_1, c_2, \ldots, c_n): D \to \{0,1\}^n$ i.e., $c(\Omega)$ is a binary string whose bits indicate whether a given design satisfies each of the criteria. A design $\Omega \in D$ is called 'feasible' if it simultaneously satisfies all criteria, i.e., $c(\Omega) = (1, 1, \ldots, 1)$. The feasible design subspace $D^* \subseteq D$ is the subset of all feasible designs, defined as in (2).

$$D^* := \{\Omega \in D | c(\Omega) = 1^n\} =: c^{-1}(1). \quad (2)$$

Here, $(\cdot)^{-1}$ denotes inversion of a mathematical relation. Given f: $X \to Y$, $f^{-1}(y) = \{x \in X | f(x) = y\}$. Note that in general, $f^{-1}(y) \subseteq X$ is a set, i.e., $f^{-1}: Y \to \mathcal{P}(X)$. It is a singleton set (i.e., has one element) if the function is bijective.

Unlike forward problems, inverse problems have non-unique, often infinitely many, solutions (i.e., $|D^*| > 1$). The feasible design space can also be defined as the intersection of the feasibility halfspaces $H_i := c_i^{-1}(1)$, each implicitly describing one of the design subspaces that satisfy one criterion at-a-time as shown in (3).

$$D^* = \cap_{1 \leq i \leq n} c_i^{-1}(1) = D - \cup_{1 \leq i \leq n} c_i^{-1}(0). \quad (3)$$

The idea of design space pruning is to progressively cut out portions of the design space that violate any one of the criteria. Theoretically, pruning can be done in an arbitrary order-noting that intersections or unions of the halfspace in (3) are permutative. Computationally, however, it is only possible if the design subspaces $H_i = c_i^{-1}(1)$ can be manipulated by algorithms as first-class entities. The goal is to understand under what conditions such manipulations are possible and how an entire design subspace can be represented.

The predicates introduced earlier are implemented in practice by testing whether a candidate design's performance satisfies an (in)equality constraint. Note that every equality constraint $g(\cdot) = 0$ can be represented by two inequality constraints g(·)≤0 and ¬g(·)≤0. Such constraints can be classified into three types; namely, global, local, and strictly local (in)equality constraints.

It is common to have design criteria specified in terms of global constraints $g_i(\Omega) \leq 0$, i.e., by defining a predicate of the general form as shown in (4).

$$c_i(\Omega) \approx \begin{cases} 1 & \text{if } g_i(\Omega) \leq 0, \\ 0 & \text{otherwise.} \end{cases} \quad (4)$$

Here, $g_i: D \to R$ is a function of the entire shape of the design $\Omega \in D$, potentially in addition to fixed external factors such as boundary conditions, manufacturing process parameters, packaging envelope, operating conditions (e.g., motion in assembly), etc. The constraint is often evaluated in terms of a global property of an entire performance field $\mathcal{A}_i(\Omega) \in F_i$, e.g., as an upper/lower-bound on its maximum/minimum or its integral properties such as p-norms. This is denoted by $g_i(\Omega) = \bar{g}_i(\mathcal{A}_i(\Omega))$ where $\bar{g}_i: D \to R$. For example, one can constrain the maximal displacement or maximal stress of a solid under external loads (FIG. 3.1) by using the following constraints in (4)

$$g_1(\Omega) = \bar{g}_1(u_\Omega) \approx \max_{x \in \Omega} \|u_\Omega(x)\| - u_{UB}, \quad (5)$$

$$g_2(\Omega) = \bar{g}_2(\sigma_\Omega) \approx \max_{x \in \Omega} \|\sigma_\Omega(x)\| - \sigma_{UB}, \quad (6)$$

Here, $u_{UB}, \sigma_{UB} > 0$ are constant upper-bounds on the magnitude of the displacement vector and stress tensor, captured by the constraints $g_1(\Omega) \leq 0$ and $g_1(\Omega) \leq 0$, respectively. One can in general use the p-norm of the fields for finite (but large) $p \geq 1$, noting that maximum is a special case as $p \to \infty$. This is especially useful to smooth out the possible singularities (e.g., infinite stress, due to stress concentrations).

According to embodiments described herein, (7) is another example to constrain a design to be manufacturable via machining, using the accessibility analysis mentioned earlier.

$$g_3(\Omega) = \bar{g}_3(1_{R_\Omega}) := \int_{\Omega_0 - \Omega} \neg 1_{R_\Omega}(x) dv[x] - V_{UB}, \quad (7)$$

Here, $\neg 1_{R_\Omega}(x) = 1 - 1_{R_\Omega}(x)$ is a negation. This constraint restricts the total volume of inaccessible regions $R_\Omega \subseteq \Omega^c$, obtained as the 1-norm of their indicator function, by an upper-bound $V_{UB} > 0$.

According to embodiments described herein, it is sometimes possible to define a predicate in terms of local constraints evaluated at a specific point in the design domain; for instance, using one or both of (8) and (9).

$$c_i(\Omega) \approx \begin{cases} 1 & \text{if } \forall x \in \Omega_0: g_i(x; \Omega) \leq 0, \\ 0 & \text{otherwise.} \end{cases} \quad (8)$$

$$c_i(\Omega) \approx \begin{cases} 1 & \text{if } \exists x \in \Omega_0: g_i(x; \Omega) \leq 0, \\ 0 & \text{otherwise.} \end{cases} \quad (9)$$

Note that the two alternative forms are different by the "for all" and "there exists" quantifiers, which may lead to different global implications. Unlike the case with (4), here $g_i: (\Omega_0 \times D) \to R$ is field for a fixed design $\Omega \in D$, i.e., is also a function of the query point $x \in \Omega_0$. In turn, the constraint is evaluated based on the probed value of the performance field $\mathcal{A}_i(x; \Omega) \in \mathbb{Q}_i$ (generally, a tensor at the query point. This dependency is denoted by $g_i(x; \Omega) = \bar{g}_i(\mathcal{A}_i(x; \Omega))$ where $\bar{g}_i: \mathbb{Q}_i \to R$. For example, the global displacement and stress bounds mentioned earlier can be imposed locally as shown in (10) and (11).

$$g_1(x;\Omega) = \bar{g}_1(u_\Omega(x)) := \|u_\Omega(x)\| - u_{UB}, \quad (10)$$

$$g_2(x;\Omega) = \bar{g}_2(\sigma_\Omega(x)) := \|\sigma_\Omega(x)\| - \sigma_{UB}, \quad (11)$$

It is easy to verify that using (10) and (11) with (8) is equivalent to using (5) and (6) with (4) in this example. In general, local constraints $g_i(x; \Omega) \leq 0$ used with "for all" or "there exists" quantifiers in (8) and (9) can be equivalently expressed as global constraints (stated independently of $x \in \Omega_0$) via min/max, respectively:

$$[\forall x \in \Omega_0: g_i(x; \Omega) \leq 0] \Leftrightarrow \max_{x \in \Omega_0} g_i(x; \Omega) \leq 0, \quad (12)$$

$$[\exists x \in \Omega_0: g_i(x; \Omega) \leq 0] \Leftrightarrow \max_{x \in \Omega_0} g_i(x; \Omega) \leq 0. \quad (13)$$

As another example, consider the accessibility analysis discussed earlier. Instead of constraining the total volume of inaccessible regions via the global constraint of (7), the inaccessibility measure can be locally constrained as shown in (14).

$$g_4(x;\Omega) = \bar{g}_4(\mu_\Omega(x)) := (1_{O_\Omega} * 1_{-T})(x) - \mu_0, \quad (14)$$

Here, $O_\Omega = (\Omega \cup F)$ and $T = (S \cup C)$ are the stationary and moving solids, respectively. $\mu_0 > 0$ is a small constant to provide allowance for numerical errors. The convolution operator $*$ is defined as:

$$(1_{O_\Omega} * 1_{-T})(x) = \int_{\Omega_0} 1_\Omega(x') 1_{-T}(x-x') dv[x'], \quad (15)$$

Here, $1_{-T}(X) = 1_T(-x)$ is a reflection with respect to the origin, hence $1_{-T}(x-x') = 1_T(x'-x)$ is the indicator function of the moving object (i.e., tool assembly), translated to the query point $x \in \Omega_0$. The integral is nonzero at integration points $x' \in \Omega_0$ that belongs to the interference of the translated object with the stationary obstacles.

It is not always possible to convert global constraints to local constraints or vice versa, without defining new performance variables, e.g., in terms of the norms of existing performance fields. When $\mathcal{A}_i(x; \Omega)$ is decidable independently of $\Omega \in D$, the above two constraints lead to maximal/minimal feasible designs (in set-theoretic terms).

A special case of (8) occurs if the predicate is decidable without a priori knowledge of the design itself. In other words, the constraints can be evaluated purely from a knowledge of the query point's position $x \in \Omega$ and external factors, if any (e.g., a known rigid body motion applied to the entire design). The predicate's result can be obtained without knowing of the overall shape of the design. This is the case if $\mathcal{A}_i(x; \Omega) = \mathcal{A}_i^*(x)$, i.e., the forward problem's solution can be evaluated pointwise—emphasized by the overline notation. The corresponding constraint $g_i^*(x) := \bar{g}_i(\mathcal{A}_i^*(x)) \leq 0$ is hereafter called a strictly local (i.e., pointwise) constraint. The predicates in (8) or (9) in this case are dependent on $\Omega$ only due to the logical quantifiers for the pointwise testing as shown in (16) and (17).

$$c_i(\Omega) \approx \begin{cases} 1 & \text{if } \forall x \in \Omega: g_i^*(x) \leq 0, \\ 0 & \text{otherwise.} \end{cases} \quad (16)$$

$$c_i(\Omega) \approx \begin{cases} 1 & \text{if } \exists x \in \Omega: g_i^*(x) \le 0, \\ 0 & \text{otherwise.} \end{cases} \quad (17)$$

Hence, one can define pointwise predicates in this case by (22)

$$c_i^*(x) \approx \begin{cases} 1 & \text{if } g_i^*(x) \le 0, \\ 0 & \text{otherwise.} \end{cases} \quad (18)$$

According to embodiments described herein, the pointwise predicate defines a point membership classification (PMC) that implicitly determines the entire feasibility halfspace $H_i = c_i^{-1}(1)$ using its "representative" maximal/minimal feasible design $\Omega_i^*: = c_i^{*-1}(1)$ using (16) or (17), respectively.

The physics-based constraints exemplified earlier might reduce to pointwise constraints in rare examples—e.g., the stress tensor $\sigma^*(x)$ for hydrostatic pressure in a liquid container at rest depends on the query point's depth from the surface, but not on the container's designed shape. Nevertheless, pointwise constraints are ubiquitous in kinematics-based constraints that are central to applications ranging from assembly and packaging to manufacturing.

Many kinematics-based design criteria lead to constraints expressed in the algebra of sets. A common form of set constraints is in terms of containment: $\Gamma(\Omega) \subseteq E$ (for a fixed envelope $E \subseteq R^d$). The exact same constraint can be written in terms of non-interference: $(\Gamma(\Omega) \cap O) = \emptyset$ (for a fixed obstacle $O \subseteq R^d$), where $\Gamma: D \to \mathcal{P}(R^d)$ is a set transformation and $E := O^c$ (i.e., complement of O).

At a first glance, these constraints appear to have a completely different form than the inequality constraints described previously in the algebra of fields. Here, it is shown that set constraints may always be reformulated as (global or local) inequality constraints by virtue of describing sets with their indicator functions. However, converting them to strictly local (i.e., pointwise) constraints is possible under certain conditions.

According to embodiments described herein, for every solid $\Omega \in D$, its indicator (i.e., characteristic) function $1_\Omega: \Omega_0 \to \{0,1\}$ is defined by (19).

$$1_\Omega(x) \approx \begin{cases} 1 & \text{if } x \in \Omega, \\ 0 & \text{otherwise,} \end{cases} \text{ i.e., } \Omega = 1_\Omega^{-1}(1). \quad (19)$$

Hence, every containment constraint is restated as an inequality constraint of the form used in (8) as shown in (20).

$$\Gamma(\Omega) \subseteq E \rightleftharpoons [\forall x \in R^d: 1_{\Gamma(\Omega)}(x) \le 1_E(x)], \quad (20)$$

i.e., using the standard form $1_{\Gamma(\Omega)}(x) - 1_E(x) \le 0$.

The above inequality constraint of (20) can also be rewritten as a global constraint of the form used in (4) by upper-bounding the maximum as shown in (21).

$$\Gamma(\Omega) \subseteq E \rightleftharpoons \max_{x \in R^d} [1_{\Gamma(\Omega)}(x) - 1_E(x)] \le 0, \quad (21)$$

Notice that no assumption is made regarding the properties of the pointsets $\Gamma(\Omega), E \subseteq R^d$. In most practical scenarios, both are solids within a bounded domain, taken as the design domain $\Omega_0 \in D$. In such cases, the properties of the mapping and envelope can be exploited to compute the maximum in (21) efficiently.

Moreover, if the set constraint $(\Gamma(\Omega) \cap E^c) = \emptyset$ is in terms of regularized intersection, it can be rewritten as a global (in)equality constraint in terms of the volume $vol(\Gamma(\Omega) \cap E^c) = 0$ (or $\le 0$, for consistency), which, in turn, is an inner product of indicator functions:

$$vol(\Gamma(\Omega) \cap E^c) = \langle 1_{\Gamma(\Omega)}, \neg 1_E \rangle \quad (22)$$

$$= \int_{R^d} \neg 1_{\Gamma(\Omega)}(x) 1_E dv[x]. \quad (23)$$

Further, if $\Gamma(\Omega)$ is a rigid transformation of $\Omega$, the inner product turns into a convolution of $1_\Omega$ and $\neg 1_E$ over the configuration space of motions.

Let us consider the inaccessibility analysis one more time. For manufacturing with precision requirements (e.g., for assembly/fit), the inaccessible regions $\Gamma(\Omega) := (\Omega_0 - \Omega) - R_\Omega$ can be restricted to be completely contained within a tolerance zone $E \subseteq R^d$, hence formulating the problem as a set constraint $\Gamma(\Omega) \subseteq E$. It has been shown that:

$$\Gamma(\Omega) = (\Omega_0 - \Omega) - \text{sweep}(M_\Omega, C) \quad (24)$$

$$= (\Omega_0 - \Omega) - (M_\Omega \oplus C) \quad (25)$$

$$= (\Omega_0 - \Omega) - ((\Omega \oplus (-T))^c \oplus C) \quad (26)$$

$$= (\Omega_0 - \Omega) - ((\Omega^c \ominus (-T)) \oplus C), \quad (27)$$

Here, the operators $(\cdot)^c, \cup, \cap, -, \oplus, \ominus$ are all regularized to ensure their algebraic closure within the design space D and where $T = (H \cup C)$ represents the tool assembly, including the holder H and the cutter C. It is understood that Minkowski sums in (26) can be obtained from the 0-superlevel set of the convolution fields of the participating sets. In general, $Y = (X_1 \oplus X_2) \rightleftharpoons 1_Y = \text{sign}(1_{X_1} * 1_{X_2})$. More precisely:

$$1_{\Gamma(\Omega)} = \neg 1_\Omega - \text{sign}(\neg \text{sign}(1_\Omega * 1_{-T}) * 1_C), \quad (28)$$

Here, * is the convolution operator in $R^d$ and $\text{sign}(x) = 1$ (resp. 0) if $x > 0$ (resp. $x \le 0$) is the sign function. The latter is may be needed to convert the real-valued convolutions to binary-valued indicator functions.

In summary, set constraints, as defined here in terms of containment or non-interference, may always be restated as global or local inequality constraints. Here, the conditions under which set constraints can be converted to strictly local (i.e., pointwise) constraints is shown, to enable design space pruning.

Depending on the properties of $\Gamma: D \to \mathcal{P}(R^d)$, the inequality constraint $1_{\Gamma(\Omega)}(x) - 1_E(x) \le 0$, used in global or local forms of (20) and (21), respectively, may or may not be restated as a strictly local (i.e., pointwise) constraint. The goal in this here is to articulate the conditions under which this is possible.

To enable pointwise formulation, the dependency of the PMC for $\Gamma(\Omega)$ on $\Omega$ is eliminated so that $1_{\Gamma(\Omega)}(x)$ on the left-hand side of the inequality constraint in (20) depends only on the query point $x \in \Omega_0$ and the fixed envelope $E \subseteq R^d$. This can be done if the set transformation $\Gamma$ is itself a pointwise transformation, meaning that it can be defined by extending a transformation of 3D points $\gamma: (R^d \text{ or } \Omega_0) \to$ $\mathcal{P}(R^d)$ to a transformation of 3D pointsets $\Gamma: D \to \mathcal{P}(R^d)$ by simply applying the former to every point of the pointset and unifying the results:

$$\Gamma(\Omega) := \bigcup_{x \in \Omega} \gamma(x) = \{x' | x' \in \gamma(x), x \in \Omega\}. \tag{29}$$

Note that $\gamma(x)$ is itself a pointset, not a point, to capture the most general case. For example, it can be a curve segment or surface patch representing the 1D or 2D trajectory of a point under a given one- or two-parametric motion, respectively.

The above refactoring is possible for many applications. For example, if the design has to move (when deployed in assembly) according to a known motion set $M \subseteq SE(3)$ without exiting a safe region of space $E \subseteq R^d$ that contains no obstacles, the above constraint can be used with $\Gamma(\Omega)$: =sweep($M, \Omega$), where $$\text{sweep}(M,\Omega) = \bigcup_{\tau \in M} \tau\Omega = (\tau x | \tau \in M, x \in \Omega), \tag{30}$$

This is the sweep of the designed part as it travels by the given motion (known a priori). In this case the sweep indicator function $1_{\Gamma(\Omega)}$ can be directly obtained as follows:

$$1_{\Gamma(\Omega)}(x) = 1 \; \textit{iff} \; \exists \tau \in M : x \in \tau\Omega, \text{ i.e., } \tau^{-1}x \in \Omega, \tag{31}$$

According to embodiments described herein, a PMC test for $\Gamma(\Omega)$ can be obtained by applying the inverse motion $M^{-1} = \{\tau^{-1} | \tau \in M\}$ to the query point and checking if it intersects the design. The inequality constraint in (21) can thus be computed rapidly by sampling query points in the design domain and testing intersections of their inverse trajectories with the design. The computation for one point does not necessarily need one to have explicit knowledge of the results for other points. Other than perfect parallelization (e.g., on GPU), this property enables pruning the design space—leading to development of the Unsweep solver discussed earlier-before optimizing the design for other criteria.

In general, for pointwise transformations as in (29), the global constraint $\Gamma(\Omega) \subseteq E$ can be restated as shown in (32).

$$\Gamma(\Omega) \subseteq E \Leftrightarrow [\forall x \in \Omega : \gamma(x) \subseteq E], \tag{32}$$

i.e., $\Omega$ remains within $E$ after a $\Gamma$-transform iff all points inside it remain within $E$ after a $\gamma$-transform. Note also that inequality constraint in (24) can now be rewritten in a pointwise fashion every $x \in \Omega$ as shown in (33).

$$\forall x \in \Omega : \forall x' \in R^d : 1_{\gamma(x)}(x') \leq 1_E(x'), \tag{33}$$

As with other inequality constraints, not every global or local set constraint can be converted to a pointwise set constraint. For example, the toleranced accessibility constraints $\Gamma(\Omega) \subseteq E$ for $\Gamma(\Omega)$: $=(\Omega_0 - \Omega) - \text{sweep}(M_\Omega, C)$ in (24) cannot be evaluated pointwise, because the maximal collision-free motion $M_\Omega = (\Omega \oplus (-T))^c$ depends on the global shape of $\Omega$, unlike the case with the fixed motion in the earlier example with Unsweep.

According to embodiments described herein, a fairly general formulation of a design problem subject to $n \geq 1$ heterogeneous (e.g., kinematics- and physics-based) constraints is shown.

Without loss of generality, let $n_C = n_G + n_L + n_P$ where $0 \leq n_G$, $n_L$, $n_P \leq n_C$ are the number of global, local, and strictly local (i.e., pointwise) constraints, respectively. All constraints, including set constraints, are expressed as inequality constraints for uniformity. The design problem is to identify the feasible design space $D^* = c^{-1}(1)$, stated as a constraint satisfaction problem:

Find $D^* \subseteq D$, such that for all $x \in \Omega \in D^*$:

$$g_i^*(x) \leq 0, \text{ for } 0 < i \leq n_P,$$

$$g_i(\Omega) \leq 0, \text{ for } n_P < i \leq n_P + n_G,$$

$$g_i(x;\Omega) \leq 0, \text{ for } n_P + n_G < i \leq n_C, \tag{34}$$

It is assumed that none of the $g_i(x; \Omega) \leq 0$ can be simplified into one of $g_i^*(x) \leq 0$ or $g_i(\Omega) \leq 0$ forms. Hereafter, the P-, G-, and L-subscripts are used for various notions related to pointwise, global, and local constraints, respectively; for instance, $D^* = D_P^* \cap D_G^* \cap D_L^*$ where $D_P^* = c_P^{-1}$ (1) is the design subspace that is feasible with respect to pointwise constraint alone, and so on. The design problem is solved in two phases, depicted in FIG. 8:

Phase 1

Prune the design space from D to $D_P^* = c_P^{-1}(1)$, i.e., solve the following (simpler) problem:

Find $D_P^* \subseteq D$, such that for all $x \in \Omega \in D_P^*$:

$$g_i^*(x) \leq 0, \text{ for } 0 < i \leq n_P. \tag{35}$$

According to embodiments described herein, the above problem can be solved by computing a maximal set $\Omega_P^*$: =maxD* in the partial ordering of designs via set containment.

Unfortunately, this is not possible for $D_G^*$ and $D_L^*$. In most cases, one can at best generate a finite sample of feasible designs that are superior in some way.

Phase 2

Explore the pruned design space $D_P^*$ to find a sample $D_{dom}^* \subset D^*$ of (locally) "Pareto-dominant" designs that satisfy the remaining constraints:

Find $D_{dom}^* \subset D_P^*$, such that for all $x \in \Omega \in D_{opt}^*$:

$$g_i(\Omega) \leq 0, \text{ for } n_P < i \leq n_P + n_G,$$

$$g_i(x;\Omega) \leq 0, \text{ for } n_P + n_G < i \leq n_C, \tag{36}$$

Pareto-dominance of $\Omega \in D_{dom}^*$ means that for some neighborhood $N(\Omega) \subseteq D_P^*$ and $\Omega \in N(\Omega)$ in the pruned design space, within which no other design is superior to $\Omega$ with respect to all objective functions $f_1, f_2, \ldots, f_{n_O}: D \to R$. This can be posed as a minimization problem shown in (37).

$$\text{Find } \Omega \in D_P^* \text{ to } \begin{cases} \text{minimize } f_j(\Omega), \text{ for } 0 < j \leq n_O, \\ \text{subject to constraints in (36).} \end{cases} \tag{37}$$

Here, $N(\Omega)$ is an open set in the induced Hausdorff topology of $D_P^* = \mathcal{P}^*(\Omega^*)$ (all solid subsets of the maximal element). The objective functions define another partial ordering over the pruned design space, whose maximal elements are sought, i.e., $D_{dom}^* := \text{maxD}$.

The above problem may be solved by iterative optimization guided by TSF. The TSF is defined with respect to global objective functions $f_j(\Omega)$ and global constraints $g_i(\Omega) \leq 0$ and is penalized/filtered using local constraints $g_i(x; \Omega) \leq 0$. Since global optimization ($N(\Omega): =D_P^*$) is NP-hard, local optimality is used.

The example below shows how the design space can be pruned with respect to pointwise constraints (including set constraints) without premature optimization. The process is illustrated using examples from kinematics-based constraints that are common in assembly, packaging, and manufacturing.

The following results on the existence and uniqueness of maximal pointsets and their informational completeness as a representation for entire feasible design spaces are central to design space pruning.

Proposition 1 (Existence and Uniqueness) For every strictly local (i.e., pointwise) constraint $g_i^*(x) \leq 0$, its feasibility halfspace $H_i$ has a maximal element $\Omega_i^* = \text{maxH}_i$, defined implicitly by the following PMC test:

$$1_{\Omega_i^*}(x) \approx \begin{cases} 1 & \text{if } g_i^*(x) \le 0, \\ 0 & \text{otherwise,} \end{cases} \quad (38)$$

i.e., $\Omega_i^* \approx \{x \in \Omega_0 \mid g_i^*(x) \le 0\}$. (39)

The maximality is in terms of set containment, i.e., every satisfactory design is contained in the maximal element: $\Omega \in H_i \Rightarrow \Omega \subseteq \text{max} H_i$.

Proposition 2 (Completeness) For every strictly local (i.e., pointwise) constraint $g_i^*(\mathcal{A}_i(x)) \le 0$, its feasibility halfspace $H_i$ contains every solid $\Omega \subseteq \Omega_i^* = \text{max} H_i$, i.e., every solid subset of the maximal element is also feasible: $\Omega \subseteq \text{max} H_i \Rightarrow \Omega \in H_i$.

In terms of predicates, the design subspace $H_i = c_i^{-1}(1)$ (which satisfies (16)) can now be represented by a single design $\Omega_i^* = c_i^{-1}(1)$ (whose all points satisfy (18)). The maximal solid is thus a complete representation of the feasibility halfspace as the collection of all of its solid subsets denoted by $H_i = \mathcal{P}^*(\Omega_i^*)$.

Here is an intuitive but simplified reasoning:
1. The set $\Omega_i^*$ defined by (38) or (39) contains all points that satisfy the constraints.
2. Every solid subset $\Omega \subseteq \Omega_i^*$ of the maximal set satisfies the constraint, because all of its points satisfy the constraint independently of the global shape.
3. Conversely, every feasible solid $\Omega \in H_i$ is the subset of $\Omega_i^*$, because it only includes points that satisfy this constraint independently of the global shape.

Note that the constraint's independence of the shape of $\Omega$ is crucial for this to hold. For global or local constraints with dependency on $\Omega$ itself, attempting to write a PMC similar to (38) leads to a circular definition where the right-hand side depends on the set itself. For example, the (global or local) constraints on FEA and printability analyses do not lead to maximal elements because their constraints $g_i(\mathcal{A}_i(x; \Omega)) \le 0$ depend on particular design instances. It does make sense to define the maximal set of a feasible space (e.g., using the set-builder definition in (39)) in a way that it depends on a particular instance of that space. On the other hand, the set constraints, such as containment under a prescribed motion, may give rise to maximal elements.

The above reasoning does not take topological regularization into account—there is no reason for a maximal set obtained via (38) or (39) to be a solid, hence it may not itself be a valid design. However, there may exist a valid maximal element obtained by regularizing (38) or (39). The correct definition is shown in (40).

$$\Omega_i^* := ki\{x \in \Omega_0 \mid g_i^*(x) \le 0\}. \quad (40)$$

Here, k and i are the topological closure and interior operators, respectively.

Proposition 3 (Design Space Pruning) Given a number of pointwise constraints $g_i^*(x) \le 0$ for $i=1,2,\ldots, n_P$, the feasible design space $D^*$, defined by intersecting all feasibility halfspaces $H_i^*$, has a maximal element $\Omega_P^* = \text{max} D_P^*$ that satisfies the uniqueness and completeness properties, i.e., $\Omega \subseteq D_P^* \Leftrightarrow \Omega \in \Omega_P^*$. It can be obtained by intersecting all maximal elements $\Omega_i^* = \text{max} H_i$:

$$\Omega_P^* = \bigcap_{1 \le i \le n_P} \Omega_i^*, \text{ i.e., } 1_{\Omega_P^*}(x) = \bigwedge_{1 \le i \le n_P} 1_{\Omega_i^*}(x), \quad (41)$$

Here, the intersection/conjunction operators may need to be regularized.

To see why this is true, note that any query point's membership in an (unknown) feasible design can be tested against all m constraints independently of other points' membership. If $g_i^*(x) \le 0$ for $i=1, 2, \ldots, n_P$, the point can (but does not have to) be included in the design, for it to be feasible. The feasible design is hence a subset of all points that satisfy all pointwise constraints.

The above result enables computing on design subspaces as first-class objects. Computationally, the feasibility halfspaces are represented uniquely by their maximal elements. The pruning of halfspaces (abstract operation) is implemented by intersecting maximal elements, i.e., conjuncting point membership tests (i.e. testing whether each point in space to see if it belongs to the design or not) defined by pointwise constraints (concrete algorithm) in an arbitrary order.

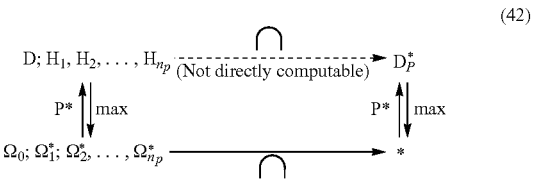

(42)

Figures 11A, 11B, 11C:
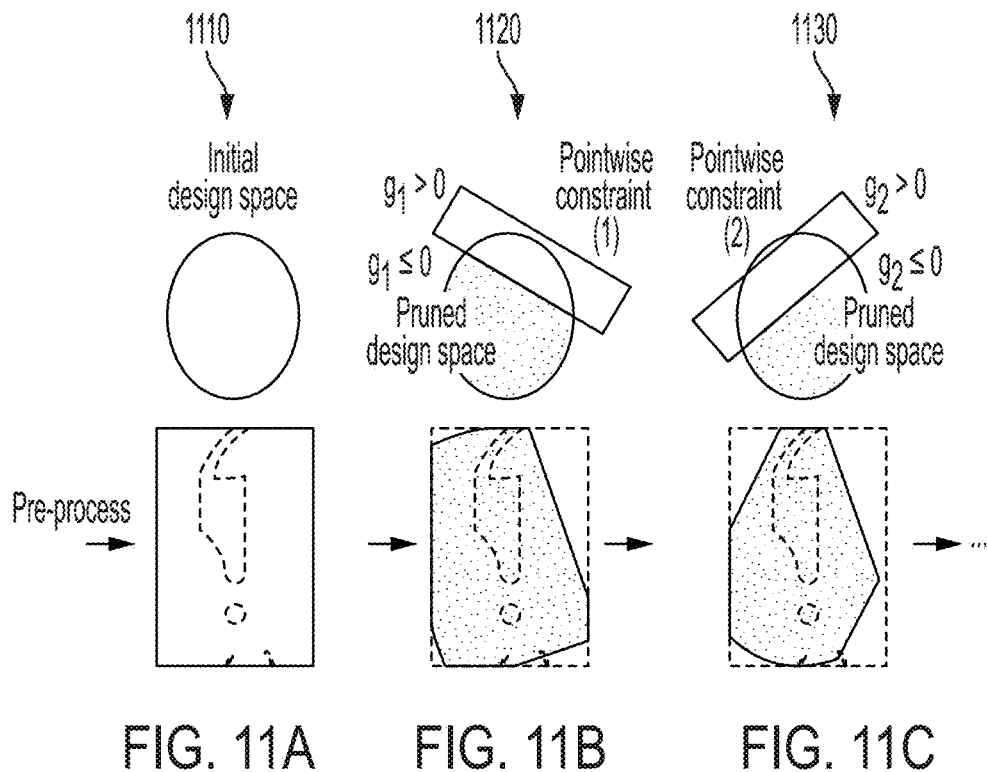
FIGS. 11A-11C show that design space pruning can be abstracted by intersecting the design space with feasibility halfspaces in accordance with embodiments described herein.
Figures 12A, 12B, 12C, 12D:
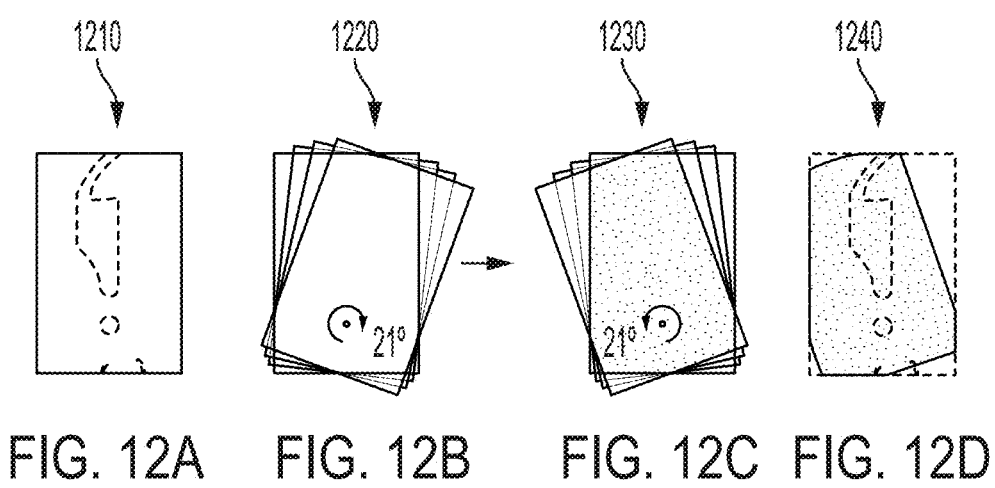
FIGS. 12A-12D show that the dual properties of the FP- and IP-solvers (i.e., Sweep and Unsweep) can be leveraged to construct an exact or approximate representation of a maximal design in accordance with embodiments described herein.

According to embodiments described herein, design space pruning can be abstracted by intersecting the design space 1110 with feasibility halfspaces 1120, 1130 as shown in FIGS. 11A-11C. This is not a computable operation in general. However, for pointwise constraints, it can be computed by intersecting maximal elements in the physical space.

Next maximal elements for set constraints in are considered examples from real-world engineering problems are provided.

Many design requirements, especially those that relate the interaction of moving shapes, may be expressed as set constraints of the form $\Gamma(\Omega) \subseteq E$, where $\Gamma: D \to \mathcal{P}(R^3)$ is a set transformation. For example, In packaging and assembly problems, the part's shape is often designed so that it is restricted to remain within a specified envelope while moving according to a prescribed motion.

When designing part to be machined using a given tool that moves in the presence of obstacles (e.g., the part itself and fixtures), the surface of the part has to be accessible without collisions with the obstacles.

The common theme to many motion-based set transformation $\Gamma: D \to \mathcal{P}(R^3)$ is that they can refactored via (33) via a pointwise transformation $\gamma: \Omega_0 \to \mathcal{P}(R_3)$ that depends on the motion. The maximal pointset that satisfies the containment $\Gamma(\Omega) \subseteq E$ or non-interference test $(\Gamma(\Omega) \cap E^c) = \emptyset$ is defined implicitly by its PMC given in terms of $\gamma$ as shown in (43)-(45).

$$1_{\Omega_i^*}(x) \approx \begin{cases} 1 & \text{if } \gamma(x) \subseteq E, \\ 0 & \text{otherwise,} \end{cases} \quad (43)$$

i.e., $\Omega_i^*(x) \approx \{x \in \Omega_0 \mid \gamma(x) \in E\}$ (44)

$= \gamma^{-1}(E) \cap \Omega_0.$ (45)

Here, the set operators are regularized, as before. Note that $\gamma^{-1}$ may not be a function, because $\gamma$ is not necessarily invertible.

Here are a few classical examples from solid modeling:

For one-parametric sweep $\Gamma(\Omega):=\text{sweep}(M, \Omega)$, one has $\gamma(x)=Mx$ where $M=M(t)\in SE(3)$ is a continuous one-parametric set of motions for $t\in[t_{min}, t_{max}]$. The maximal shape that satisfies $\Gamma(x)\subseteq E$ is given by an unsweep unsweep(M, E).

For Minkowski sum $\Gamma(\Omega):=(\Omega\oplus B)$, one has $\gamma(x)=(x+B)$ where $B\subset R^3$ is typically a solid. The maximal shape that satisfies $\Gamma(x)\subseteq E$ is given by a Minkowski difference with $(E\ominus(-B))$.

For general dilation (which subsumes the above two) with general rigid motions, the maximal shape is given by general erosion.

For non-rigid (but pointwise pre-determined) deformations, the maximal shape is obtained by its PMC in terms of the pointwise displacement function.

Procedure

Propositions 1 through 3 suggest a systematic procedure to prune the design space, i.e., reduce the design space D to $D_P^*=D\cap(H_1\cap H_2\cap \ldots \cap H_{n_P})$ for kinematic criteria expressed in terms of pointwise set constraints:

Step 0. Initialize the feasible design space with the design domain, i.e., in algorithmic terms, $\Omega_P^*\leftarrow\Omega_0$.

Step 1. Express the set constraint that outlines one of the conditions for a given design $\Omega\in D$ to be feasible in the form $\Gamma(\Omega)\subseteq E$. Check if it can be restated as a pointwise constraint $\gamma(x)\subseteq E$ as in (32).

Step 2. Formalize the forward problem in terms of the PMC test for the maximal element obtained from the pointwise constraint as prescribed by (43).

Step 3. Invoke an IP-solver for the inverse problem, which computes (an exact or approximate representation of) the maximal element $\Omega_i^*$ in (44).

Step 4. Prune the design space by intersecting the maximal element $\Omega_P^*$ obtained so far the new $\Omega_i^*$, i.e., $\Omega_P^*\leftarrow(\Omega_P^*\cap\Omega_i^*)$ is a smaller maximal element representing a pruned feasible subspace.

Repeat steps 1-4 for all pointwise set constraints.

Notice that the above procedure can be applied to different constraints via independent invocation of IP-solvers in an arbitrary orders.

The IP-solver in step 3 can be implemented in two fundamentally different ways to obtain either an implicit representation (i.e., using PMC test in (43)) or an explicit representation (i.e., using inversion in (45)) of the maximal element:

If there is access to an IP-solver that computes an explicit representation (e.g., B-rep) of the inverse transformation $\gamma^{-1}$ (E), it can be directly intersected (using any CAD kernel) with the design domain to obtain the maximal element as prescribed by (45).

If there is access to a FP-solver that computes (explicitly or implicitly) the forward transformation $\gamma(x)$ for a given query point $x\in\Omega_0$, an approximate representation (e.g., point cloud or voxelization) of the maximal element can be computed by:

(a) sampling the design domain with a sufficiently dense set of query points;

(b) invoking the FP-solver to PMC-test them using (45); keep the ones that pass the test and discard the ones that do not; and (c) (optional) use adaptive local re-sampling around the points that passed the test to obtain a better approximation.

Because of the independence of pointwise test, invocation of the FP-solver for different query points can be done with perfect parallelization.

The following process illustrates an example of pruning for containment of moving parts in accordance with embodiments described herein. Consider the latch design problem introduced earlier, where the goal is to design a car hood latch that remains within an envelope $E\subseteq\Omega_0$ while moving according to a motion $M\subseteq SE(3)$.

Step 1

Every feasible latch design $\Omega\in D$ may satisfy the set constraint $\Gamma(\Omega)\subseteq E$ where $\Omega(\Omega):=\text{sweep}(M, \Omega)$; i.e., the swept volume by the latch after being transformed by all configurations $\tau\in M$ (including any combination of translations and rotations, parametrized or otherwise) remains within the envelope. The sweep is a pointwise transformation, i.e., can be computed as the union of all $\gamma(x):=Mx=\cup_{\tau\in M}\tau x$, which represents the trajectory traced by the query point $x\in\Omega_0$ along the prescribed motion. Hence, the containment constraint be tested in a pointwise fashion by $\gamma(x)\subseteq E$.

Step 2

Using the definitions in (43), a PMC test is constructed for the maximal shape in the design space that satisfies this pointwise constraint:

$$1_{\Omega_i^*}(x)\approx\begin{cases}1 & \text{if } \forall \tau\in M: \tau x\in E, \\ 0 & \text{otherwise.}\end{cases} \quad (46)$$

The forward problem involves following the trajectory, either exactly or approximately (e.g., by sampling), and testing whether it remains entirely within the envelope.

Step 3

The dual properties of the FP- and IP-solvers (i.e., Sweep and Unsweep) can be leveraged to construct an exact or approximate representation of $\Omega_1^*$, as illustrated in FIGS. 12A-12D. An Unsweep solver may be used to directly compute $\Omega_1^*=\text{unsweep}(M^{-1}, E)\cap\Omega_0$. However, if there is only access to efficient Sweep solver, an approximate representation of $\Omega_1^*$ can be computed using the PMC test in (46) for a sufficiently dense sample of query points and retaining the points whose forward trajectory remains within the envelope as shown in (47) and (48).

$$[\forall\tau\in M:\tau x\in E]\rightleftharpoons x\in\cap_{\tau\in M}\tau^{-1}(E), \text{ i.e.,} \quad (47)$$

$$\text{sweep}(M,\Omega)\subseteq E\rightleftharpoons \Omega\subseteq\text{unsweep}(M^{-1},E). \quad (48)$$

The invertibility of rigid transformations $M\mapsto M^{-1}$ may be key to efficient direct implementation of Unsweep.

FIGS. 12A-12D show unsweep(R, E) is the largest set that remains within the square envelope E 1210 while moving by a 21° clockwise rotation R around a fixed pivot, i.e., without violating the containment constraint as depicted in 1220. The Unsweep can be computed in general by intersecting all moved instances of the envelope with an inverse motion as depicted in 1230. The result serves as a maximal shape 1240 for subsequent material reduction (e.g., by TO).

$\Omega_1^*$ can be sent as the initial design to design space exploration via TO or any other downstream material reducing IP-solver. It is guaranteed that every valid design $\Omega\subseteq\Omega_1^*$ that is the output of the downstream IP-solver, no matter how complicated, will continue to satisfy the set constraint sweep(M, $\Omega$)$\subseteq$E.

Figure 13A:
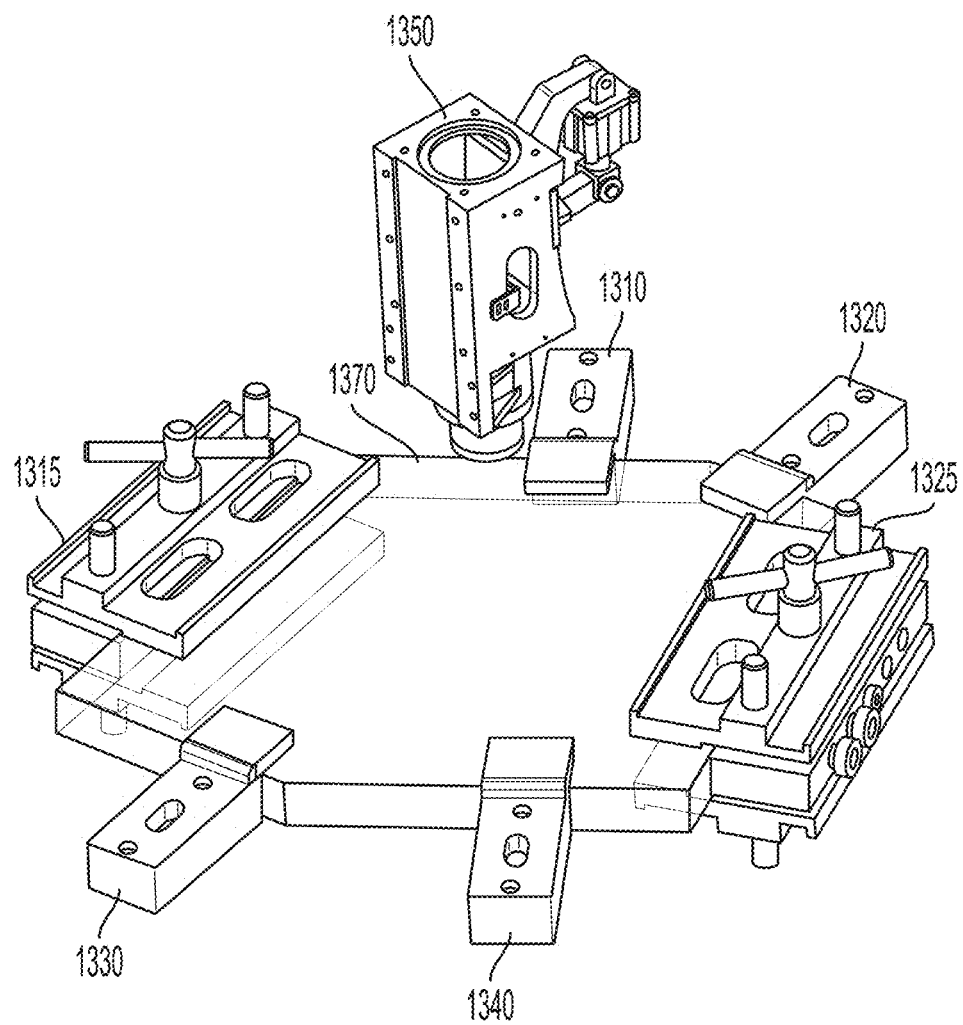
FIGS. 13A-13C shows a manufacturing setup showing six clamps used to locate and hold a designed part and a 2-axis instrument that can move in the plane in accordance with embodiments described herein.
Figure 13B:
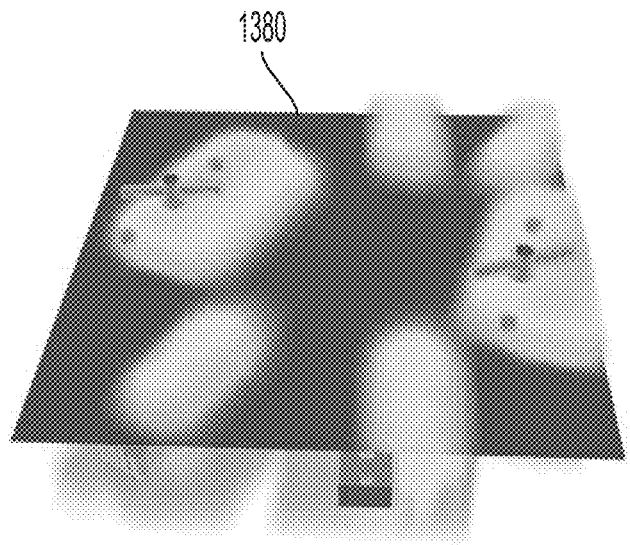
Figure 13C:
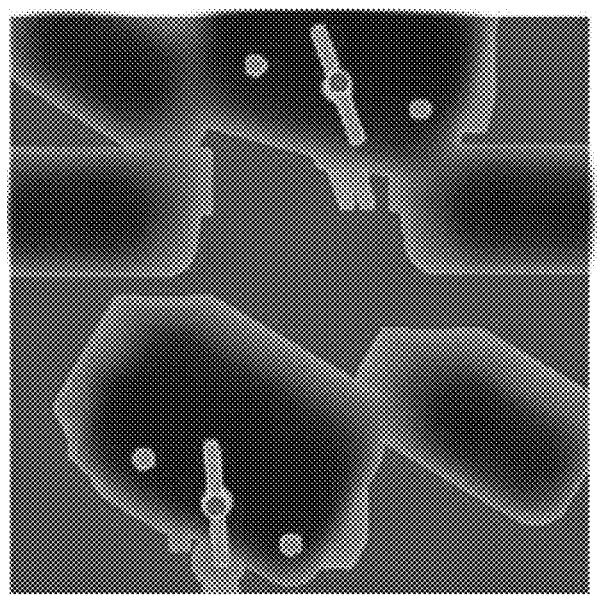

FIG. 13A shows a manufacturing setup with six clamps 1310, 1315, 1320, 1325, 1330, 1340 used to locate and hold a designed part, and a 2-axis instrument 1350 that can move in the plane. The envelope 1370 within which the shape may be designed is shown. FIG. 13B illustrates the convolution of the reflected head with the fixtures gives a 3D field whose 2D cross-section via the plane of motion captures the collision volume at different translations. The position with zero collision volume 1380 are accessible. FIG. 13C shows the 2D cross-section of the 2.5D maximal manufacturable shape is obtained as the zero-set of the convolution field. This pointset serves as the initial design for TO.

Consider another example in a very different setting. Suppose a part is being designed that may need to be fixtured in a crowded workholding environment so that a machining instrument is able to access specific locations without colliding with surrounding fixtures.

For simplicity, assume that the raw stock $\Omega_0$ is a thick sheet of metal, fixtured on the machine bench. The manufacturing process is an EDM wire-cut or $CO_2$ laser-cut in which the tool assembly T=(H∪L) moves according to a planar (i.e., 2D) motion M⊆$R^2$ parallel to the workpiece. Here, it is assumed that the translation with a vector (x, y)∈M brings the wire or laser beam, abstracted by a vertical line of zero thickness L, in contact with a line segment with x=(x, y, z)∈$\Omega_0$ for a range of z-values along the sheet thickness.

The head H cannot collide with the workpiece because they are located at different elevations, i.e., (sweep(M, H)∩Ω)=∅ is a priori guaranteed, thus imposes no constraint. Nonetheless, the head H may collide with the fixtures F, which may extend above the workpiece, i.e., (sweep(M, H)∩F)=∅ imposes a constraint on the motion. This, in turn, imposes a constraint for manufacturability, because the motion defines the boundary of the cut shape, restricted to a curve on the 2D plane: M=∂Ω∩$R^2$. In other words, designing the as-manufactured part's shape amounts to designing the motion, because every translation of the wire or laser beam is in one-to-one correspondence with a point on the part's boundary at which there is no collision between the head and the fixtures.

Step 1

The moving head H may not collide with the fixtures F when swept under the motion M, i.e., (sweep(M, H)∩F)=∅, i.e., sweep(M, H)⊆$F^c$. This is written in the standard form Γ(Ω)⊆E. Equivalently, for all translations (x, y)∈M, ((H+(x, y, 0))∩F)=∅, i.e., (H+(x, y, 0))⊆$F^c$ which is in pointwise form γ(x)⊆E for x=(x, y, 0). Notice that γ(x):=(H+x) does not depend on Ω, as required.

Step 2

Using the definitions in (43), a PMC test is constructed for the maximal shape in the design space that satisfies this pointwise constraint:

$$1_{\Omega_2^*}(x,y,z)=1 \text{ if } (H+(x,y,0))\subseteq F^c, 0 \text{ otherwise.} \quad (49)$$

The success in defining a pointwise constraint (hence a PMC) depended on the assumption of planar translation at a higher elevation than the part, which guaranteed (H+(x, y, 0))⊆$\Omega^c$. Otherwise, the correct constraint in (55) would have $(F\cup\Omega)^c=(F^c\cap\Omega^c)$ instead of $F^c$ on the right-hand side, making it stricter. But the maximal element $\Omega_2^*$ and its corresponding feasibility halfspace $H_2=\mathcal{P}(\Omega_2^*)$ cannot be defined in terms of a particular instance Ω∈$H_2$ (circular definition).

Step 3

Once again, the dual properties of the FP- and IP-solvers can be leveraged to compute an explicit or implicit representation of the 2.5D maximal manufacturable solid.

The FP-solver can be any collision detection algorithm between arbitrary solids, taking as input the displaced head (H+(x, y, 0)) above a particular query point (x, y, z)∈$\Omega_0$ and the stationary fixtures F. Therefore, one can sample the design domain (i.e., the raw stock) over a 2D grid G and construct a bitmap image, representing the 2D section of the 2.5D maximal solid, by testing (55) for all (x, y)∈G. Every test requires invoking the collision detection algorithm, and can be done in parallel.

Alternatively, one can construct an IP-solver to compute the collection of all collision-free 2D translations (i.e., the configuration space obstacle). Since solids and regularized intersections exist, the set constraint (H+(x, y, 0))∩F=∅ can be rewrittern in terms of measures vol[(H+(x, y, 0))∩F]=0 and convert it to an (in)equality constraint via (23). Hence, (49) becomes:

$$1_{\Omega_2^*}(x,y,z) = \neg \text{ sign} \circ vol\,[(H+(x,y,0)) \cap F] \quad (50)$$

$$= \neg \text{ sign} \int_{R^3} 1_H(x'-(x,y,0))1_F(x')dv[x'], \quad (51)$$

Here, $1_{H+(x,y,0)}(x')=1_H(x'-(x, y, 0))$ is the indicator function of the translated head. The integral on the right-hand side is a convolution $(1_{-H} * 1_F)(x)$, evaluated at x: =(x, y, 0), after a reflection $1_{-H}(x')=1_H(-x')$. The integrand is nonzero only at x'∈$R^3$ where both indicator functions are nonzero, hence the integral does not vanish within the (measurable) regions of intersection. Substituting this relation into (57) yields:

$$1_{\Omega_2^*}(x,y,z) = \begin{cases} 1 & \text{if } (\tilde{1}_H * 1_F)(x,y,0) = 0, \\ 0 & \text{otherwise.} \end{cases} \quad (52)$$

The convolution can be converted to pointwise multiplications in the frequency domain using (forward and inverse) Fourier transforms:

$$(1_{-H} * 1_F) = \mathcal{F}^{-1}\{\mathcal{F}\{1_{-H}\} \cdot \mathcal{F}\{1_F\}\}, \quad (53)$$

Here, (53) can be rapidly computed as fast Fourier transforms (FFT) and accelerated on GPUs. FIG. 13A illustrates the results of this computation. The convolution computes a 3D image in one shot using three FFT computations on two 3D bitmaps (voxelized–H and F). However, only its 2D cross-section is may be needed at z=0, whose zero-set gives a 2D bitmap image representation of the 2.5D maximal solid $\Omega_2^*$.

The remaining steps 4 and 5 are straightforward.

Note that everything in the above analysis would remain valid if the manufacturing instrument was allowed to rotate in the plane, except that the constraint on the right-hand side of (49) would have to be changed to hold for at least one planar rotation R∈SO(2) of the head H:

$$1_{\Omega_2^*}(x) = \begin{cases} 1 \text{ if } \exists R \in SO(2): (RH+(x,y,0)) \subseteq F^c, \\ 0 \text{ otherwise.} \end{cases} \quad (54)$$

Accordingly, the convolution in (52) is adjusted:

$$1_{\Omega_2^*}(x) = \begin{cases} 1 \text{ if } \exists R \in SO(2): (1_{-RH} * 1_F)(x,y,0) = 0, \\ 0 \text{ otherwise.} \end{cases} \quad (55)$$

Here, the rotation can be parameterized as R=R(θ) for θ∈[0,2π) and $1_{-RH}(x')\,1_H(-R^{-1}x')$ where $R^{-1}(\theta)=R(-\theta)$ is an inverse rotation. To compute the PMC, one has to sample the rotation angles θ∈[0,2π) and for each trial rotation, resample the rotated head's 3D bitmap into the same grid in which the fixtures' are rasterized to compute the discrete convolution via FFT.

In more general manufacturing scenarios, a number of assumptions that enabled pointwise formulation may be invalidated. For example, in a 5-axis CNC machine, one deals with 6D rigid motions (R, t)∈SE(3) composed of 3D rotations R∈SO(3) and 3D translations t∈R³. The tool assembly T=(H∪C) is no longer guaranteed to avoid collisions with the workpiece, leading to global constraints that depend on the part's shape as well as the head, cutter, and fixtures. The configuration space obstacle $M_\Omega$: obs($O_\Omega$, T) where $O_\Omega$=(Ω∪F) is stated as a group convolution ⋆ operation, which, in turn, can be computed as a Euclidean convolution * as before as shown in (56).

$$1_{M_\Omega}(R, t) = \text{sign} \circ (1_{O_\Omega} \star 1_{-T})(R, t) \quad (56)$$

$$= \text{sign} \circ (1_{O_\Omega} * 1_{-RT})(t), \quad (57)$$

Attempting to write a PMC similar to (55) fails for several reasons; let us give it a try:

$$1_{\Omega_3^*}(x) \stackrel{?}{=} \begin{cases} 1 & \text{if } \exists R \in SO(3): (1_{O_\Omega} * 1_{-RT}) + (t) = 0, \\ 0 & \text{otherwise.} \end{cases} \quad (58)$$

The first obvious problem is the dependency of the right-hand side on Ω, which makes for a circular definition. Moreover, the cutter's shape cannot be ignored (unlike the case with wire-/laser-cut). Hence, there is no obvious way to assign a correspondence between the translations t∈R³ and the points x∈$\Omega_0$ within the design domain, unless all possible contact configurations are considered and treat boundary points differently from interior points. Last but not least, passing a collision check at the contact configuration is not sufficient for accessibility, because there may not exist a connected path from the initial configuration of the tool assembly to the cutting pose of interest. For example, if a downstream TO creates cavities in the design in 3D, none of the will be accessible (unlike 2.5D).

Here, constraints that cannot be stated in pointwise form due to global dependencies are examined. It is assumed that the design has been pruned for all pointwise constraints to produce an initial design $\Omega_P^*$=($\Omega_1^*$∩$\Omega_2^*$∩ ... $\Omega_{n_P}^*$)⊆$\Omega_0$ for design space exploration with regards to the remaining (n−$n_P$)=($n_G$+$n_L$) global and/or local constraints.

In accordance with embodiments described herein, the phase 2 problem can be solved by using design space exploration. The goal is not to propose new optimization algorithms besides the many existing ones. Rather, a general strategy is proposed to deal with constraints that cannot be stated in a pointwise fashion, to guide gradient-descent optimization.

In order to move deterministically in the design space in directions that consistently reduce the violation of these constraints, their sensitivities are quantified to hypothetical local changes in the design. Different gradient-like quantities can be defined for different design representations. Here, it is demonstrated that the approach specifically for defining, augmenting, and filtering topological sensitivity fields (TSF) with global and local constraints.

Fixed-point iteration (a.k.a Picard iteration) is an effective approach for numerically solving multi-objective optimization problems, where the problem is iteratively solved through series of outer- and inner-loops. As the value of each objective function is changed in the outer-loop, its value is kept fixed in the inner loop. The fixed objective functions are treated as equality constraints for the single-objective inner-loop optimization. Among the many popular approaches, a Pareto tracing levelset TO approach (PareTO) is used, because it produces valid designs (i.e., solids) at all intermediate steps. It was shown in that Pareto tracing can also be extended to density-based approaches such as solid isotropic material with penalization (SIMP).

For example, in classical TO, the goal is to obtain light-weight stiff structures, leading to two competing objectives (mass and compliance) with a one-dimensional Pareto frontier, The problem can be formulated as follows:

$$\text{Find} \begin{cases} \Omega \in D_P^*: \text{minimize } \overline{V}_\Omega \text{ and } J_\Omega = [f]^T[u_\Omega], \\ \text{subject to } [K_\Omega][u_\Omega] = [f], \end{cases} \quad (59)$$

Here, the volume fraction $\overline{V}_\Omega$ :=vol[Ω]/vol[$\Omega_P^*$] is the ratio of the (unknown) vol[Ω] to the initial design's volume vol[$\Omega_P^*$], where $\Omega_P^*$⊆$\Omega_0$ is the maximal feasible pointset obtained from pruning. Classical TO in the absence of pruning is subsumed as a special case when $\Omega_P^*$=$\Omega_0$. The second objective function $J_\Omega$=[f]$^T$ [$u_\Omega$] is the compliance (i.e., strain energy) obtained from FEA, in which [$u_\Omega$] is the discretized displacement field and [f] is the external load vector given as (Neumann) boundary conditions. The FEA also appears as an equality constraint [$K_\Omega$][$u_\Omega$]=[f] in which [$K_\Omega$] is the stiffness matrix obtained from the design shape, material properties, and restraints given as (Dirichlet) boundary conditions.

The problem can be reformulated as a single-objective optimization for a fixed volume fraction:

$$\text{Find } \Omega \in D_P^*: \begin{cases} \text{select target } \overline{V}_\Omega^{targ}(0, 1) \\ ILI: \begin{cases} \text{minimize } J_\Omega = [f]^T[u_\Omega] \\ \text{s.t. } \overline{V}_\Omega = \overline{V}_\Omega^{targ}, \\ \text{s.t. } [K_\Omega][u_\Omega] = [f], \end{cases} \end{cases} \quad (60)$$

Here, ILI stands for inner-loop iteration. Within each ILI, a single-objective optimization is solved to minimize compliance $I_\Omega$ subject to a fixed volume fraction constraint $\overline{V}_\Omega$=$\overline{V}_\Omega^{targ}$ for a fixed 0<$\overline{V}_\Omega^{targ}$≤1. In PareTO, one starts off on the Pareto frontier at the right-most extreme with Ω: =$\Omega_P^{s*}$ and $\overline{V}_\Omega^{targ}$=1, i.e., the best-case scenario for compliance at the cost of the largest volume. The algorithm incrementally removes material to decrease $\overline{V}_\Omega^{targ}$ by introducing holes in the design, without deviating too much from the Pareto front. The ILI is a fixed-point iteration that applies local modifications to the new design to bring it back to the Pareto front.

The inner-loop optimization can be expressed as local minimization of the augmented Lagrangian defined as:

$$\mathcal{L}_\Omega := [f]^T[u_\Omega] + \lambda_1(\overline{V}_\Omega - \overline{V}_\Omega^{targ}) + [\lambda_2]^T([K_\Omega][u_\Omega] - [f]). \quad (61)$$

The Karush-Kuhn-Tucker (KKT) conditions [11] for this problem are given by $\nabla \mathcal{L}_\Omega$=0 in which the gradient is defined by partial differentiation with respect to the independent variables; namely, the design variables used to represent Ω and the Lagrange multipliers $\lambda_1$ and [$\lambda_2$]. The latter simply encodes the constraints into $\nabla \mathcal{L}_\Omega$=0:

$$\frac{\partial}{\partial \lambda_1} \mathcal{L}_\Omega = (\overline{V}_\Omega - \overline{V}_\Omega^{targ}) := 0, \qquad (62)$$

$$\frac{\partial}{\partial \lambda_2} \mathcal{L}_\Omega = [K_\Omega][u_\Omega] - [f] := [0], \qquad (63)$$

According to embodiments described herein, differentiation with respect to $\Omega \in D_P^*$ depends on the particular parameterization used to represent the design by a finite set of decision variables for optimization. These variables can be geometric/size variables (e.g., thickness in truss optimization), density variables (e.g., volume fractions in SIMP), and so on. The goal is to present a representation-agnostic form in terms of TSF.

A prime symbol $(\cdot)'$ is used to represent the generic (linear) differentiation of a function with respect to $\Omega$, (64) is obtained via the chain rule.

$$\mathcal{L}_{\Omega'} = [f]^T [u_{\Omega'}] + \lambda_1 \overline{V}_{\Omega'} + [\lambda_2]^T ([K_\Omega][u_\Omega])', \qquad (64)$$

$$= ([f]^T + [\lambda_2]^T [K_\Omega])[u_{\Omega'}] + \lambda_1 \overline{V}_{\Omega'} + [\lambda_2]^T [K_{\Omega'}][u_\Omega],$$

Computing $[u_{\Omega'}]$ is prohibitive, as it requires calling FEA as many times as the number of independent variables used to represent $\Omega$. The common solution is to choose $[\lambda_2]$ such that $[f]^T + [\lambda_2]^T [K_\Omega] = [0]$ (adjoint problem):

$$\mathcal{L}_{\Omega'} = \lambda_1 \overline{V}_{\Omega'} + [\lambda_2]^T [K_{\Omega'}][u_\Omega], \text{if } [\lambda_2] := -[K_\Omega]^{-1}[f], \qquad (65)$$

In general, if $n_O > 0$ global objective functions $f_j(\Omega)$ and another $n_G \geq 0$ global (in)equality constraints $g_i(\Omega) \leq 0$, (64) can be generalized as:

$$\mathcal{L}_{\Omega'} = \Sigma_{n_C \leq i \leq n_C + n_O} \overline{\lambda}_i f_i(\Omega) + \Sigma_{n_P \leq i \leq n_P + n_G} \overline{\lambda}_i g_i(\Omega) \qquad (66)$$

Here, the notation can be simplified by introducing $F_j(\Omega) := f_{n_C + j}(\Omega) - f_{n_C + j}^{targ}$ for $0 \leq j \leq n_O$ and $F_j(\Omega) := g_{n_P - n_O + j}(\Omega)$ for $n_O < j \leq n_O + n_G$, hence:

$$\mathcal{L}_{\Omega'} = \Sigma_{0 \leq j \leq n_O + n_G} \lambda_j F_j(\Omega), \qquad (67)$$

The ILI in FIG. 28 can be generalized to accommodate other global objective functions and global constraints. For example, suppose the part is to be 3D printed at a given build direction. An additional global (in)equality constraint is imposed in terms of an upper-bound $\overline{V}_{UB} \geq 0$ on the total volume of support material that may be needed based on an overhang angle criterion:

$$\text{Find } \Omega \in D_P^*: \begin{cases} \text{select target } \overline{V}_\Omega^{targ}(0,1) \\ ILI: \begin{cases} \text{minimize } J_\Omega = [f]^T[u_\Omega] \\ \text{s.t. } \overline{V}_\Omega = \overline{V}_\Omega^{targ}, \\ \text{s.t. } [K_\Omega][u_\Omega] = [f], \\ s.t. \ \overline{V}_{S_\Omega} \leq \overline{V}_{UB}, \end{cases} \end{cases} \qquad (68)$$

Here, $S_\Omega \subseteq \Omega^c$ represents the support structure. Its volume fraction $\overline{V}_{S_\Omega} = \text{vol}[S_\Omega]/\text{vol}[\Omega_P^*]$ can be computed as a function of the angle between surface normals and the build direction at every outer-loop iteration. The Lagrangian in (67) is further augmented by adding another term $\lambda_s(\overline{V}_{S_\Omega} - \overline{V}_{UB})$ and the generic sensitivity in (71) is updated by incorporating $\overline{V}_{S_\Omega}'$ as:

$$\mathcal{L}_{\Omega'} = \lambda_1 \overline{V}_{\Omega'} + [\lambda_2]^T [K'_\Omega][u_\Omega] + \lambda_3 \overline{V}_{S_\Omega}'. \qquad (69)$$

Figure 14:
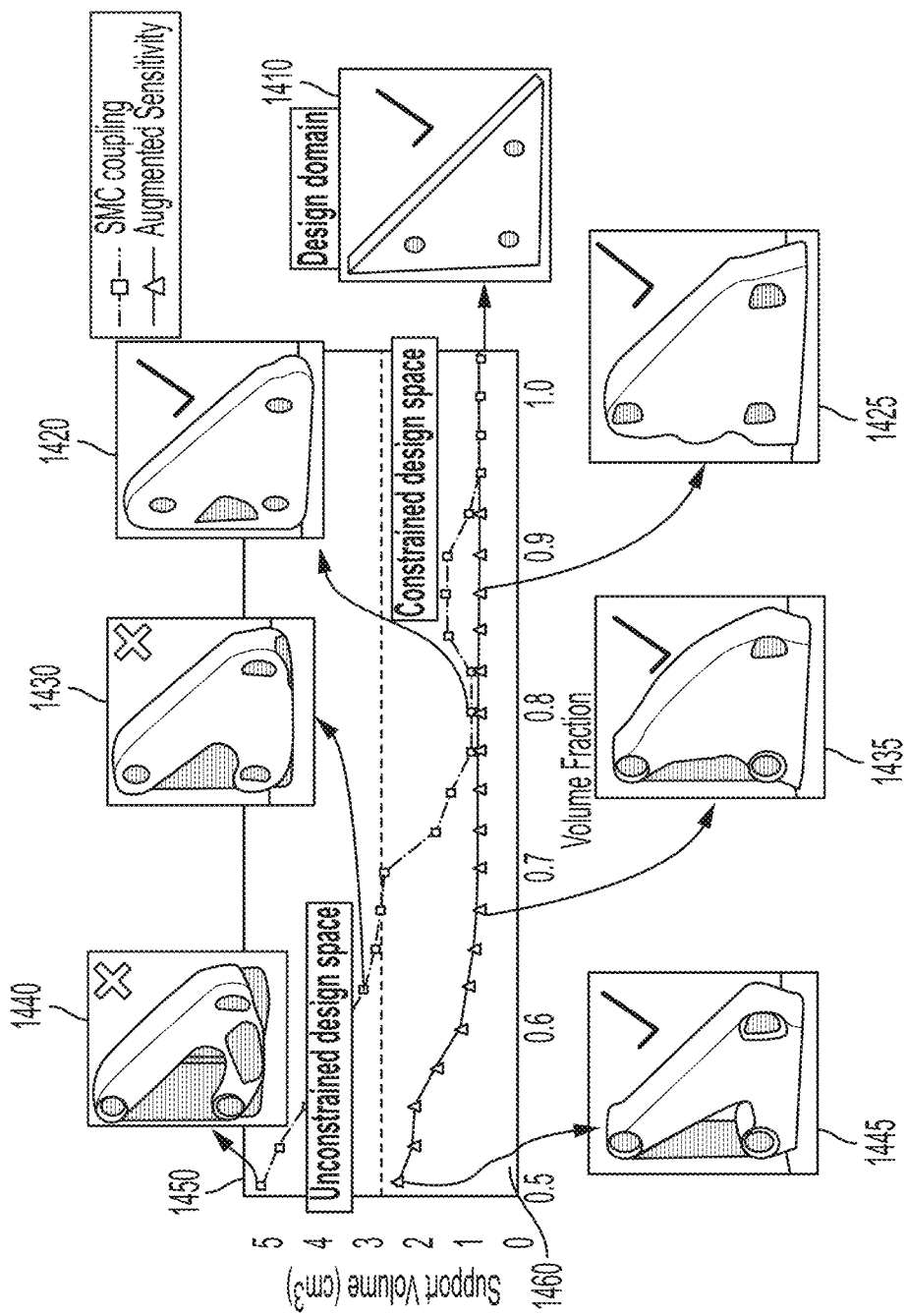
FIG. 14 compares the solution designs based on a design domain to a TO problem with and without constraining the support material volume in accordance with embodiments described herein.

FIG. 14 compares the solution designs based on a design domain 1410 to a TO problem with 1460 and without 1450 constraining the support material volume. Observe that optimization designs 1420, 1430, 1440 without the support constraint exits the feasibility halfspace with respect to this constraint for design volume fractions less than 70%. For lighter designs, the removed design material comes at the expense of additional support material, hence costlier manufacturing. The fully constrained optimization designs 1425, 1435, 1445 with augmented sensitivity as in (69) dramatically increases the number of feasible and Pareto-optimal options, even at volume fractions lower than 70%. Here, FIG. 14 shows TO with and without augmenting the sensitivity with constraints on the support material that may be needed for 3D printing along the vertical build direction. Many of the solutions without considering the support constraint will still satisfy that constraint due to the larger volume fraction occupied by the design itself. However, as the material is reduced from the design below 70%, the TO generates designs that require more support material.

Another example is TO subject to accessibility constraints for machining. Once again, a global (in)equality constraint can be imposed in (7) to in terms of an upper-bound $\overline{V}_{UB} \geq 0$ on the total inaccessible volume:

$$\text{Find } \Omega \in D_P^*: \begin{cases} \text{select target } \overline{V}_\Omega^{targ}(0,1) \\ ILI: \begin{cases} \text{minimize } J_\Omega = [f]^T[u_\Omega] \\ \text{s.t. } \overline{V}_\Omega = \overline{V}_\Omega^{targ}, \\ \text{s.t. } [K_\Omega][u_\Omega] = [f], \\ s.t. \ 1 - \overline{V}_{R_\Omega} - \overline{V}_\Omega \leq \overline{V}_{UB}, \end{cases} \end{cases} \qquad (70)$$

Here, $R_\Omega \subseteq \Omega^c$ represents the maximal accessible region outside the design for a combination of tools and approach directions in 3-axis milling [50]. The volume fraction of the inaccessible regions is $1 - \overline{V}_{R_\Omega} - \overline{V}_\Omega$ where $\overline{V}_{R_\Omega} = \text{vol}[R_\Omega]/\text{vol}[\Omega_P^*]$ and $\overline{V}_\Omega = \text{vol}[\Omega]/\text{vol}[\Omega_P^*]$, as before. The Lagrangian in (67) is further augmented by adding another term $\lambda_s(1 - \overline{V}_{R_\Omega} - \overline{V}_\Omega - \overline{V}_{UB})$, hence:

$$\mathcal{L}_{\Omega'} = \lambda_1 \overline{V}'_\Omega + [\lambda_2]^T [K'_\Omega][u_\Omega] + \lambda_3 (\overline{V}'_{R_\Omega} - \overline{V}'_\Omega) \qquad (71)$$

$$= (\lambda_1 - \lambda_3)\overline{V}'_\Omega + [\lambda_2]^T [K'_\Omega][u_\Omega] + \lambda_3 \overline{V}'_{R_\Omega}. \qquad (72)$$

One can alternatively formulate the optimization problem for accessibility using the local constraint in (16):

$$\text{Find } \Omega \in D_P^*: \begin{cases} \text{select target } \overline{V}_\Omega^{targ}(0,1) \\ ILI: \begin{cases} \text{minimize } J_\Omega = [f]^T[u_\Omega] \\ \text{s.t. } \overline{V}_\Omega = \overline{V}_\Omega^{targ}, \\ \text{s.t. } [K_\Omega][u_\Omega] = [f], \\ s.t. \ [1_\Omega * 1_{-T}] = [0], \end{cases} \end{cases} \qquad (73)$$

Here, the inaccessibility measure $\mu_\Omega(x) = (1_{O_\Omega} * \tilde{1}_T)$ in (16), defined as the convolution in (17) is discretized to $[\mu_\Omega] = [1_{O_\Omega} * \tilde{1}_T]$ ands further simplified to $[\mu_\Omega] = [1_\Omega * \tilde{1}_T]$ assuming that the stationary obstacle $O_\Omega = (\Omega \cup F)$ includes only the target design $O_\Omega = \Omega$, ignoring the fixtures $F := \emptyset$. The tool assembly $T = (H \cup C)$ includes the holder $H$ and cutter $C$, as before. Here, a conservative measure is used, aiming for no allowance for inaccessibility (i.e., $\mu_0$: =0 in (16)) hence $[1_\Omega * \tilde{1}_T]=[0]$ over all discrete elements (e.g., voxels) wherever possible in the design domain. The discrete convolution is computed using two forward FFTs on $[1_\Omega]$ and $[\tilde{1}_T]$, a pointwise multiplication of their frequency domain grids, and an inverse FFT to obtain $[1_\Omega * \tilde{1}_T]$ in the physical domain (as a voxelized field).

Hereon, It is assumed that reducing the volume may be an objective/cost function, hence the outer-loop is set up to incrementally decrease the volume fraction budget $\overline{V}_\Omega^{targ} \in 0,1]$ starting from the initial value $\overline{V}_\Omega^{targ}:=1$ on the costlier extreme of the Pareto front. The optimization problem is formulated in general as:

$$\text{Find } \Omega \in D_P^*: \begin{cases} \text{select target } \overline{V}_\Omega^{targ}(0,1) \\ ILI: \begin{cases} \text{minimize } f_i(\Omega), n_C < i \leq n_C + n_G, \\ \text{s.t. } \overline{V}_\Omega = \overline{V}_\Omega^{targ}, \\ \text{s.t. } g_i(\Omega) \leq 0, n_P < i \leq n_P + n_C, \\ \text{s.t. } g_i(x; \Omega) \leq 0, n_P + n_C < i \leq n_C, \end{cases} \end{cases} \quad (74)$$

Figure 15A:
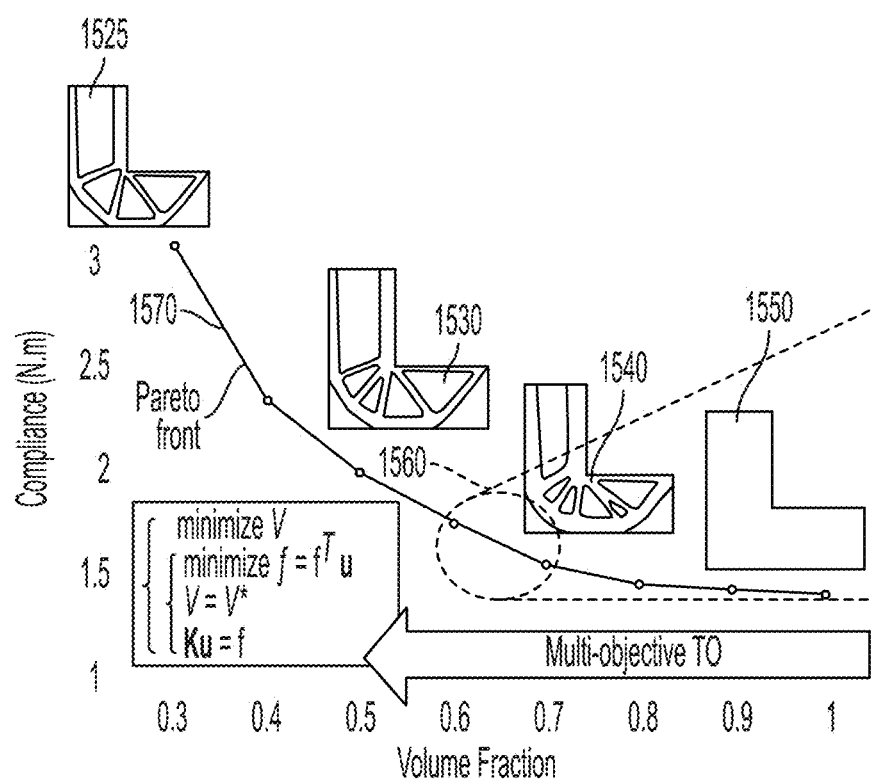
FIG. 15A shows an example Pareto tracing process in accordance with embodiments described herein.
Figure 15B:
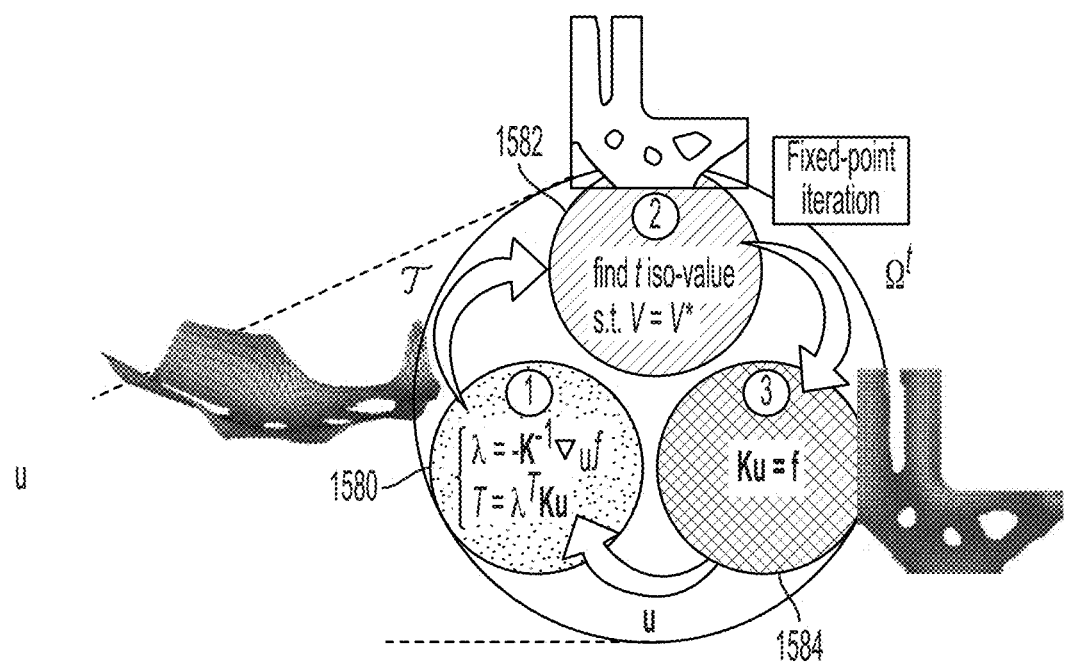
FIG. 15B illustrates incremental steps in a Pareto tracing process in accordance with embodiments described herein.

FIGS. 15A and 15B show that in the fixed-point iteration, the optimality conditions are iteratively satisfied to ensure that at every step, the designs remain Pareto optimal. FIG. 15A shows an example Pareto tracing process in accordance with embodiments described herein. Starting from the initial design 1550, which may or may not be the maximal shape obtained from design space pruning, the Pareto tracing approach removes material from the least sensitive regions of the shape (as ranked by TSF) to obtain alternative Pareto-optimal designs 1540, 1530, 1525 along the Pareto front 1570. Every incremental step 1560 along the Pareto front in FIG. 15A involves a fixed-point iteration, illustrated in FIG. 15B. The fixed-point iteration involves computing the Lagrange multipliers and the TSF 1580, finding an updated iso-level set that reduces the volume by a prescribed decrement 1582, and solving the FEA problem on the updated shape 1584. The process is repeated until it converges to a constant shape at the prescribed volume fraction.

TSF can be used to define $\mathcal{L'}_\Omega$ and $F'_j(\Omega)$ in (67) in a representation-independent form. Let us first look at a few examples with manufacturability constraints in addition to the physical constraints in FIG. 28.

The notion of a TSF is widely applied in the TO space as a means to guide the optimization process in moving from one candidate solution to another in the search for local optima. Intuitively, the TSF is a gradient-like operator for pointsets that quantifies the global effect of local changes of a given function (e.g., violation of a global constraint). The TSFs are coupled for various global and local constraints in three distinct steps:

Defining TSFs for Global Constraints: For global constraints of the general form $g_i(\Omega) \leq 0$, one TSF per constraint is used to measure how its violation changes after removing a hypothetical small neighborhood (called an "inclusion") at a given point.

Augmenting TSFs for Global Constraints: The individual TSFs are linearly combined for all global constraints (including the fixed objective functions).

Penalizing TSFs via Local Constraints: For local constraints of the general form $g_i(x; \Omega) \leq 0$, the TSF of the global constraints is penalized by a linear combination of the violation of local constraints.

For every function $F_j: D_P^* \to R$ that depends globally on the design (objective function or constraint), a field $\mathcal{T}_j: (\Omega_P^* \times D_P^*) \to R$ is defined as its TSF via (75).

$$\mathcal{T}_j(x; \Omega) \approx \lim_{\epsilon \to 0^+} \frac{F_j(\Omega - B_\epsilon(x)) - F_j(\Omega)}{vol[\Omega \cap B_\epsilon(x)]}, \quad (75)$$

According to embodiments described herein, for $0 < j \leq n_O + n_C$, $B_\epsilon(x) \subset \Omega_0$ is a small 3D ball of radius $\epsilon \to 0^+$ centered at a given query point $x \in \Omega$. The numerator of the limit evaluates the (presumably infinitesimal) change in $F_j(\Omega)$ when the candidate design is modified as $\Omega \mapsto (\Omega - B_\epsilon(x))$, i.e., by puncturing an infinitesimal cavity at the query point. The denominator $vol[\Omega \cap B_\epsilon(x)] = O(\epsilon^3)$ as $\epsilon \to 0^+$ measures the volume of the cavity. For internal points $x \in i\Omega$ (i.e., points that are not exactly on the topological boundary) one has $vol[\Omega \cap B_\epsilon(x)] = vol[B_\epsilon(x)]$ as $\epsilon \to 0^+$.

The method of augmented Lagrangian can be extended to TSFs, and its effectiveness was demonstrated by TO of multi-load structures under deformation and stress constraints. The linear combination of the generic form in (67) is applied to compute an "augmented" TSF to couple the global (in)equality constraints as shown in (76).

$$\mathcal{T}(x; \Omega) := \Sigma_{0 < j \leq n_O + n_G} \lambda_j \mathcal{T}_j(x; \Omega). \quad (76)$$

Note that the sum in (76) provides a representation-independent mathematical definition for the gradient in (67) with respect to the (unparameterized) pointset $\Omega \in \Omega_P^*$. Rather than quantifying a direction of steepest descent for moving in a particular parameter space, $\mathcal{T}(X; \Omega)$ identifies the set of points $x \in \Omega$ that are contributing the most to the violation of constraints. A proper direction to move in the (unparameterized) design space $D_P^*$ is to remove the points with maximal TSF.

The coefficients $\lambda_j > 0$ has to be either computed by solving adjoint problems as is shown for the case of strain energy in (65)—or selected using adaptive weighting schemes that are mainstream in multi-objective and multi-constraint TO.

The TSF operator maps global constraints to fields that vary depending on $x \in \Omega$. The local constraints are already defined as fields that vary in a similar fashion (i.e., are of the same "type" as the TSF). Hence, the TSF in (82) can be penalized with local constraints as:

$$\hat{\mathcal{T}}(x; \Omega) := \mathcal{T}(x; \Omega) + \Sigma_{n_P + n_G < i \leq n_C} \kappa_i g_i(x; \Omega). \quad (77)$$

The choice of coefficients $\kappa_i > 0$ might need experimenting with the TO to adjust the relative importance of different constraints and improve convergence properties.

The TSF orders the points in the design domain according to the potential impact of removing their local neighborhoods on objective function and constraints. An incremental improvement to the design is one that eliminates the points with the lowest TSF (e.g., the bottom 5%). Here, 'τ-modified' (potentially infeasible) design $\Omega(\tau) \subset \Omega$ is defined by a PMC in terms of the current design $\Omega$:

$$1_{\Omega(\tau)}(x) \approx \begin{cases} 1 & \text{if } \hat{\mathcal{T}}(x; \Omega) \geq \tau, \\ 0 & \text{otherwise,} \end{cases} \quad (78)$$

i.e., $\Omega(\tau) \approx \{x \in \Omega \mid \hat{\mathcal{T}}(x; \Omega) \geq \tau\}. \quad (79)$ Here, the isolevel threshold $\tau > 0$ determines a step size for incremental change, e.g., $\tau := 0.05$ means the least sensitive 5% are removed. It may be important to select a small value so that only a small subset with $\hat{\mathcal{T}}(x; \Omega) \geq \tau$ is removed to obtain a shape that is not too different. The new design marginally violates the constraints and slightly deviates from the Pareto front 1580. However, it is close enough to the front that it can be brought back by a fixed-point iteration 1582, 1584. The iteration may not converge if the step size is too large. But if it does, it produces another feasible and (locally) Pareto-dominant design that is slightly lighter.

Optimization Loops

Here is a general algorithm:

1. Pick a value $\delta > 0$ for the desired change in volume fraction for the outer-loop iteration. $\hat{\mathcal{T}}$
2. Compute $\hat{\mathcal{T}}(x; \Omega)$ from (76) and (77) and normalize it with its maximum value over the current design.
3. Initialize $\Omega(\tau) \subseteq \Omega$ using (79) with a reasonably small initial $\tau \leftarrow \tau_0$ to start the fixed-point iteration: $\mathcal{A}$
   (a) Cycle over the FP-solvers and update the performance fields $\mathcal{A}_i(\Omega) \rightarrow \mathcal{A}_i(\Omega(\tau))$ (e.g., the constrained physical or kinematic properties) for the $\tau$-modified design obtained from (78).
   (b) Re-evaluate the constraints using the updated performance results; recompute the TSF using (76) and (77) everywhere accordingly.
   (c) Find $\tau > 0$ such that the $\tau$-modified design in (86) with the updated TSF has the desired reduction in volume fraction, i.e., $\nabla_{\Omega(\tau)} \approx (\nabla_\Omega - \delta)$.
   (d) Repeat (a-c) until the $\tau$-modified design does not change. The result is feasible with respect to the constraints and is Pareto-dominant.
4. Repeat (1-3) until the volume fraction reaches the smallest feasible value to sustain the requirements.

Procedure

Here is a systematic procedure to explore the pruned design space, i.e., trace a locally Pareto-optimal family of alternative design variants $D_{dom}^* \subset D_P^*$ by recurrent incremental thresholding of (augmented and penalized) TSF, defined in terms of global and local constraints:

Step 0. Start at the extreme end of the Pareto front (maximal volume) by initializing the design with the maximal pointset obtained from pruning $\Omega \leftarrow \Omega_P^*$.

Step 1. Express the global objective functions and global and local constraints for a given design $\Omega \in D_P^*$ to formulate the problem in the general form of (80).

Step 2. Define a subroutine to evaluate TSFs for each global objective function and global constraint using (75), combine them using (76), and penalize them with local constraints using (77).

Step 3. Invoke the outer-loop optimization algorithm explained above to incrementally reduce the material by thresholding the TSF.

Step 4. Within the inner-loop (fixed point iteration) cycle over FP-solvers to evaluate the objective functions and constraint upon every incremental change in the outer-loop. Repeat until the deviated solution converges back on the Pareto front.

Repeat steps 2-4 sequentially until the algorithm cannot find a solution for after removing enough material, i.e., arrives at other extreme end of the Pareto front (minimal volume).

Figure 16A:
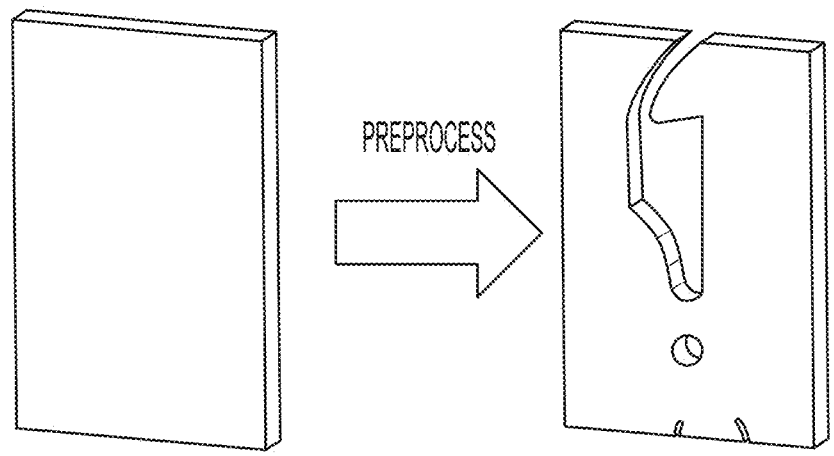
FIG. 16A shows a preprocesses for a latch where functional surfaces are specified in accordance with embodiments described herein.

Consider the car hood latch problem with the following kinematic and physical constraints:

1. The latch may retain special features designated by the designer, as illustrated in FIG. 16A.

One feature ensures that its mating pin (moving vertically up and down) rotates the latch by 21° due to sliding contact maintained through a spring (not shown here).

The other feature is for safety considerations; it ensures that if the pin moves upwards in a sudden reverse motion—due to a failure of the perimary latch—the secondary latch stops claps it to prevent the car hood from opening.

2. As the latch rotates around its pivot from 0° to 21°, it may remain completely within a safe region of space to avoid interference with other car parts.
3. The latch is to be manufactured from stainless steel 304 using a metal AM process.
4. The latch should not weigh more than 0.30 pound.
5. The latch will experience loads at pre-determined points/surfaces, including the contact forces with the pin exerted by the spring. Under these loads, its maximum deflection may not exceed 0.03 inches.

Figure 16B:
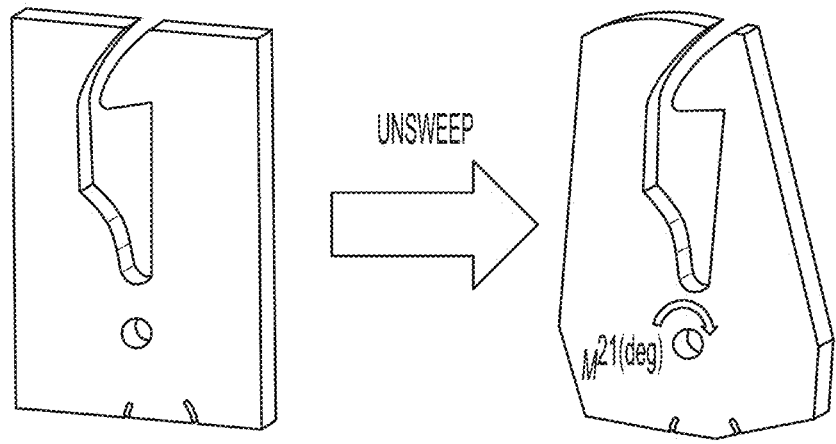
FIG. 16B illustrates that the Unsweep removes parts of the pre-processed initial design that would exit the envelope for a pre-specified clockwise rotation of 21 degrees around the pivot in accordance with embodiments described herein.

Such a diverse set of requirements is quite common, and should be simultaneously handled by the computational design framework. It is noted from the first requirement that modeling design intent and synthesizing functional features to satisfy them are difficult without knowing substantial information about the application. These features are given in a pre-processing step shown in FIG. 16A. Nevertheless, a substantial remaining portion of the geometry is not defined by functional features and can be optimized. The remaining requirements are systematically solved using embodiments described herein. FIG. 16A shows a preprocesses for a latch where functional surfaces are specified. FIG. 16B illustrates that the Unsweep removes parts of the pre-processed initial design that would exit the envelope for any clockwise rotation of $\theta \in [0°, 21°]$ around the pivot.

Step 0

As previously discussed, requirement 2 can be satisfied upfront (without premature optimization) by pruning the design space via an IP-solver. The TO is started with the initial design $\Omega_1^*$: $=$unsweep(M, E) where M={R ($\theta) \in$ SO (2)$|0 \leq \theta \leq 21°$} is the collection of all rotations that the latch can go experience, and $E \subseteq R^3$ is the containment envelope (FIG. 13).

Since TO is a material-reducing procedure, the remaining requirements 3-5 can be satisfied by TO without violating the containment constraint.

Steps 1, 2

In the absence of manufacturing constraints, the physics-based constraints for this problem are posed in common form of (59). The upper-bound on the weight can be converted to an upper-bound on volume fraction $\nabla_\Omega \leq \nabla_\Omega^{targ}$ where $\nabla_\Omega^{targ} = (0.30 \text{ lb}/\rho_{SS304})/\text{vol}[\Omega^{1*}]$ using the known density of SS304.

The upper-bound on deflection $_\Omega(x) \leq _{UB}$: $=0.03"$ need not be stated as a separate constraint, because it implies an upper-bound on compliance, hence a lower-bound on the volume fraction.

Steps 3, 4

At every outer-loop iteration, the maximal deflection increases due to removed material. The algorithm checks if the deflection constraint is violated and stops at the lightest possible solution.

Within the inner-loop fixed point iteration, the TSF is computed as in (65), based on which the $\tau$-modified design $\Omega(\tau)$ is extracted as the $\tau$-superlevel set of the TSF. Subsequently, the FEA solver is invoked to solve $[K_{(\Omega)(\tau)}][u_{\Omega(\tau)}]=[f]$. Based on the updated stiffness matrix $[K_{\Omega(\tau)}]$ and displacement field $[u_{\Omega(\tau)}]$ in response to the boundary conditions, the Lagrange multipliers are updated via (65) as $[\lambda_2]-[K_{\Omega(\tau)}]^{-1}$ [f] and the TSF in (76) is recomputed. The iteration is repeated until the design remains unchanged.

Figure 17:
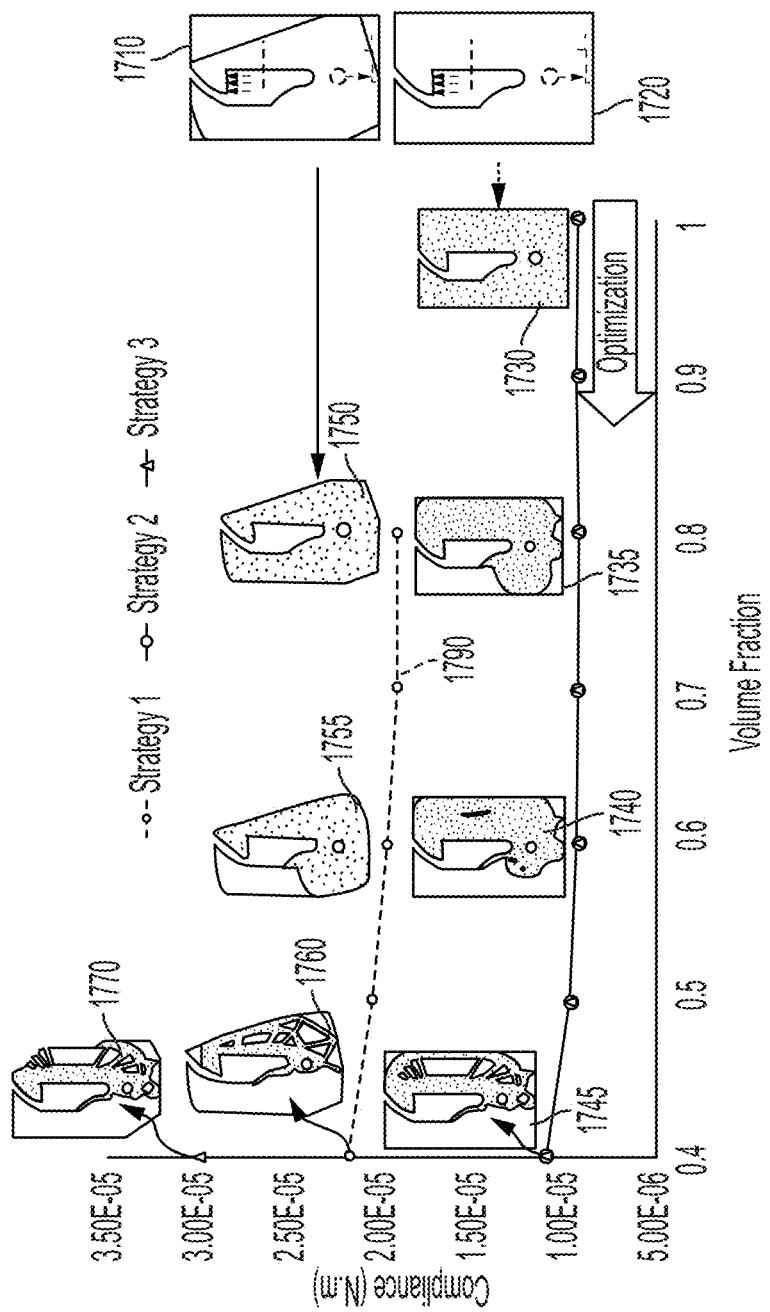
FIG. 17 illustrates the Pareto front for solving the above problem, starting from the pruned design domain in accordance with embodiments described herein.

FIG. 17 illustrates the Pareto front for solving the above problem, starting from the pruned design domain $\Omega_P^*$ as prescribed above (strategy 1). The results of strategy 1 1750, 1755, 1760 are compared against the results 1730, 1735, 1740, 1745 where the algorithm starts from the initial design domain $\Omega_0$ (strategy 2), ignoring the containment constraint (requirement 2). The latter is an example of premature optimization, after which there is no guarantee that the design can be fixed to take the containment constraint into account. The graph also shows an incorrect attempt to fix the design as in FIG. 2, leading to an infeasible and suboptimal design (strategy 3) 1770. FIG. 17 shows optimization fronts traced by different strategies. The first strategy that applies TO to the pruned feasible design subspace of the containment constraint is the most computationally rational, as the entire family of solutions satisfy all requirements.

Figure 18:
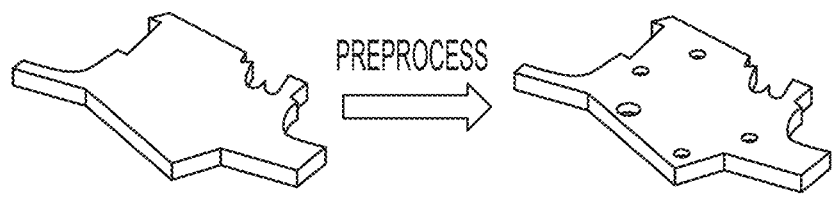
FIG. 18 shows problem of design for manufacturability with functional features that are specified in pre-processing in accordance with embodiments described herein.
Figure 19:
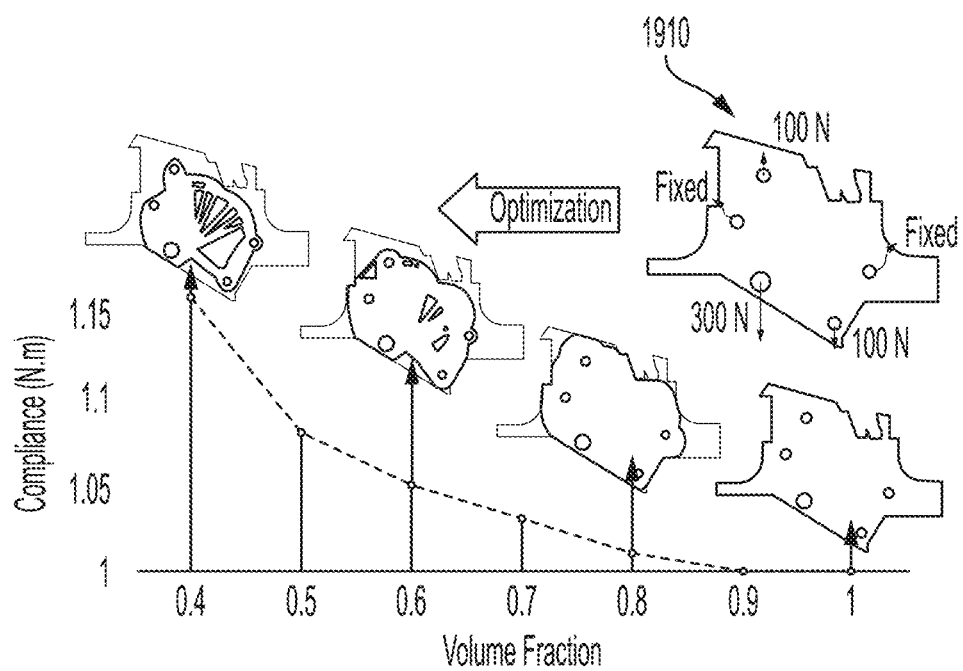
FIG. 19 illustrates the Pareto front of accessible designs optimized under specified loading boundary conditions in accordance with embodiments described herein.

Let us next consider the problem of design for manufacturability with the setup shown earlier. Once again, functional features are specified in pre-processing, as illustrated in FIG. 18. Here, it is assumed that these functional features are also accessible. In some cases, they could be introduced upfront in the raw stock and be modified by designer through trial and error. FIG. 19 illustrates the Pareto front of accessible designs optimized under specified loading boundary conditions 1910 in accordance with embodiments described herein. The boundary conditions 1910 are shown on the top-right corner of FIG. 19, including both forces and restrained surfaces. The underlying material is stainless steel with Young's modulus Y=200 GPa and Poisson's ratio v=0.33.

Step 0

The design space can be pruned with respect to the accessibility of a 2-axis CNC instrument, where the 2D cross-section of the 2.5D maximal pointset was obtained as the 0-level set of a 3D convolution field between the head H and fixtures F (both in 3D), i.e., $\Omega_2^* \cong (1_{-H}*1_F)^{-1}(0)$.

Steps 1, 2

Here, the interest is finding a set of designs with maximal stiffness while reducing the volume of the pruned design domain by another 60%.

All the optimized designs may have uniform cross-sections along wire-/laser-cutting direction (i.e., are 2.5D). This constraint can be imposed either by applying a 2D TO to the cross-section of the initial design and extruding its results, or by using a 3D TO with a through-cut filtering of the TSF. Here, the latter is used (PareTO in 3D) for this example.

The remaining steps 3 and 4 are similar to the previous example. The only FP-solver in the loop is a standard FEA, in absence of coupled manufacturing constraints, noting that manufacturability is a priori guaranteed in the pruning phase. In the next example, a problem is considered in which the manufacturing constraints cannot be pruned and has to be coupled with the physical constraints within the inner-loop fixed-point iteration.

Figure 20:
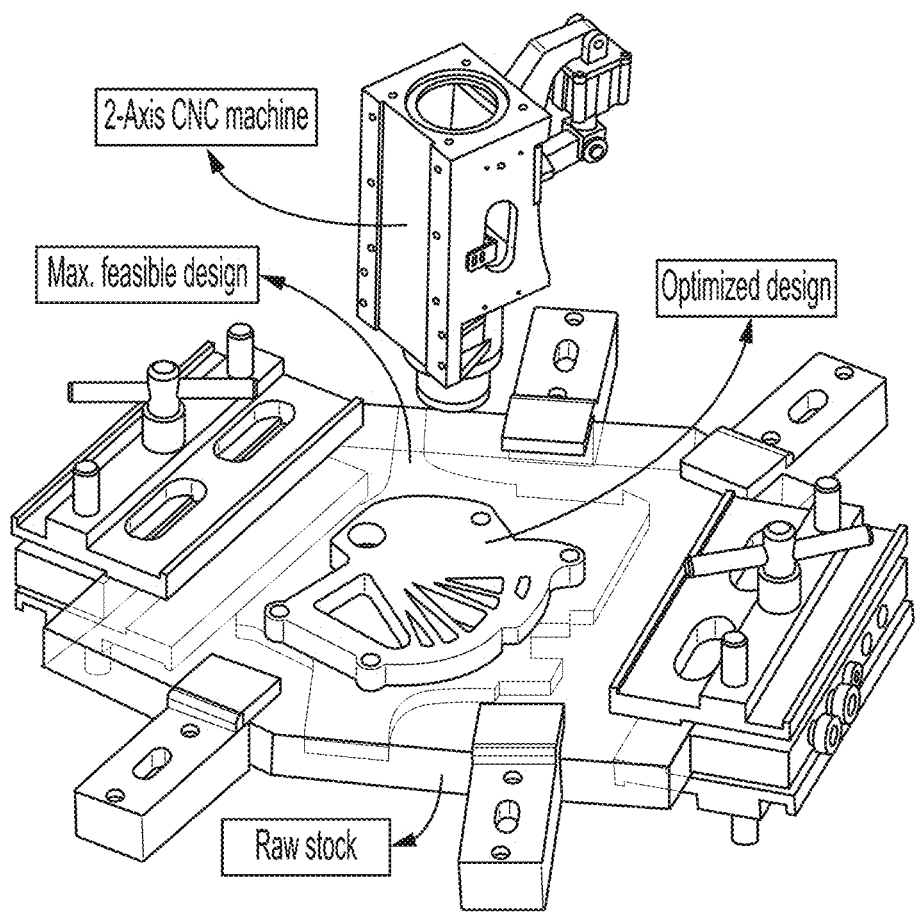
FIG. 20 shows the fixturing setup, raw stock, maximal manufacturable domain (i.e., initial design for TO), and the optimized design at 40% volume fraction in accordance with embodiments described herein.

FIG. 20 shows the fixturing setup, raw stock, maximal manufacturable domain (i.e., initial design for TO), and the optimized design at 40% volume fraction. FIG. 19 shows the Pareto front as it is traced from 100% to 40% volume fraction. As with the previous example, the material reducing nature of TO ensures that it does not violate the manufacturability constraint. FIG. 20 shows the optimized design at 40% volume fraction in the manufacturing setup of FIG. 13A.

Previously, two formulations for optimization subject to accessibility constraints were discussed, one with global formulation in FIG. 30 (based on total inaccessible volume), and one with local formulation in FIG. 31 (based on inaccessibility measure as a convolution field). Experimenting with the former fails, as expected, because the TSF for the global form is discontinuous. The convolution field, on the other hand, is relatively well-behaved and can be used to penalize the TSF, as confirmed by numerical experiments.

Step 0

In the absence of uncoupled pointwise constraints, start with the initial design domain $\Omega_0 \in D$.

Step 1

The objective functions and constraints are given in (79). The additional constraint $[1_\Omega * \bar{1}_T] = [0]$ requires that every point in the (voxelized) design $[1_\Omega]$ be accessible by the (voxelized) tool assembly $[1_T]$, inverted as $[\bar{1}_T]$. Remember that the convolution's value at a given query point measures the volume of collision when the tool is displaced in such a way that a representative point on the tool—i.e., the origin of its local coordinate system in which $[1_T]$ is represented—is brought to the query point in the design domain. The convolution field is defined over the configuration space of relative motions (translations in this case). The proper selection of the local coordinate system is used to "register" the convolution field with the design domain and other fields defined over it (e.g., TSF). The origin of the tool is picked at the tip of the cutter to simplify the formulation.

For the interior points, the constraint is violated, because the tool cannot reach the interior without colliding with the part. The violation is larger for points that are farther from the boundary, providing a continuous penalty for TSF. Not every point in the exterior is accessible either. Even if the tip of the cutter does not collide with the part, the rest of the tool assembly might. The penalty is typically smaller for external points, as illustrated by FIGS. 21 and 25A-25C. when there are more than one tool or approach orientations, the algorithm picks the minimum collision measure for penalization.

Step 2

The TSF for compliance is computed as usual, and is normalized by its maximum. An independent subroutine computes the convolution via FFTs, as discussed earlier, and is normalized by the volume of he tool (upper-bound to convolution). The TSF is penalized via convolution using an adaptive weight (For instance start with $\lambda_3 := 0.01$ and increase it to $\lambda_3: = 0.2$ for lower volume fractions). Other design constraints such as minimum feature size or surface retainment can also be imposed.

Steps 3, 4

The outer-loop iteration is as before. The inner loop iteration now cycles through one more FP-solver (the FFT-based convolution routine).

Figure 21:
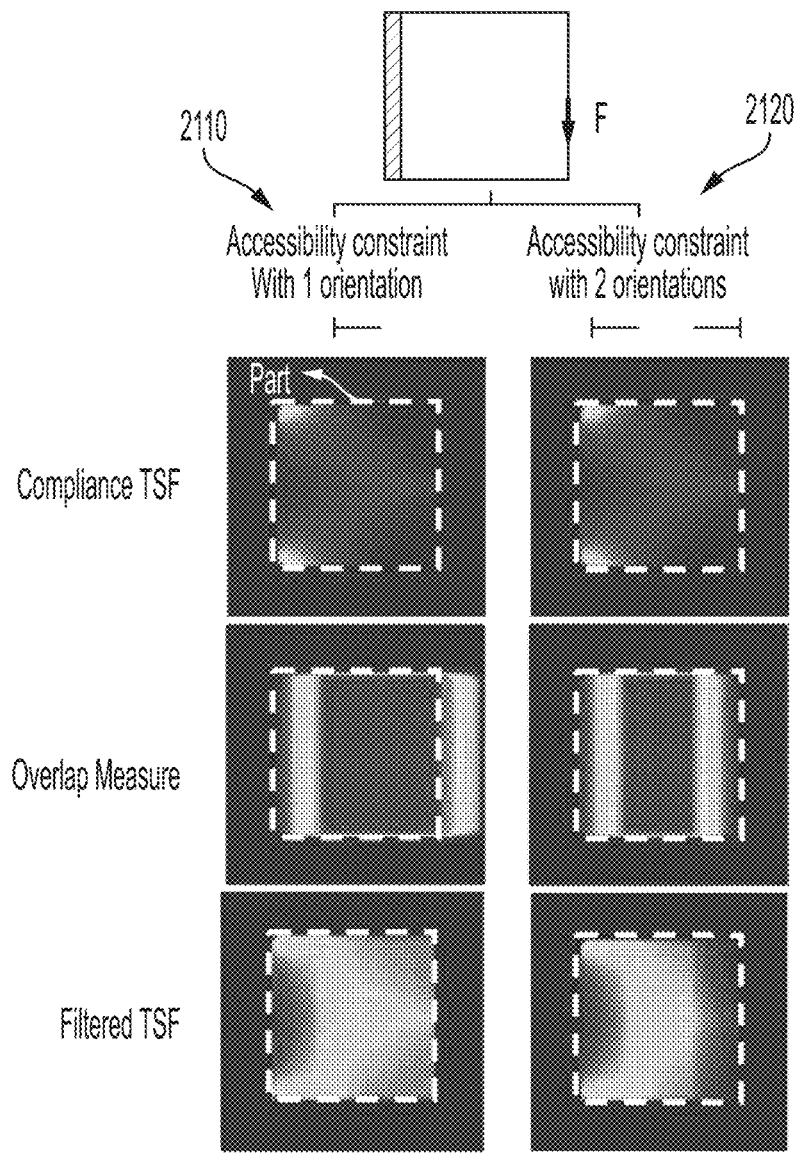
FIG. 21 shows penalizing TSF by the inaccessibility measure for T-shaped tool approaching from left or from both left and right in accordance with embodiments described herein.

A simple 2D cantilever beam of FIG. 21 with simple boundary conditions of a downward force F=1 N, Young's modulus of Y=1 GPa, and Poisson's ratio of v=0.3. Given a T-shaped tool with cutting part at the thin end, consider accessibility in two scenarios with the tool approaching from one orientation (from left) and two orientations (from left and right). FIG. 21 illustrates how the convolution fields differs in the two cases. Subsequently, the compliance TSF is penalized to capture accessibility under tool orientations.

Figure 22:
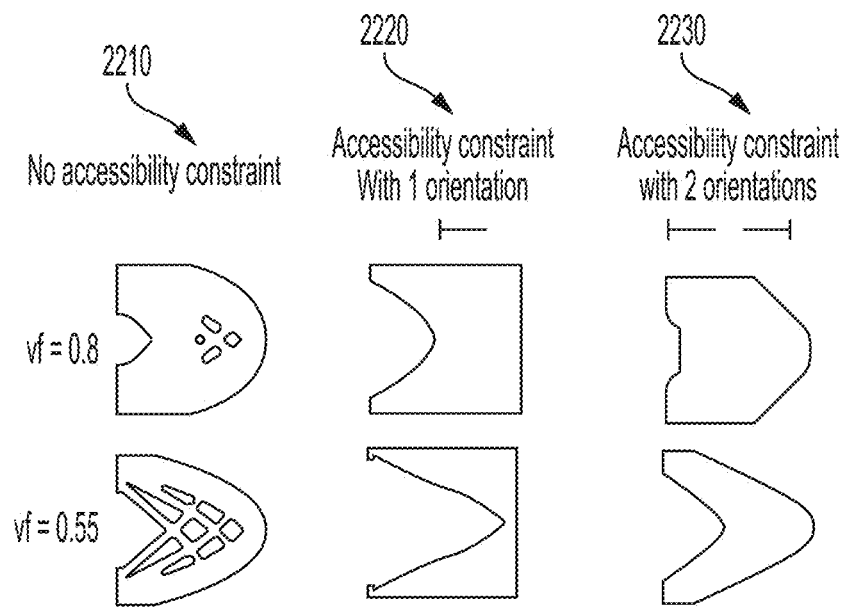
FIG. 22 illustrates optimized shapes with and without the accessibility constraints with one and two tool orientations in accordance with embodiments described herein.

FIG. 21 shows penalizing TSF by the inaccessibility measure for T-shaped tool approaching from left 2110 or from both left and right 2120. Note that the field is asymmetric for 2110. FIG. 22 illustrates optimized shapes with and without the accessibility constraints with one 2220 and two 2230 tool orientations. Since the tool can only move in the plane, the TO cannot introduce interior holes without incurring a large penalty. Moreover, it can only remove material from the boundary in such a way that the remaining shape is machinable—e.g., no concave features of smaller feature size than the tool thickness in this case. Note that this is automatically enforced by penalizing convolution, without appealing explicitly to any notion of features or feature size. Here, optimized topologies at volume fractions 0.55 and 0.80 without accessibility constraint 2210, with accessibility constraint for tool at 0° 2220, and for tool at 0° and 180° 2230.

Figure 23:
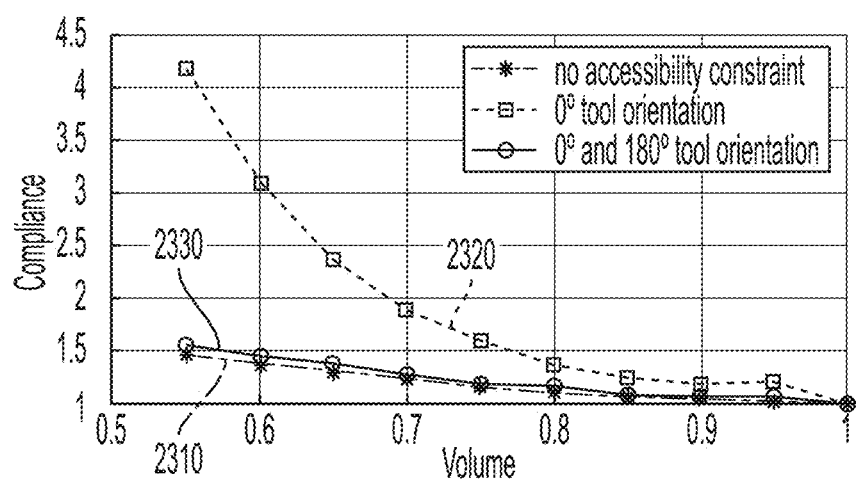
FIG. 23 shows the Pareto fronts with one approach direction, two approach directions, and an unconstrained solutions in accordance with embodiments described herein.

In the case of the tool approaching at 0°, material can be accessed and removed only from the left side. However, with 0° and 180 angles for tool orientation, the material can be removed from both sides. FIG. 23 shows the Pareto fronts of the three scenarios 2310, 2320, 2330. As expected, optimization without accessibility constraints 2310 yields the best performance in terms of compliance while imposing accessibility with one approach direction 2320 significantly increases the compliance. However, when the tool can approach from both directions 2330 comparable performance to the unconstrained solutions can be achieved.

Figure 24:
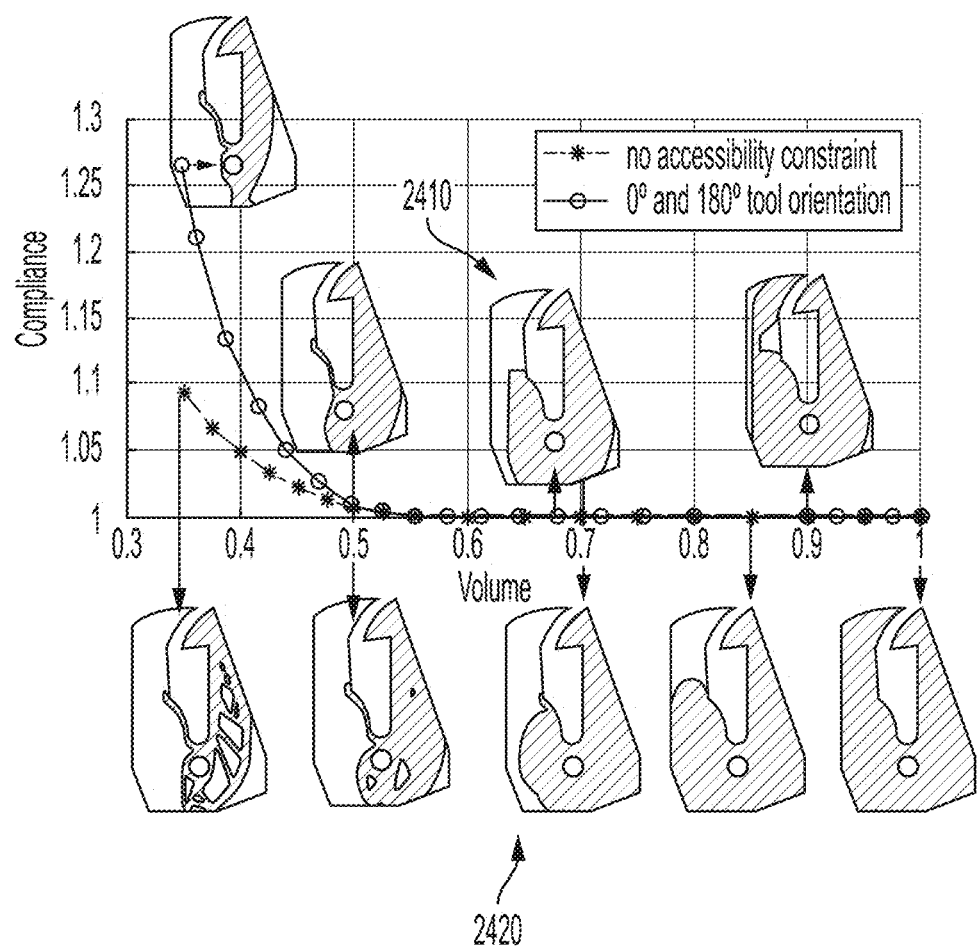
FIG. 24 shows the optimized latches at 35% volume fraction with and without the accessibility constraint in accordance with embodiments described herein.
Figure 25A:
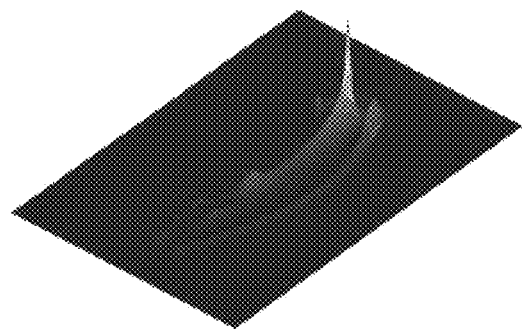
FIG. 25A shows the original TSF for compliance in accordance with embodiments described herein.
Figure 25B:
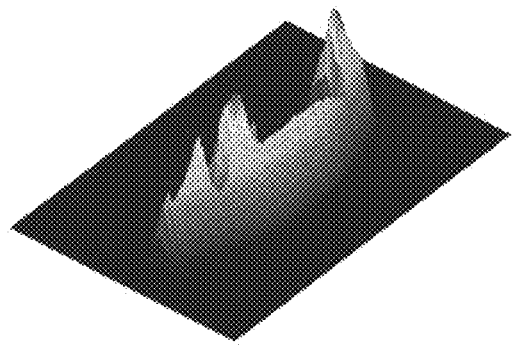
FIG. 25B illustrates the inaccessibility measure obtained from a convolution of the design and tool at 0° and 180° in accordance with embodiments described herein.
Figure 25C:
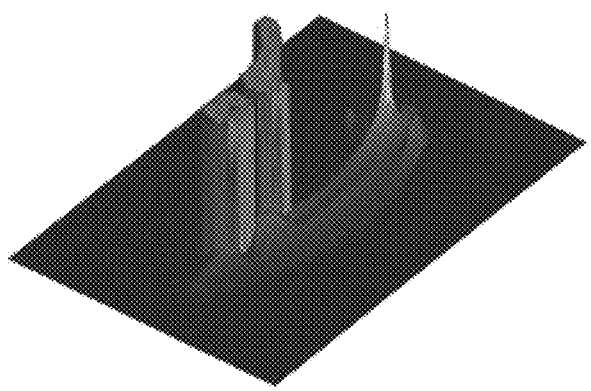
FIG. 25C shows the penalized TSF to incorporate accessibility and retain functional surfaces for the final design at a volume fraction of 35% in accordance with embodiments described herein.

Consider the car hood latch example of FIGS. 16A and 16B. FIG. 24 shows the optimized latches at 35% volume fraction with 2410 and without 2420 the accessibility constraint. The same T-shaped tool is considered and oriented at both 0° and 180°. Imposing the accessibility constraint increased the relative compliance from 1.09 to 1.26. FIG. 25A shows the original TSF for compliance, FIG. 25B illustrates the inaccessibility measure obtained from a convolution of the design and tool at 0° and 180°, and FIG. 25C shows the penalized TSF to incorporate accessibility and retain functional surfaces for the final design at a volume fraction of 35%.

It should be noted that in the above examples, only the collision between the tool and the part is considered (i.e., no fixtures). Moreover, constraining the convolution field captures only the existence of final collision-free configurations for the tool to machine the part at different points in the design domain. It does not guarantee a collision-free toolpath from the initial tool configuration to the removal site.

For the definition of the TSF to be valid, the limit in (75) may exist everywhere in the design domain and for all intermediate designs. In other words, puncturing the design with infinitesimal cavities may lead to infinitesimal changes in the violation of objective functions and constraints. For this to hold, the functions may be sufficiently smooth. Here the function $F_j: D_P^* \to R$ may need to be differentiable in the Hausdorff topology of $D_P^* = \mathcal{P}^*(\Omega_P^*)$, which is relative to the topology of $D = \mathcal{P}^*(\Omega_0)$. This is not always the case for general constraints. For example, if $F_j(\Omega)$ is itself evaluating a topological property, introducing a puncture (no matter how small) can produce a large change in $F_j(\Omega)$. For example, topological defects in AM due to resolution limits can be characterized as integer-valued Euler characteristics. The Euler characteristic will increase by +1 after adding a cavity, hence $\mathcal{T}_j(x; \Omega) \sim +1/O(\in^3) \to +\infty$ as $\in \to 0^+$. In practice, this appears as a discontinuity in constraint evaluation which adversely affects the convergence of the optimization loop (e.g., fixed-point iteration for PareTO).

As another example, recall the manufacturability constraint of (7) in which the total volume of inaccessible regions (for machining) was upper-bounded as a global constraint. Puncturing a hole of volume vol[$B_\in(x)$] in the interior of the design adds exactly vol[$B_\in(x)$] to the inaccessible volume, hence $\mathcal{T}_j(x; \Omega) = 1$ for all $x \in i\Omega$. Most of the time, chipping off a visible (but too small) vol[$\Omega \cap B_\in$(x)] adds the same exact amount to the inaccessible volume, because the tool is of finite size and cannot remove that volume in practice. However, it is possible that a substantial region of design that was initially inaccessible becomes accessible due to the small change at the boundary. Hence either $\mathcal{T}_j(x; \Omega) = 1$ or $\mathcal{T}_j(x; \Omega) \to -\infty$ for all $x \in \partial \Omega$. This is not a well-behaved TSF for optimization.

The TSF is well-behaved for most global constraints that are defined as volumetric integrals of continuous physical fields (e.g., strain energy). This is the actual motivation behind using a volumetric measure of the inclusion in the denominator of (81) to normalize volumetric measures in the numerator. In principle, one can use a different measure for global constraints that vary at a different rate than $O(\in^3)$. Small changes in the design often lead to small changes in physical response, when it is integrated over the entire domain, because integration smooths out the effects of local singularities. For instance, if a constraint is imposed on the maximal stress as in (6), a realistic TSF cannot be defined due to stress concentration. The simplest model of stress concentration yields an infinite maximal stress $\sigma_\Omega(x) \sim O(\in^3)$ near an infinitesimal radius of curvature $\in \to 0^+$, hence $\mathcal{T}_j(x; \Omega) \sim O(\in^{-3.5}) \to +\infty$ when defined for the maximal stress as in (6). In practice, one can alleviate this issue by using a volumetric integral (e.g., the p-norm) of stress rather than its maximum, in order to smooth out the effects of local singularities.

The other limitation with the usability of TSF is that the constraint function should not be locally "flat". If the change in the violation of a constraint is too small, i.e., decays faster than $O(\in^3)$, the limit will vanish and the TSF will not help the optimization. For example, manufacturability constraints that have to do with surface properties are insensitive to volumetric changes in design.

In summary, the TSF formulation works well for global constraints that change smoothly with local volumetric material removal. Although this is not true for all global constraints, the good news is that some of them can be reformulated as a local constraints. Therefore, penalization of the local constraint can be used instead of defining a TSF for the global constraint. For example, although the accessibility constraint that was discussed above does not yield a well-behaved TSF when treated as a global constraint $g_3(\Omega) \leq 0$ of (7), Previously, it was demonstrated that it can be successfully incorporated to constraint PareTO using penalization of the local form $g_4(x; \Omega) \leq 0$ of (16) in terms of inaccessibility measure defined as the convolution in (17).

Mechanical design requires simultaneous reasoning about multidisciplinary functional requirements and evaluating their trade-offs. These requirements are often expressed via heterogeneous types of constraints, including kinematics-based constraints for assembly and packaging, physics-based constraints for performance under mechanical or thermal loads, and both for manufacturability. Automated design optimization algorithms rarely consider all such requirements, and do not provide mechanisms to explore their trade space. For example, topology optimization can automatically generate designs with optimized material layouts for performance criteria such as strength and stiffness, but often ignores complex motion-based constraints imposed by collision avoidance in assembly or accessibility in manufacturing.

The challenge in design space pruning and exploration is that IP-solvers are usually equipped with the tools to satisfy only a subset of the criteria in a multifunctional design problem. When these solvers are composed sequentially or in parallel, they can rarely provide guarantees to retain the other criteria satisfied by the preceding or concurrent solvers in the workflow. Moreover, most of the existing solvers generate a narrow subset of the design space-most commonly one or few design(s) that is/are deemed (locally or globally) "optimal" within the design subspace that appears feasible to the solver. Such premature optimization dramatically limits the subsequent solvers' freedom to explore (best-case scenario) and might even get deadlocked at infeasible designs (worst-case scenario).

To solve such challenges, a philosophy of treating design spaces (as opposed to individual designs) as first-class entities is followed—at least to the extent that it is possible to do so by proper ordering of solvers in the workflow. This means that the entity being passed through the design pipeline—as input/output of consecutive synthesis solvers—is a design subspace described in its entirety by a representative object. This treatment allows postponing restrictive decisions and pushing premature optimization downstream as much as possible. The design workflows are organized by a careful analysis of the types of constraints and available solvers to address them and provide a systematic approach to compose FP- and IP-solvers depending on the type of design constraint(s) they can satisfy.

A contribution of this work is a classification of constraints (namely, global, local, or strictly local) based on which the solvers are organized systematically in the computational design workflow. In particular, the strictly local (i.e., pointwise) constraints can be evaluated without a knowledge of the global shape, hence lead to a point membership classification (PMC) for a maximal design that satisfies them. The maximal pointset represents the entire feasible design subspace for a pointwise constraint, in the sense that containment in the maximal pointset may be a necessary and sufficient condition for feasibility. As such, the design space can be pruned upfront by intersecting maximal pointsets of pointwise constraints, without premature optimization.

Most design criteria that depend on physics-based performance do not lead to a pointwise condition/PMC because the physical response of a design at any given point is typically dependent on the overall shape, i.e., the membership of one point is couple with the membership of other points. The dependency may be long-range, as in the case of static equilibrium throughout a mechanical structure, or local, as in transient dynamic effects within a bounded neighborhood over a finite time interval. In either case, further design space pruning by means of PMC, to postpone decision making on the particular design layout, is not an option. In such cases, the FP-solvers collaborate in generating feasible and optimized designs by combining their sensitivity fields and methods such as fixed-point iteration for tracing the trade space of multiple objectives.

A revelation of the classification is that the two different types of problems (namely, design space 'pruning' and 'exploration') demonstrate a different form of duality between forward and inverse problem (IP/FP)-solvers for generative design:

For pointwise constraints, an IP-solver can be constructed from an FP-solver by generating a large sample of points in the design domain, applying the FP-solver in a pointwise fashion, evaluating the constraint, and retaining/discarding the ones the do/do not satisfy the constraint. In other words, the FP-solver provides a PMC test for the IP-solver. The process can be perfectly parallelized.

For other constraints, an IP-solver can be constructed from an FP-solver by generating a number of candidate designs, evaluating the constraints, obtaining a sensitivity field to order the different points in the design according to their expected impact on the (dis)satisfaction of the constraint, removing the least sensitive points, and try again with the modified design. In other words, the FP-solver provides ae evaluator for candidate designs to put in a feedback loop for the generate-and-test IP-solver. The process is a sequential loop that is repeated until convergence.

A limitation of the approach is that it does not provide any guarantees for satisfying constraints that are neither pointwise nor differentiable. For some local constraints (e.g., accessibility measures for machining), it has been shown that penalizing the sensitivity fields of other global constraints with the local constraint can be effective. However, it is unclear how to systematically make such decisions with every new problem and constraint, unlike the case with pointwise constraints (pruned upfront) or differentiable non-pointwise constraints (filtered via local sensitivity analysis).

Figure 26:
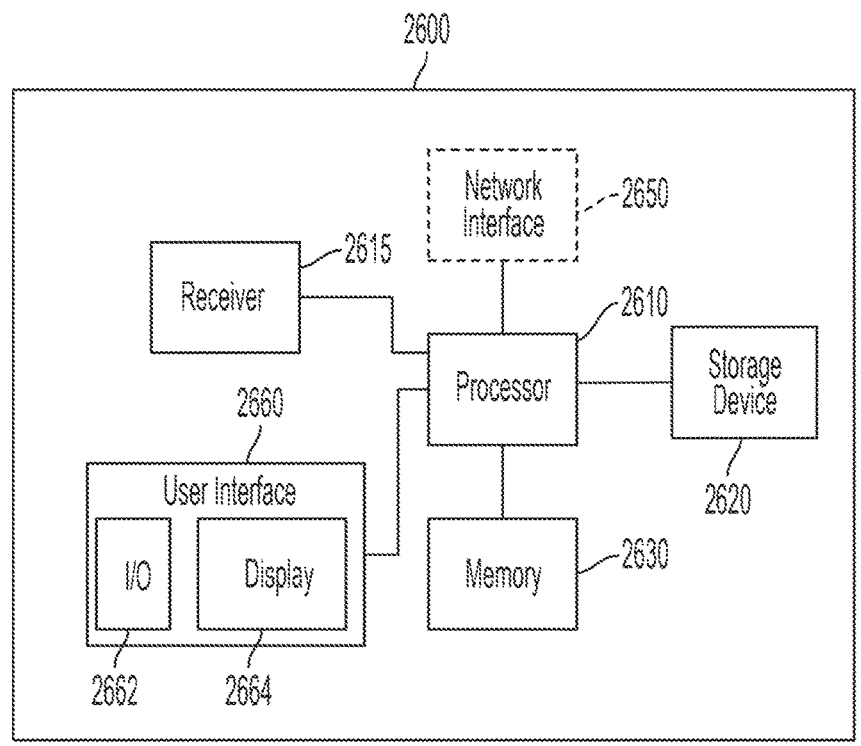
FIG. 26 illustrates an example computer architecture that can implement methods described herein.
Figure 27:
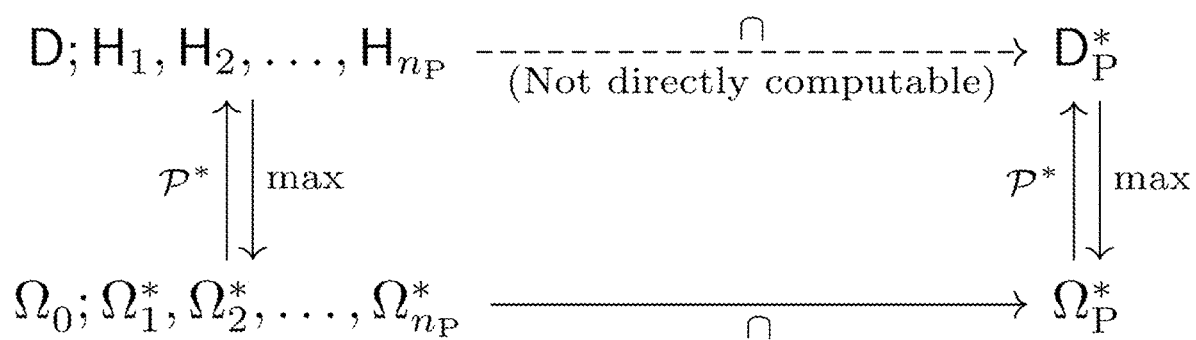

The above-described methods can be implemented on a computer using well-known computer processors, memory units, storage devices, computer software, and other components. A high-level block diagram of such a computer is illustrated in FIG. 26. Computer 2600 contains a processor 2610, which controls the overall operation of the computer 2600 by executing computer program instructions which define such operation. The computer program instructions may be stored in a storage device 2620 (e.g., magnetic disk) and loaded into memory 2630 when execution of the computer program instructions is desired. Thus, the steps of the methods described herein may be defined by the computer program instructions stored in the memory 2630 and controlled by the processor 2610 executing the computer program instructions. The computer 2600 may include one or more network interfaces 2650 for communicating with other devices via a network. The computer 2600 also includes a user interface 2660 that enables user interaction with the computer 2600. The user interface 2660 may include I/O devices 2662 (e.g., keyboard, mouse, speakers, buttons, etc.) to allow the user to interact with the computer. Such input/output devices 2662 may be used in conjunction with a set of computer programs as an annotation tool to annotate images in accordance with embodiments described herein. The user interface also includes a display 2664 for displaying images and spatial realism maps to the user. According to various embodiments, FIG. 26 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate embodiments described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method of classifying design criteria comprising
receiving design criteria for a product part, the design criteria comprising one or both of performance and manufacturing criteria;
sorting the design criteria into different classes of one or both of one or more objective functions and one or more constraints based on when they can be satisfied or optimized;
determining constraint violations; and
producing a design workflow to generate one or more designs of a part to comply with one or more of satisfying the one or more constraints and optimizing the one or more objective functions.

2. The method of claim 1, wherein types of the one or more constraints comprise one or more of set constraints, equality constraints, and inequality constraints.

3. The method of claim 1, wherein scopes of the one or more constraints comprise one or more of global, local, and strictly local.

4. The method of claim 1, further comprising computing one or more performance fields of the one or more designs.

5. The method of claim 4, further comprising:
evaluating the one or more objective functions based on the performance fields; and
ordering the one or more designs based on the evaluated objective functions.

6. The method of claim 4, further comprising:
computing the constraint violations based on the performance fields; and
determining if the one or more designs are feasible based on the computed constraint violations.

7. A system for classifying design criteria, comprising:
a processor; and
a memory storing computer program instructions which when executed by the processor cause the processor to perform operations comprising:
receiving design criteria for a product part, the criteria comprising one or both of performance and manufacturing criteria
sorting the design criteria into different classes of one or both of objective functions and constraints based on when they can be satisfied or optimized;
determining constraint violations; and
setting up a design workflow to generate one or more designs of a part to comply with one or more of satisfying constraints and optimizing objective functions.

8. The system of claim 7, wherein types of the constraints comprise one or of set constraints, equality constraints, and inequality constraints.

9. The system of claim 7, wherein scopes of the constraints comprise one or more of global, local, and strictly local.

10. The system of claim 7, wherein the processor is further configured to compute one or more performance fields of the one of the one or more designs.

11. The system of claim 10, wherein the processor is further configured to:
evaluate one or more objective functions based on the performance fields; and
order the one or more designs based on the evaluated objective functions.

12. The system of claim 10, wherein the processor is further configured to:
compute the constraint violations based on the performance fields; and
determine if the one or more designs are feasible based on the computed constraint violations.

13. A method, comprising:
receiving one or more constraints for a design of a product part;
defining a feasible design space based on the one or more constraints;
pruning the design space based on a subset or all of the one or more constraints; and
exploring the pruned design space to produce one or more feasible part designs.

14. The method of claim 13, further comprising:
evaluating point membership tests based on one or more feasibility predicates defined by pointwise constraints; and
computing maximal designs to represent the feasible design space with respect to the pointwise constraints.

15. The method of claim 13, further comprising:
computing a measure of global changes of each of a plurality of constraint violations due to local variations in the one or more designs; and
determining a topological sensitivity field (TSF) by combining the measures of global changes of each of the plurality of constraint violations, the TSF configured to guide design space exploration to produce the feasible designs.

16. The method of claim 15, wherein defining the feasible design space comprises using one or more of a density-based, a levelset shape, and a topology optimization approach.

17. The method of claim 16, further comprising optimizing the one or more designs using augmented Lagrangians.

18. A system, comprising:
a processor;
a user interface; and
a memory storing computer program instructions which when executed by the processor cause the processor to perform operations comprising:
receiving one or more constraints for a design of a product part via the user interface;
defining a feasible design space based on the one or more constraints;
pruning the design space based on a subset or all of the constraints; and
exploring the pruned design space to produce one or more feasible part designs.

19. The system of claim 18, wherein the processor is further configured to perform:
evaluating point membership tests based on one or more feasibility predicates defined by pointwise constraints; and computing maximal designs to represent the feasible design space with respect to the pointwise constraints.

20. The system of claim 18, wherein the processor is further configured to perform:
computing a measure of global changes of each of a plurality of constraint violations due to local variations in the one or more designs; and
determining a topological sensitivity field (TSF) by combining the measures of global changes of each of the plurality of constraint violations, the TSF configured to guide design space exploration to produce the feasible designs.

* * * * *